United States Patent [19]
Tazawa et al.

[11] Patent Number: 5,367,465
[45] Date of Patent: Nov. 22, 1994

[54] SOLIDS SURFACE GRID GENERATION FOR THREE-DIMENSIONAL TOPOGRAPHY SIMULATION

[75] Inventors: Satoshi Tazawa, Atsugi; Kazuyuki Saito, Naka, both of Japan; Francisco A. Leon, Mountain View, Calif.

[73] Assignees: Intel Corporation, Santa Clara, Calif.; Nippon Telegraph and Telephone Corporation, Tokyo, Japan

[21] Appl. No.: 904,005

[22] Filed: Jun. 24, 1992

[51] Int. Cl.⁵ .............................................. G06F 15/72
[52] U.S. Cl. .................................... 364/468; 364/488; 364/578
[58] Field of Search ....................... 364/468, 488–491, 364/578, 522, 577; 395/123; 382/21–26; 340/729, 747

[56] References Cited
U.S. PATENT DOCUMENTS

| | | | |
|---|---|---|---|
| 4,797,842 | 1/1989 | Nackman et al. | 364/578 |
| 4,819,161 | 4/1989 | Konno et al. | 364/578 |
| 4,912,664 | 3/1990 | Weiss et al. | 364/577 |
| 4,933,889 | 6/1990 | Meshkat et al. | 364/578 |
| 5,036,316 | 6/1991 | Kemplin | 364/578 |
| 5,067,101 | 11/1991 | Kunikiyo et al. | 364/578 |
| 5,070,469 | 12/1991 | Kunokiyo et al. | 364/578 |
| 5,125,038 | 6/1992 | Meshkat et al. | 364/578 X |
| 5,214,752 | 5/1993 | Meshkat et al. | 395/123 |

OTHER PUBLICATIONS

Y. Hirai, et al, "Three-Dimensional Resist Process Simulator PEACE (Photo and Electron Beam Lithography Analyzing Computer Engineering System)", IEEE Transactions on Computer-Aided Design, vol. 10, No. 6, Jun 1991 pp. 802–807.

T. Itoh, T. Matsuzawa, K. Kadota, S. Hanashima, "A Three-Dimensional Resist Shape Simulator and Its Application to Sub-Micron VLSI Process", The Transactions of the Institute of Electronics, Information and Communication Engineers, vol. J70-C, No. 8, 1987 pp. 322-240.

T. Ishizauka, "Three-Dimensional Simulation in Photoresist Development", The Transaction of the Institute of Electronics, Information and Communication Engineers, vol. J73-C-2 II, No. 11, 1990, pp. 775–785.

T. Matsuzawa, T. Ito, M. Tanuma, "Three-Dimensional Photoresist Image Simulation on Flat Surfaces" IEEE Tran. on Electron Devices, vol. ED-32, pp. 1781–1783, Sep. 1985, pp. 1781–1783.

E. W. Scheckler, K. K. H. Toh, D. M. Hofstetter and A. R. Heureuther, "3D Lithography, Etching, and Deposition Simulation (Sample-3D)" Symp. VLSI Technol. Dig., p. 97, May 1991.

B. Schachter, "Decomposition of Poloygons into Convex Sets" IEEE Transactions on Computers, vol. C-27, No. 11, Nov. 1978 pp. 1078–1082.

*Primary Examiner*—Stephen M. Baker
*Assistant Examiner*—Thomas E. Brown
*Attorney, Agent, or Firm*—Blakely, Sokoloff, Taylor & Zafman

[57] ABSTRACT

A method for creating regular triangular grid representations of a solid surface from a representation comprised of a plurality of polygons. Such a regular grid is necessary in order to accurately deform a solid during simulation of a process step. The method of the preferred embodiment is comprised generally of the steps of: removing any holes defined by the polygon face; placing a new edge between a first and second vertex of the polygon face; discarding the new edge if the new edge lies outside the polygon face or if the new edge intersects an existing edge of the polygon face; adding the new edge to the polygon face if the new edge does not lie outside the polygon face; identifying a triangle being created by the new edge and existing edges of the polygon; forming a new polygon face from the edges creating a triangle; and repeating the above steps until all polygon faces are triangulated. Once the triangulation of the polygons is completed, adjustments to the triangles is made in order to have only triangles of uniform size.

6 Claims, 47 Drawing Sheets

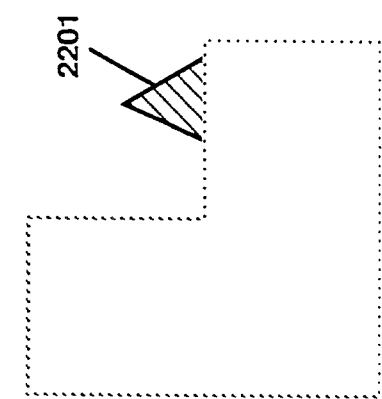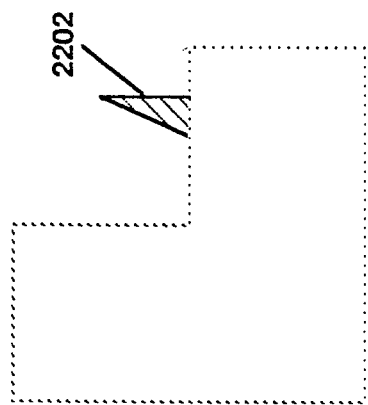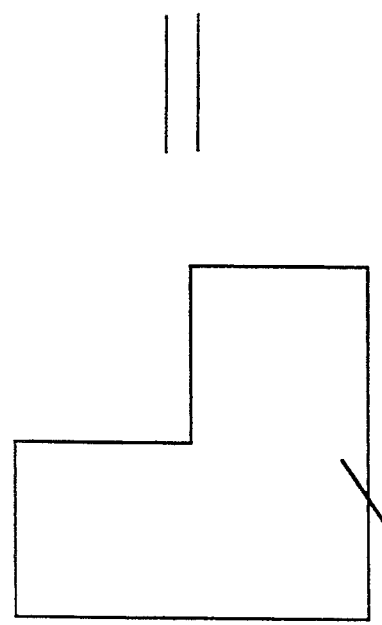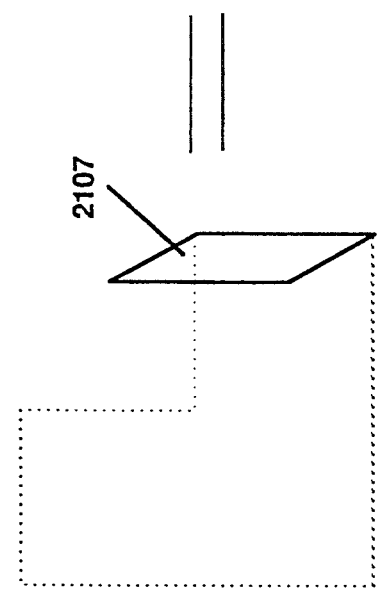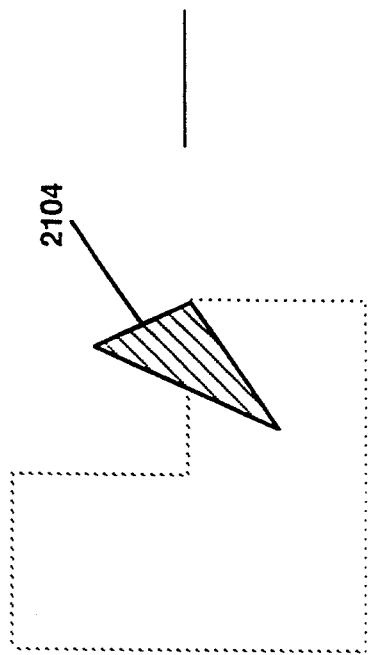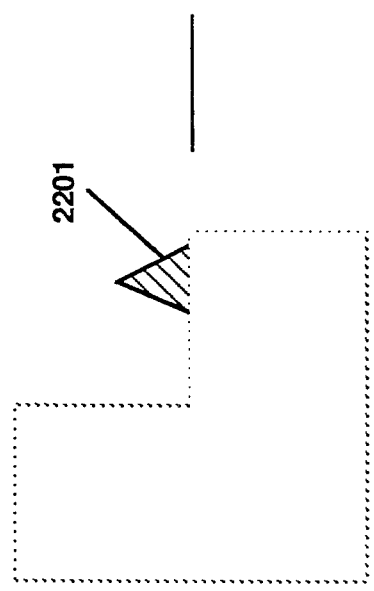
Figure 22a
Figure 22b

SOLIDS SURFACE GRID GENERATION FOR THREE-DIMENSIONAL TOPOGRAPHY SIMULATION

BACKGROUND OF THE INVENTION

1. Field of the Invention

The present invention relates to the field of computer aided design, in particular a three-dimensional solids modeling approach for simulating the manufacture of integrated circuits.

2. Description of the Related Art

The computer simulation of the manufacture of integrated circuits is commonly referred to as process simulation. Process simulation is a valuable tool in the design and manufacture of integrated circuits. It has the benefits of reducing design times and reducing experimentation and manufacturing costs. In practice, process simulation involves determining the effect of the successive deposition (i.e. depositing material), etch (i.e. removing material), lithography or other process steps on a semiconductor wafer during manufacture. Broadly speaking, process simulation can be divided into topography simulation and bulk process simulation. Topography simulation, which can be used with such process steps as deposition, etch, and lithography, is concerned mainly with the change of the geometry of the materials comprising a semiconductor wafer. Bulk process simulation, which is used with such processes as diffusion, ion implantation and oxidation, is concerned mainly with the re-distribution of the dopant impurities in the semiconductor devices. Oxidation is actually an intermediate case, affecting both the geometry and the distribution of dopant impurities.

An application of process simulation is to create computer representations of wafer structures for use by other analysis programs. Such analysis programs can then calculate properties of the device, such as electrical characteristics, thermal properties, mechanical properties, etc.

In the design of semiconductors, it is the shape and composition of the resulting structure which cause it to operate correctly. It is useful to be able to view the layers comprising a semiconductor wafer during the manufacturing process in order to identify undesirable shapes or results. For example, if a particular layer is etched too deep, e.g. it inadvertently exposes a second layer, a visual inspection can readily detect the error. This avoids the costly and time consuming alternatives of manufacturing and testing wafers. Additionally, a computer simulation provides for viewing what may only be visible with an electron microscope.

Topography simulation is complicated by the fact that various shapes result during the steps of different process technologies. FIGS. 1a–1c represent various shapes that are created at convex and concave plane interfaces. A convex plane interface is one where outer surface of the planes is greater than 180 degrees. A concave plane interface is one where the outer surface of the planes is less than 180 degrees. Referring to FIG. 1a, an original material having the shape 102 has undergone an isotropic etch process step resulting in the shape 101. Vertex points 103 and 104 of shape 102 are positioned at concave intersections between two faces. It should be noted that the faces define a 90 degree (or sharp) angle at the vertex points 103 and 104. As illustrated in shape 101, at points 105 and 106, the resulting interface at the concave interface is rounded. However, when comparing the convex intersection points 107 and 108 of shape 102 with their counterparts 109 and 110 of shape 101, it is observed that a 90 degree (sharp) edge is maintained.

FIG. 1b illustrates the effect during an isotropic deposition process step. Vertex points 125 and 126 of shape 122 are positioned at concave intersections between two faces. It should be noted that the faces define a 90 degree (or sharp) angle at the vertex points 125 and 126. As illustrated in shape 121, at points 123 and 124, the resulting interface at the concave interface retains a 90 degree (sharp) edge. However, when comparing the convex intersection points 129 and 130 with their counterparts 127 and 128, it is observed that a rounded edge is created.

Referring to FIG. 1c, the shape created as a result of a sputter etch is illustrated. In a sputter etch, the etch rate is dependent on surface orientation with respect to the direction of the trajectory of an etching particle. The etch rate will typically peak at a surface orientation ranging from 45 to 80 degrees. In any event, a sputter etch on the material having a shape 141 will result in the material having a new shape 142. Of particular interest is the fact that the faces 143 and 144 will become angled and somewhat rounded as illustrated by the faces 145 and 146. This is due to the angular dependence of the etch rates of the etching particles striking portions of surface 141, thus leading to the illustrated shape 142.

A further condition of the wafer that must be accurately simulated are voids. Voids are created during deposition process steps. Such a void is illustrated in FIG. 1d. In FIG. 1d, metal lines 150 are to be separated from a subsequent layer by an oxide deposition. The deposition may occur over successive layers, here illustrated by layers 151, 152 and 153. Between the layers 151, and 152 a void 154 has been created. It is desirable not to have voids in a wafer. For example, during fabrication it may be a source of gaseous build ups that may subsequently be released and destroy portions of the wafer.

Two-dimensional (2-D) process simulation is known in the art and is used extensively. Such prior art 2-D process simulation tools include SUPREM (available from Stanford University) and SAMPLE (available from the University of California at Berkeley). However, 2-D process simulation does not provide all desired simulation results. For example, as the miniaturization of circuits increase, 2-D process simulators do not have the capabilities to accurately predict certain features, e.g. the shape around a hole or an intersecting point of metal lines. Three-dimensional (3-D) process simulation is desirable in order to obtain more precise and complete simulation results.

Three-dimensional (3-D) process simulation tools are known in the art. One such 3-D process simulation tool is the Oyster system. The Oyster system is an internally used process simulation tool of the IBM Corporation and is described in detail in an article entitled "OYSTER: A Study of Integrated Circuits as Three-Dimensional Structures," G. M. Koppelman and M. A. Wesley, *IBM Journal of Research and Development* 276, No. 2, pgs 149-163 (1983). The Oyster system is based on a more general concept of solids modeling. In the Oyster system, a geometric model represents the materials comprising the topography of a wafer as solids. Changes to the topography are created using geometric operations (i.e. boolean set operations). The Oyster system is built around a general solid modeling tool that provides the basic operations and data structures for a simulation.

The Oyster system utilizes a theoretical construct of a Cumulative Translational Sweeps (CTS) for shaping geometric objects. The CTS is used in combination with boolean set operations to simulate growth and shrinking over boundary regions of geometric objects. This aspect of the Oyster System, termed the CTS method, is described in detail in the publication entitled "Shaping Geometric Objects by Cumulative Translation Sweeps", R. C. Evans, G. Koppelman, V. T. Rajan, *IBM Journal of Research and Development*, pgs. 343-360, Volume 31, No. 3, May 1987 and in U.S. Pat. No. 4,785,399, entitled *"Shaping Geometric Objects by Cumulative Translational Sweeps"*.

As described above, the CTS method operates over the boundary regions of polyhedral representations of solid objects, using shaping polyhedrons (or shaping objects). A requirement in the CTS method is that a shaping polyhedron be from the polytope family of zonetopes. Generally, the CTS method provides for surface movement using the following steps:

1. Defining a set of translation vectors (which form a shaping polyhedron), which are characteristic of the desired surface movement.

2. Sweeping the original object along the first translation vector to create an intermediate solid that includes the original object. If there is only one translation vector, this becomes the new solid.

3. Sweep preceding intermediate solid along remaining translation vectors.

The CTS method sweeps the entire object at one time along the translation vector. As a result, the CTS method does not provide for simulation of process steps with spatially varying etch or deposition rates. An example of a spatially varying process step is a sputter deposition.

The use of a solid modeling approach for 3-D topography simulation is desirable since general 3-D solids modeling systems are commercially available. However, the data representations of the solids in such systems may not be ideal for creating and manipulating the structures needed for accurate and efficient topography simulation. In particular, data structures for representing adjacent materials are not commonly available.

Current techniques for the deformation of surfaces (which occurs in simulation of etch or deposition) are also not ideal. For example, a boundary representation model is often used to represent solids. Such representations become invalid when the boundaries of the solid intersect, i.e. the representation becomes self-intersecting. The representations may become invalid as they are re-formed during a process step. Such invalid representations will not allow for creation of accurate simulation results and may be unacceptable for further processing by the solids modeling system.

Several other modeling techniques for 3-D topography simulation are known in the art, namely a ray tracing model, a cell model, a network model, a diffusion model and a String model. The ray tracing model has heretofore only been used in photolithographic processing steps and is not discussed here in any detail.

The cell model is used in 3-D deposition and etch simulation. However, it has been found that the cell model does not adequately represent a curved surface. The network model is an improvement to the cell model where surface points are defined on each edge of surface tetrahedron cells. The diffusion model is also an improvement to the cell model and uses concentration contour as a surface definition. However, as with the cell model, both the network and diffusion models have been found to have difficulty in precisely treating curved surfaces as may occur during a process step.

The string model is also an approach with merit, but it often creates invalid self-intersection structures. Techniques for correcting for such self-intersecting structures have been developed, but are known to be very complex.

Another concern with any topography simulation tool is its' compatibility with other components of the process simulation environment. As described above, topography simulation is only one component of process simulation. In order to create a synergistic process simulation environment, tradeoffs should be made wherein the overall process simulation environment is improved. Such improvements may perhaps be to the detriment of one of the components of the process simulation environment.

It is an object of the present invention to provide a 3-D topography simulation tool that addresses the limitations of the CTS method. Further, it is an object of the present invention to have a solid representation created that is synergistic with other components of the process simulation environment.

SUMMARY

In a three-dimensional (3-D) topography simulation system where materials representing a workpiece are represented as solids, a method for creating a regular grid representation of a solid surface is disclosed. It is desirable to have regular triangular grid representations of a solid surface in order to minimize the introduction of error during the manipulation of the solids that occurs during the simulation. When initialy created, the surface of a solid may be comprised of a plurality of faces having varying polygonal shapes of non-uniform size. The method produces a more regular grid with faces shaped as triangles whose sizes are within a predetermined range.

For each polygon face on the solid surface, the method of the preferred embodiment is comprised generally of the steps of: removing any holes defined by the polygon face; placing a new edge between a first and second vertex of the polygon face; discarding the new edge if the new edge lies outside the polygon face or if the new edge intersects an existing edge of the polygon face; adding the new edge to the polygon face if the new edge does not lie outside the polygon face; identifying a triangle being created by the new edge and existing edges of the polygon; forming a new polygon face from the edges creating a triangle; and repeating the above steps until all polygon faces are triangulated. Once the triangulation of the polygons is completed, adjustments to the triangles is made in order to have only triangles of uniform size.

BRIEF DESCRIPTION OF THE FIGURES

FIGS. 12a–2c illustrate a plane reduction method for reducing the number of planes to be processed when utilizing an efficient method for vertex movement, as may be utilized by the preferred embodiment of the present invention.

FIGS. 12d14 12f illustrate the plane reduction method where reduction results in fewer than three planes, as may be performed by the preferred embodiment of the present invention.

FIGS. 16g–16h illustrate the method of particle flux shadowing as described with reference to FIG. 16a.

FIGS. 17a–7b illustrate a solid structure wherein direct vertex movement would result in an invalid self-intersecting structure.

FIGS. 22a–22b illustrate the creation of a deposition solid for a face in the object solid illustrated in FIG. 21a, as may be utilized within the preferred embodiment of the present invention.

DETAILED DESCRIPTION OF THE PREFERRED EMBODIMENT

A method for simulating changes to the topography of a Very Large Scale Integration (VLSI) wafer as it is being manufactured, is described. In particular, the present invention is directed towards a method for surface movement sweeping. Surface movement sweeping refers to a technique by which the creation of self-intersecting structures is avoided during the deformation of a solid. Various other inventive aspects of the preferred embodiment of the present invention are described and claimed in co-pending applications entitled "Particle Flux Shadowing For Three-Dimensional Topography Simulation", Ser. No. 07/904,001, filed Jun. 24, 1992, "Surface Sweeping Method For Surface Movement In Three-Dimensional Topography Simulation", Ser. No. 07/903,997, filed Jun. 24, 1992, "Generalized Solids Modeling For Three-Dimensional Topography Simulation", Ser. No. 07/903,524, filed Jun. 24, 1992, "A Method for Accurate Calculation of Vertex Movement for Three-Dimensional Topography Simulation", Ser. No. 07/903,983, filed Jun. 24, 1992, "A Method for Efficient Calculation of Vertex Movement for Three-Dimensional Topography Simulation", Ser. No. 07/904,006, filed Jun. 24, 1992, and "Boolean Trajectory Solid Surface Movement Method", Ser. No. 07/904,003, filed Jun. 24, 1992, all assigned to the assignee of the present invention. The preferred embodiment is directed towards both isotropic and anisotropic deposition and etch process steps as used in the manufacture of semiconductor devices. It would be apparent to one skilled in the art to use the present invention in the context of manufacturing other products, e.g. micro machines. Any product manufacturing process using VLSI type fabrication technology could be simulated by the preferred embodiment of the present invention.

In the following description, numerous specific details are set forth such as the effect of Boolean operations, etc., in order to provide a thorough understanding of the present invention. It will be apparent, however, to one skilled in the art that such detail is known to those skilled in the art and that the present invention may be practiced without these specific details. In other instances, well-known functions e.g. general solids creation, have not been described in detail in order not to unnecessarily obscure the present invention.

Overview of a Computer System in the Preferred Embodiment

The method of the preferred embodiment may be practiced on any commercially available computer system that supports three-dimensional (3-D) graphics. Preferably, the present invention is practiced on a microcomputer systems such as an IRIS ® Workstation, available from Silicon Graphics Corporation of Mountain View, Calif. or the RS/6000 Workstation available from the IBM Corporation of Armonk, N.Y. Of course, the present invention may also be implemented on a multi-user system while encountering all of the cost, speed and function advantages and disadvantages associated with these machines.

Figure 2:
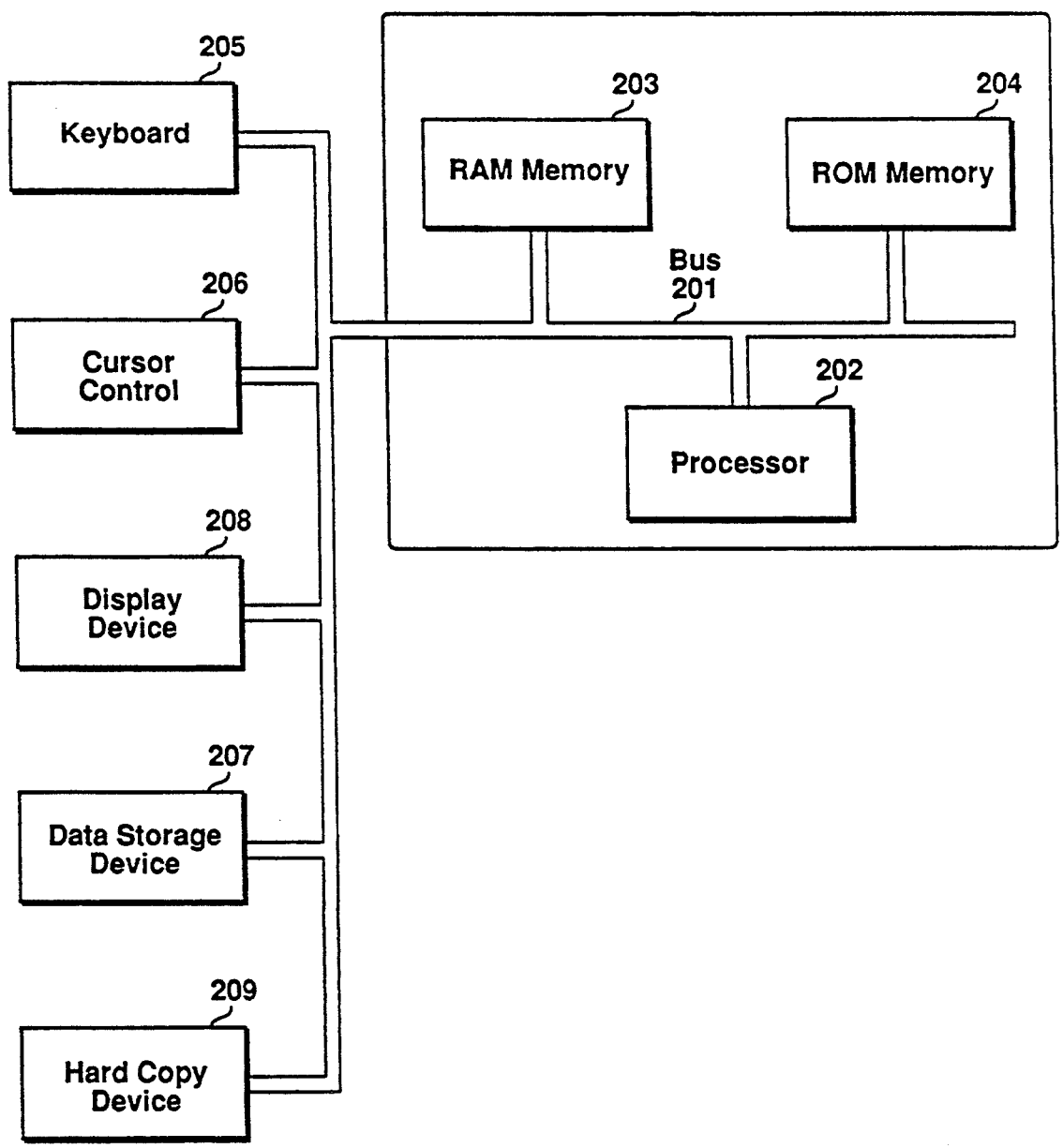
FIG. 2 illustrates a computer system on which the preferred embodiment of the present invention may be practiced.

Referring to FIG. 2, a computer system as may be utilized by the preferred embodiment generally comprises a bus or other communication means 201 for communicating information, a processing means 202 coupled with said bus 201 for processing information, a random access memory (RAM) or other storage device 203 (commonly referred to as main memory) coupled with said bus 201 for storing information and instructions for said processor 202, a read only memory (ROM) or other static storage device 204 coupled with said bus 201 for storing static information and instructions for said processor 202, a data storage device 207, such as a magnetic disk and disk drive, coupled with said bus 201 for storing information and instructions, an alphanumeric input device 205, e.g. a keyboard including alphanumeric and other keys coupled to said bus 201 for communicating information and command selections to said processor 202, a cursor control device 206, such as a mouse, track-ball, cursor control keys, etc, coupled to said bus 201 for communicating information and command selections to said processor 202 and for controlling cursor movement and a display device 208, preferably a display device capable 3-D graphics images for displaying the result of a process simulation step. Additionally, it is useful if the system includes a hardcopy device 209, such as a printer, for providing permanent copies of information.

The processing means 202 provides functions such as calculation of movement vectors and vertex movement, advancement of planes, performance of boolean set operations, surface sweeping, triangulation and grid adjustment and particle flux shadowing calculations. The data storage device 207 provides a means for storing representations of a workpiece as a solids model. Such functions and solids model representations are explained in more detail in the foregoing description.

Overview of the Topography Modeling Environment of the Preferred Embodiment

The preferred embodiment of the present invention extends known solid modeling functions to simulate the manufacture of semiconductor devices (i.e. process simulation). Solids modeling traditionally refers to Computer Aided Design (CAD) tools that facilitate the design or assembly of physical structures, e.g. buildings, that are more or less static in nature. Here solid modeling techniques are being extended and adapted to dynamic deformation of the material layers in a semiconductor wafer, in response to some provided stimuli (e.g. a process step).

A general solids modeler typically provides for the definition of solids as a collection of structural elements. Additionally, a general solids modeler may provide for creation of new or re-defined solids through the combination of one or more existing solids. Solids may also be redefined by movement of the vertex points defining the solid. In the preferred embodiment, the Geometric WorkBench (GWB) available from Helsinki University of Technology is utilized as the general solids modeling tool. However, the use of other solids modeling systems would not depart from the spirit and scope of the present invention. Any solids modeler system that characterizes objects utilizing features of the boundary representation model may be utilized.

Known solids modeler systems are not readily usable for simulating the manufacture of semiconductor wafers because they do not adequately simulate or describe the multiple materials comprising a semiconductor wafer. The preferred embodiment addresses this by supplementing the standard data structures provided in preferred solids modeler system. This is discussed in greater detail below. Further, the preferred embodiment provides for the generation of data that is used to simulate the changes in the topography of a semiconductor wafer.

Figure 3A:
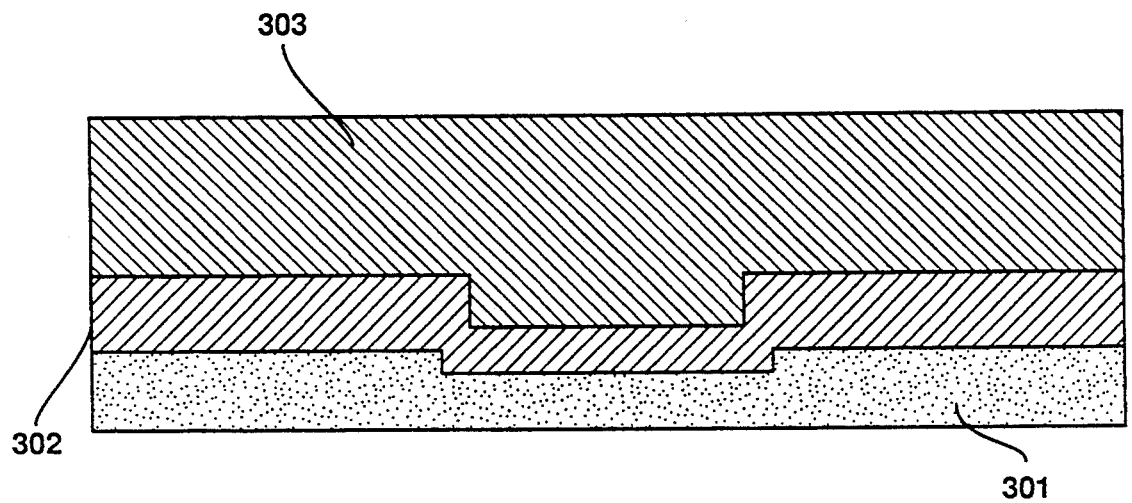
FIG. 3a illustrates a VLSI construct as a collection of material solids and an object, as may be utilized by the preferred embodiment of the present invention.

The representation of a VLSI construct as a collection of solids is illustrated in FIG. 3a. Each material which comprise the VLSI construct represented as a solid using the aforementioned boundary representation model. Referring to FIG. 3, a first object solid 301 represents a bottom layer e.g. a silicon layer and a second object solid 302 represents a second layer, e.g. a silicon dioxide layer. The airspace above the top surface material (object solid 302) is also defined as a solid, i.e. air solid 303. The deformation of the topography of a wafer is created by modifying an air solid and performing a boolean operation between the modified air solid and the material solid.

In representing the changes occurring to a material during a manufacturing step, movement vectors are calculated for vertices which belong to the air solid. As spatially varying process steps may be performed, the movement vectors for vertices in the air solid may vary. Accordingly, the air solid is deformed by the movement vectors. The calculation of the movement vectors for the vertices is described in more detail below. After this processing, the material object solids are redefined utilizing the aforementioned Boolean set operations.

Figure 3B:
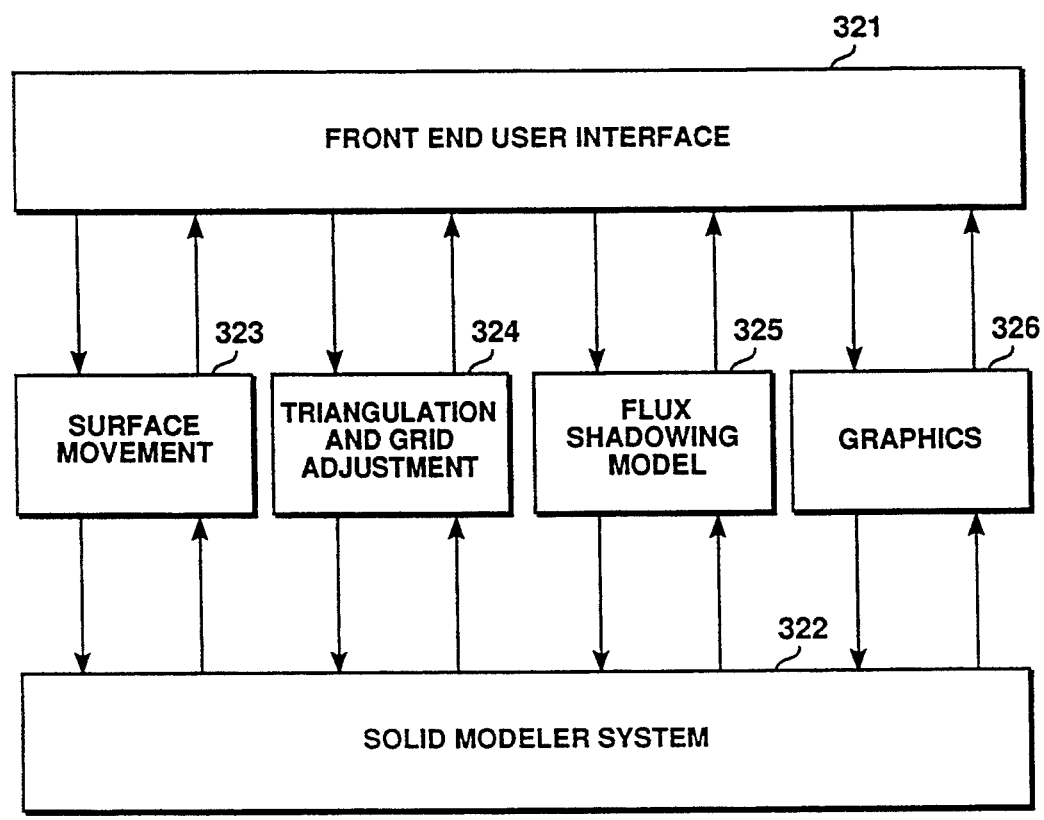
FIG. 3b illustrates the basic system structure of the preferred embodiment of the present invention.

FIG. 3b overviews the system structure of the preferred embodiment. A front-end user interface 321 provides the means by which a user communicates with operating software in which the present invention is embodied. A front-end user interface 321 is a combination of features provided by the operating system and the application software.

A solids modeler system 322 provides base functionality that will be used during topography simulation. Such functionality include utilities, data structures, and Boolean Set Operations. It should be noted that GWB utilities and Boolean Set Operations are premised on the boundary representation model. Thus, although the boundary representation model data structure may be supplemented, its organization cannot be changed. The boundary representation model data structure and Boolean Set Operations are described in more detail below.

Surface movement module 323, triangulation and grid adjustment module 324, flux shadowing model 325, and graphics module 326 are positioned between the user interface 321 and the solid modeler system 322. The surface movement module 323, takes input provided by the user to calculate movement vectors which are used in the deformation of object solids that simulate the different processing steps. Solid surface movement is discussed in greater detail below. Triangulation and grid adjustment module 324 provides for modifying the composition of the polygons making up one of the faces of an object solid. As will be discussed in greater detail, the faces of an object solid in the preferred embodiment are comprised of triangles. Flux shadowing module 325 provides specific functionality used in the calculation of a movement vector. Graphics module 326 provides the basic graphic routines for displaying the final structure after simulation of a process step.

Figure 4:
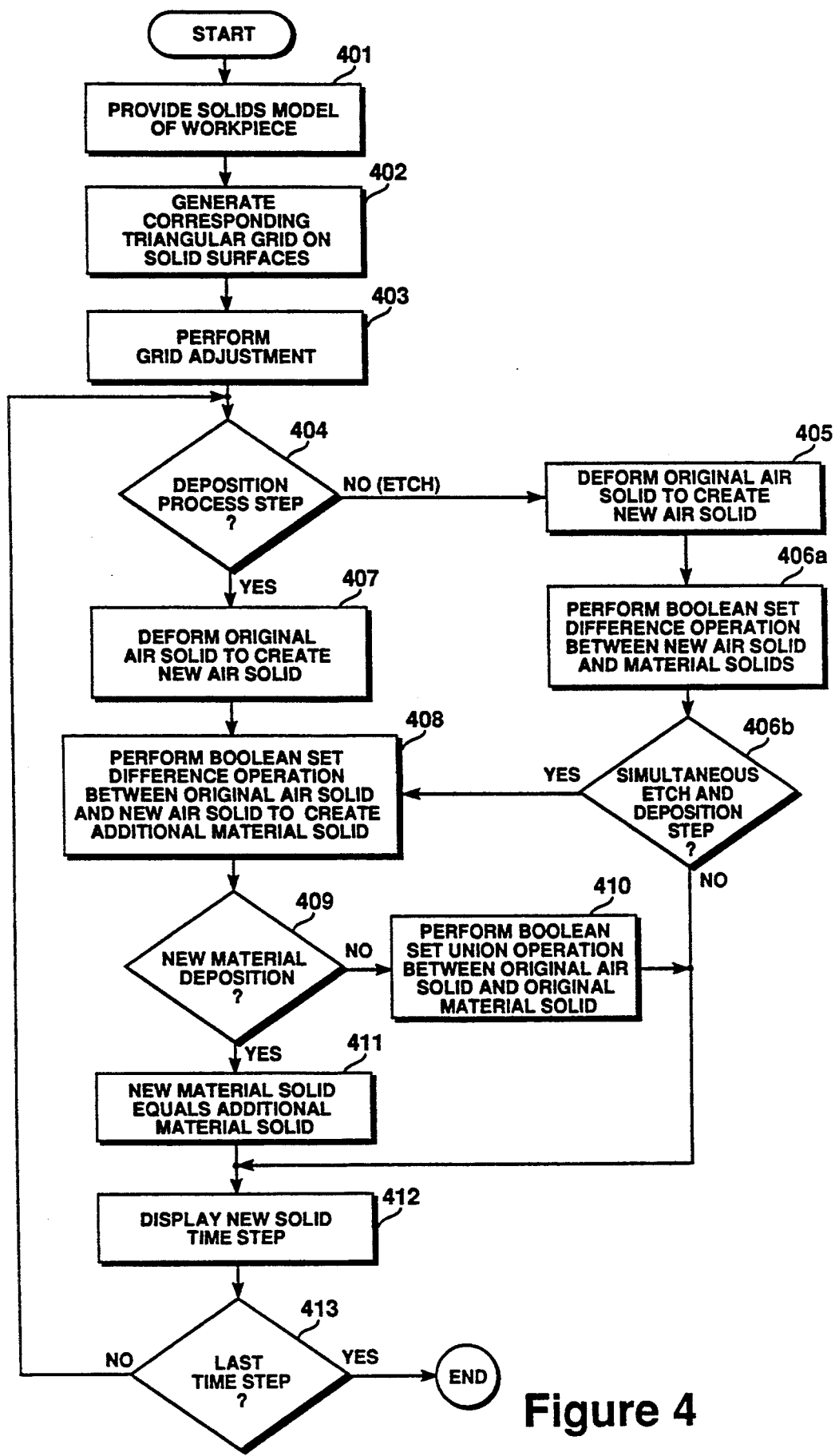
FIG. 4 is operational flowchart of the preferred embodiment of the present invention.

FIG. 4 describes the flow of operation of the topography simulator of the preferred embodiment. It should be noted that in the preferred embodiment, this is an iterative process. Therefore, the simulation of the process being performed will be occurring in a time stepped fashion. First, a model (or solids structure) of the wafer is provided, step 401. A model may be provided in one of two ways. If the structure is already created, it is a matter of loading the existing structure into a space in the computer memory. If the existing structure is 2-D, it must first undergo transformation to a 3-D structure. Such 2-D to 3-D transformations are known in the art. If the solid model structure has not been created, it is a matter of creating the 3-D solid model structure. The initial solid model structure is created via utilities provided by the solid modeler system.

As the faces of the structure must be comprised of triangles, triangulation step 402 is performed. Further, as the triangles must be of a specific size to provide required accuracy and precision, a grid adjustment is performed, step 403.

The particular type of process is then identified in order to determine the type of boolean operation to perform. This may be accomplished by determining if the process step is a deposition process step, step 404. If it is not a deposition process step, i.e. it is an etch process, the original air solid is deformed to create a new air solid, step 405. A boolean set difference operation is then performed between the created new air solid and the materials solids comprising the solids model, step 406a. It is then determined if the currently executing process step is a simultaneous deposition and etch step, step 406b. If it is a simultaneous deposition and etch and process step, the deposition portion of the process step is performed per step 408. If it is not a a simultaneous deposition and etch process step, a new solid structure of the wafer is displayed, step 412. It is then determined if the final timestep has been performed, step 413. If not, the process repeats starting at step 404. If it is the last timestep, the simulation for the process step is completed.

If the process step is a deposition, the original air solid is deformed to create a new air solid, step 407. It should be noted that the air solid deformation for a deposition and etch are different and unique to the process step being performed. In any event, once the new air solid has been created, a boolean set difference operation is performed between the original air solid and the new air solid to create an additional material solid, step 408. It is then determined if it is a new material deposition, step 409. If it is not a new material deposition, i.e. more of an existing top layer material is being deposited, a boolean set union operation is performed between the original air solid and an original material solid, step 410. Once this is completed, the new solid timestep is displayed per step 412 and a test for the last timestep is made per step 413.

If the deposition is a new material deposition, the additional material solid is converted into a new material solid, step 411. As before, the new solid timestep is displayed per step 412 and a test for the last timestep is made per step 413.

Boolean Set Operations

Figure 5A:
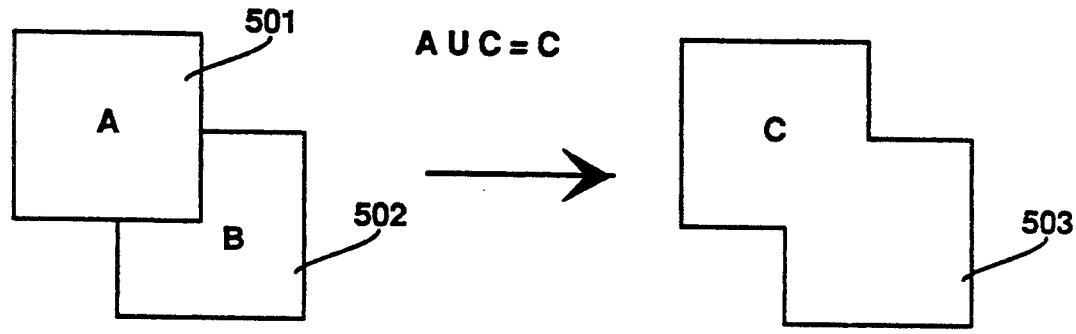
FIGS. 5a–5c illustrate boolean set operations as may be utilized by the preferred embodiment of the present invention.
Figure 5B:
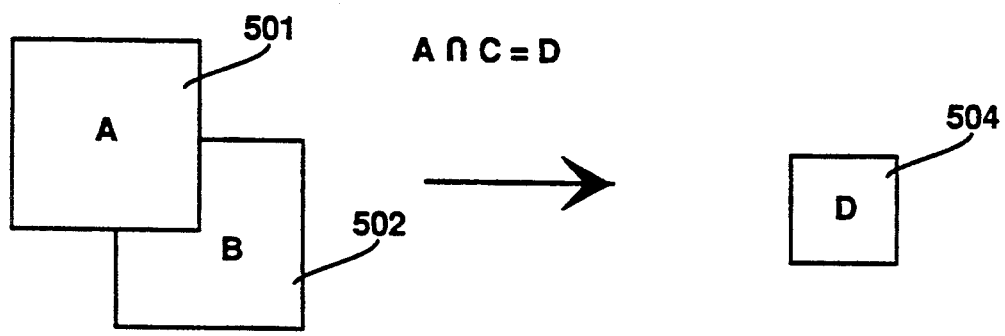
Figure 5C:
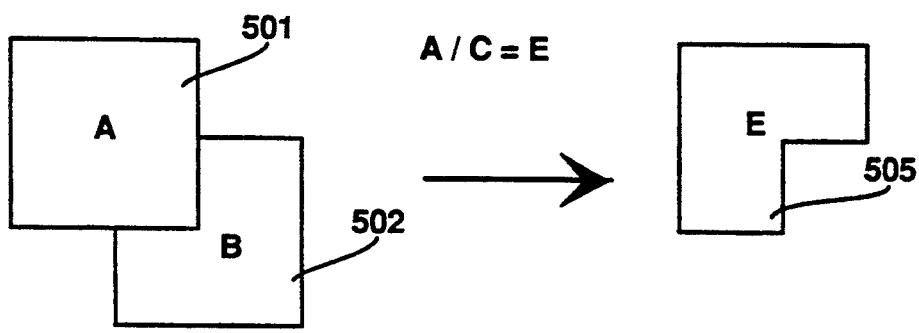

Boolean Set Operations are used to create a new solid or redefine an existing solid based on a relationship between two existing solids. Such Boolean Set Operations are described in the publication "An Introduction to Solid Modeling", Mantyla, Computer Science Press, 1988. FIGS. 5a–5c illustrate the effect of the Boolean Set Operations on pairs of solids in the preferred embodiment. FIGS. 5a–5c are 2-D illustrations, but it would be apparent to one skilled in the art to know that the same boolean set operations would work on 3-D solids of arbitrary shape. As such boolean set operations are known in the art, it is not necessary to describe how the function is performed, rather what is of interest is their effect. However, it is of note that in the preferred embodiment, the original object solids definitions may be either retained or discarded after the performance of the particular boolean operation. In the preferred embodiment, in some instances the original objects are discarded and one of the material solids is "deformed" or redefined as the newly created solid. In other instances, an entirely new solid material is created.

Referring to FIG. 5a, a union operation is illustrated. A solid 501 A and a solid 502 B are combined using the union operation to create the redefined solid illustrated as 503 C. In the union operation, the resulting solid is comprised of the entire area defined by the solids 501 A and 502 B. The redefined solid 503 C is a single solid which occupies the same space.

FIG. 5b illustrates an intersection operation. When solid 501 A is intersected with solid 502 B the result is the redefined solid 504 D. The intersection operation creates a redefined solid which is comprised of only those points which are common to both the solid 501 A and 502 B.

FIG. 5c illustrates the Boolean Difference Operation. When determining the Boolean Difference of solid 502B from solid 501 A, the redefined solid 505 E is the area of solid 501 A that is not common with solid 502 B.

As noted above with respect to FIG. 4, the simulation steps of the preferred embodiment are primarily comprised of the construction of an air solid followed by the combination of the air solid with one or more material object solids using boolean set operations.

Internal Representation and Data Structure of Solids

The material and air solids of the preferred embodiment are represented as polyhedrons. It is known in the art of 3-D graphics, to represent solids as polyhedrons. Polyhedron representations are used in that they provide sufficient information for such functions as hidden surface removal or shadowing. A polyhedron representation is typically constructed from a collection of 2-D polygons, where one or more polygons comprise a face of the polyhedron.

Figure 6:
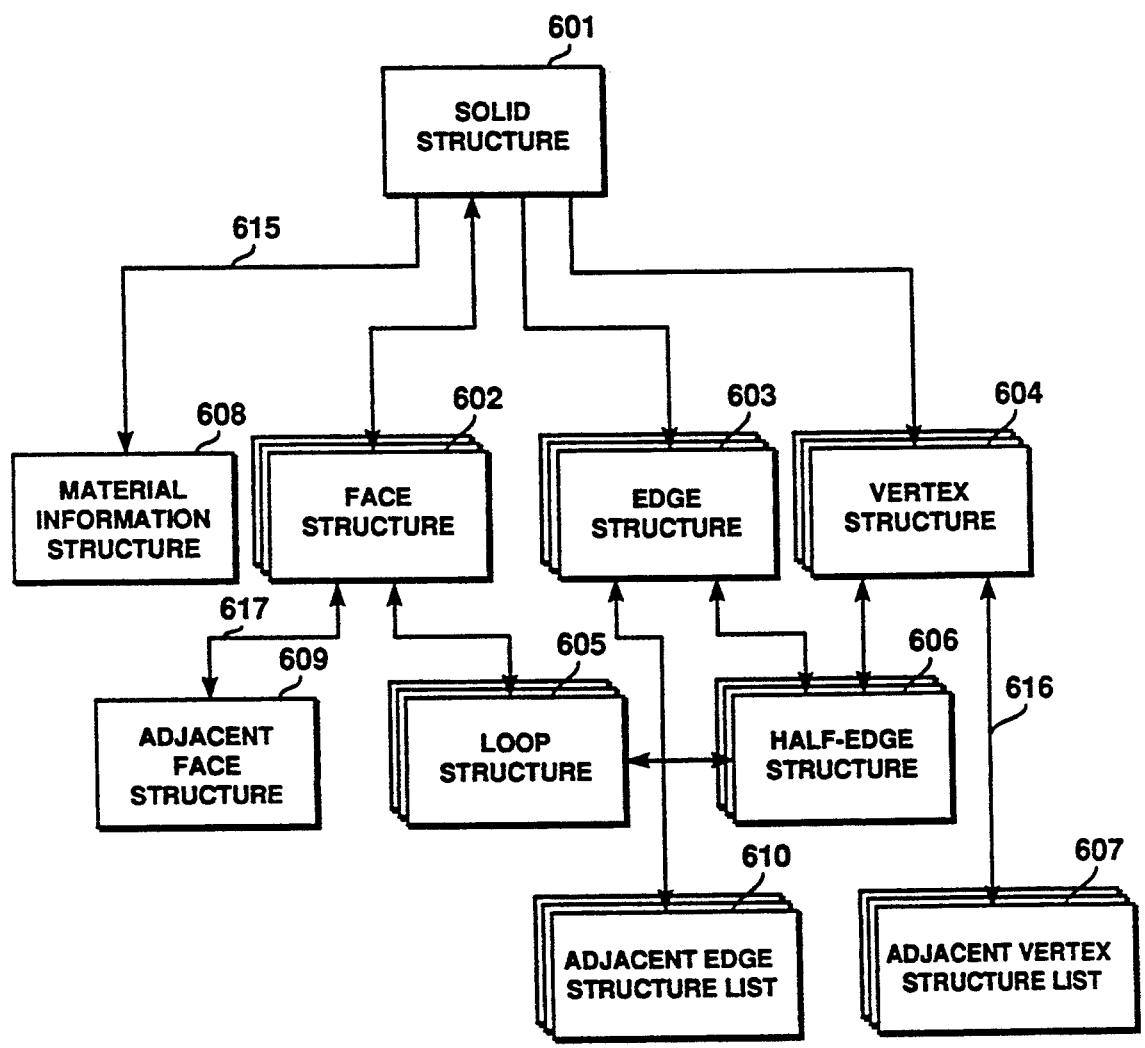
FIG. 6 illustrates a half-edge data structure for representing material solids as may be utilized by the preferred embodiment of the present invention.

The polyhedrons are represented within the system of the preferred embodiment using a boundary representation model. The boundary representation model as utilized in the preferred embodiment is termed a half-edge model and is described in the publication "An Introduction to Solid Modeling", Mantyla, Computer Science Press, 1988 (a definition of the basic data structures in the C programming language is provided at pages 163–170). In any event, FIG. 6 illustrates the basic data structure and extensions to the basic data structure of a solid in the preferred embodiment. An object is defined in terms of a hierarchy of structural elements. The basic structural elements defined in the preferred embodiment, include a solid structure 601, a face structure 602, an edge structure 603, a vertex structure 604, a loop structure 605, and a half edge structure 606. The solid structure 601 is primarily an entry point to other structural elements. It contains a solid identifier and a plurality of pointers to lists of the primitive structural elements defining the solid. It should be noted that pointers are well known data types used for referencing data. Thus, no further description of pointers is deemed necessary.

For any solid, there will be a plurality of face structure elements defined. The face structures 602 are organized as a doubly linked list. The face structure 602 contains pointers to the solid structure, an outer loop, previous and subsequent faces and to a list of loops. The outer loop defines the outer boundary of the face structure. The face structure 602 as defined in the Mantyla reference was supplemented to include a pointer 617 to an adjacent face structure 609 in an adjacent solid. It should be noted that the adjacent face structure 609 will have a pointer back to the face structure 602. Such a corresponding face may result when, for example, one material is deposited onto another material.

The edge structure 603 contains pointers to half-edge structures 606 and an adjacent edge structure 610. It should be noted that an edge consists of two haft-edges. Assuming an edge between vertex points A and B, a first haft-edge is defined as an edge running from A to B. A second half-edge is defined as an edge running from B to A. The need for distinguishing the types of half-edges will become more apparent in the description of loops. The adjacent edge structure list 610 is a list of adjacent edges in adjacent solids and is similar in use to the adjacent face structure 609.

The vertex structure 604 contains coordinates for vertex points with respect to a coordinate system and a pointer to a corresponding half-edge, of which the vertex is an endpoint, a subsequent vertex and a previous vertex. Like the edge structure 603, the vertex structure 604 has been supplemented to contain a pointer 616 to an adjacent vertex structure list 607. The adjacent vertex structure list 607 is a list of vertex points and corresponding solid identifiers.

The loop structure 605 contains a pointer to a list of half-edges, a previous loop, a subsequent loop and the face containing the loop. Two types of loops exist; inner loops and outer loops. As noted above, outer loops define the outer boundary of a face. An outer loop lists the half-edges defining the outer loop in a clockwise order. Inner loops define holes within the face. An inner loop lists the half-edges defining the inner loop in a counter clockwise order. As is apparent from the contents of the loop structure, loops are maintained in doubly-linked lists. This provides for easy traversai within a list of loops.

The half-edge structure 606 contains pointers to a parent edge, a starting edge, the loop in which the half-edge is contained, a previous half-edge and a subsequent half-edge. The half-edge structures are maintained as a doubly-linked list.

Finally, a material information structure 608 has been provided which contains information that is used in determining solid objects surface movement. The solid structure 601 contains a pointer 615 to the material information structure 608. The need and use of the characteristic parameter information will be described in more detail with respect to the calculations of the movement vector.

The added structures and pointer types have no impact on the solid modeling operations. This is because the pointers can be reconnected after a deformation calculation is performed. Therefore, the known solids modeling operations can be used without modifications.

Example of a Multimaterial/Multilayer Solid Structure

Figure 7A:
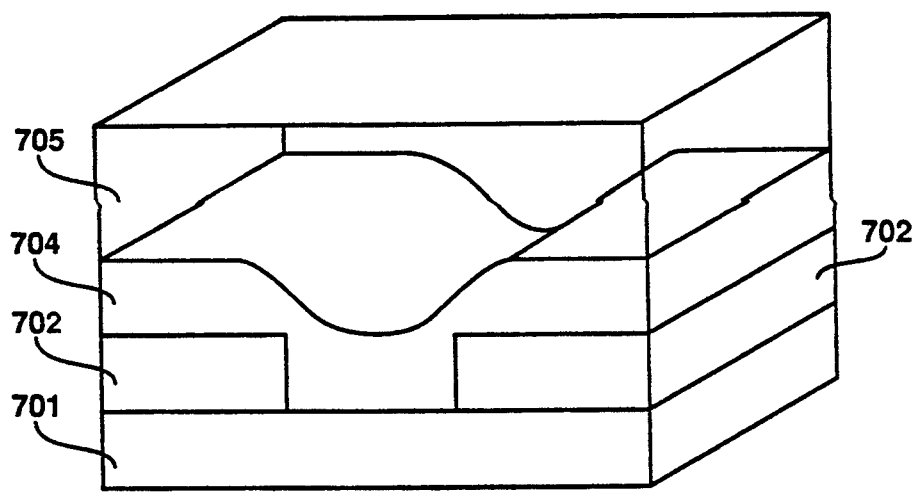
FIG. 7a illustrates a multilayer/multimaterial wafer construct and an air solid as may be simulated within the preferred embodiment of the present invention.
Figure 7B:
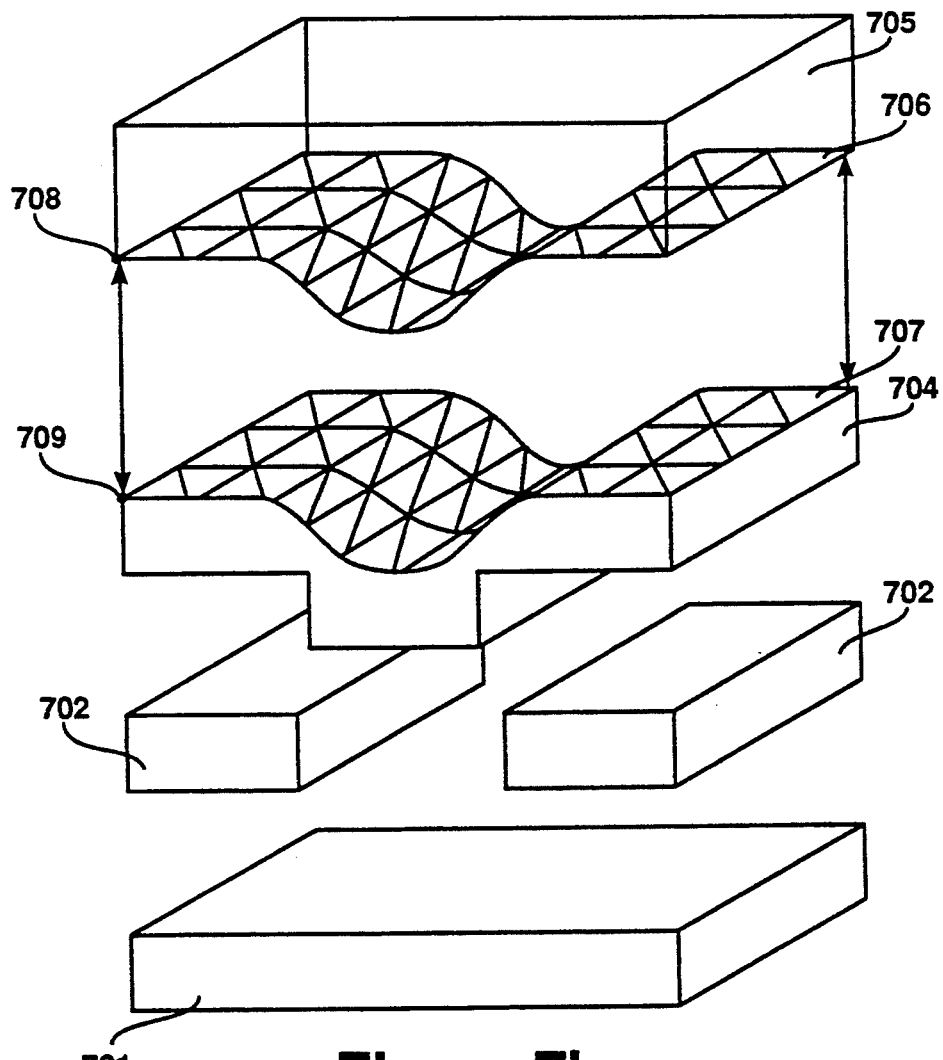
FIG. 7b is an exploded view of the wafer construct and air solid of FIG. 7a illustrating adjacent vertices and faces as may be utilized within the preferred embodiment of the present invention.

FIGS. 7a–7b illustrate a multimaterial/multilayer solid structure. FIG. 7a shows the structure with all the materials connected as would occur on a typical wafer. In FIG. 7a, a silicon solid 701 is a base layer, an oxide layer 702 is a second layer through which a hole is defined for metal layer 704 to come in contact with silicon layer 701. Finally, an air layer, 705 is a top layer for the structure. As will become more apparent with reference to FIG. 7b, a material layer may be comprised of one or more solids. Here, the oxide layer 702 is comprised of multiple solids. Referring now to FIG. 7b, an exploded illustration of the structure of the semiconductor wafer is illustrated. FIG. 7b illustrates the relationship between adjacent materials as provided in the preferred embodiment data structure. First, the air layer 705 defines a face 706 which is adjacent to a face 707 of metal layer 704. Further, the air layer 705 defines a vertex point 708 which is adjacent to a vertex point 709 defined by the metal layer 704. It should be noted that since each of these structures is 3-dimensional, a vertex point may have more than one adjacent vertex point.

It should also be noted that the adjacent faces and vertices on air layer 705 and metal layer 704 are identical. It is necessary that the adjacent faces and vertices be identical in order to facilitate the consistent description of the multimaterial/multilayer structure. This becomes readily apparent when it is noted that an air solid is subject to the same requirement. Thus, when a boolean operation is performed, uniform structures are compared.

Figure 7C:
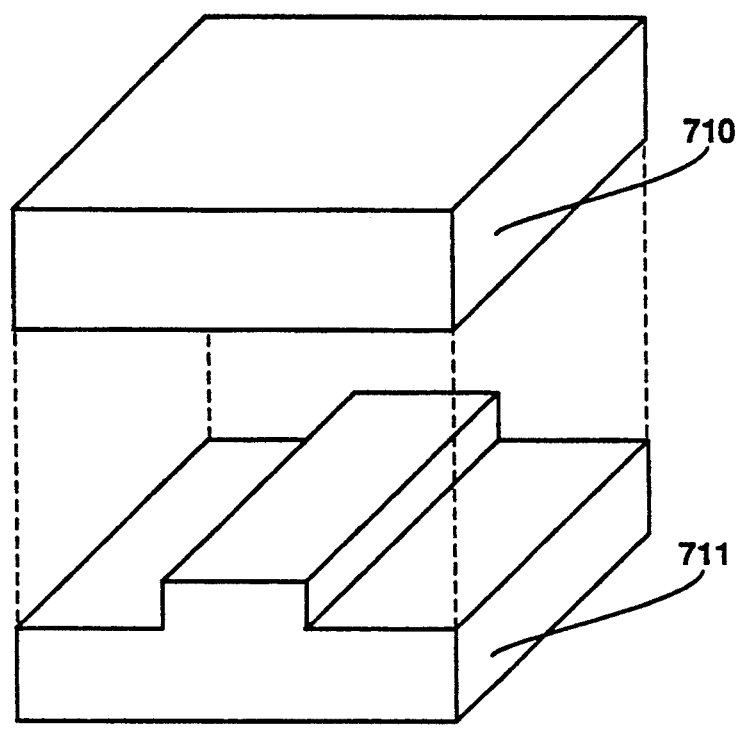
FIGS. 7c–7d illustrate the resulting shape of an added solid as constructed within the preferred embodiment of the present invention.
Figure 7D:
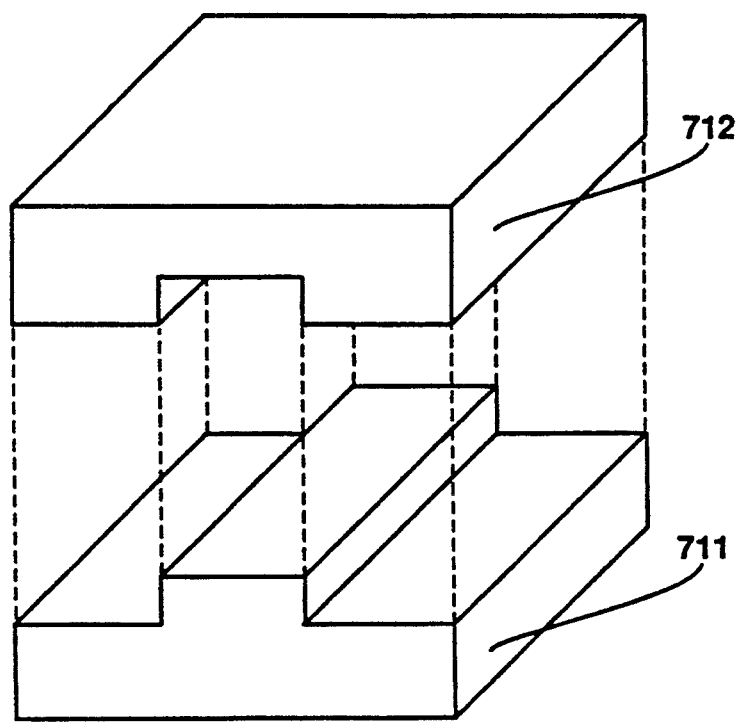

When a new material solid is added, new faces must be added to previously existing solids. This is because of the requirement that multiple material interfaces have identical face structures. Additionally, if a new material solid will overlap with an existing solid, the new material solid will conform to the existing solid, i.e. the existing solid has priority. This is illustrated in FIG. 7c. Here, an initial material solid 710, e.g. a photoresist is being added to an existing substrate 711. After the deposition step the initial material solid 710 will have a shape illustrated as 712.

To meet these requirements, a technique for adding solids is provided. The technique is premised on the fact that when a union operation between two solids is followed by a boolean set difference operation, the interface area will retain the face structure of the solid removed. The technique can be described as:

LOOP over all solids $S_i$:
1. NEW_SOLID′ = $(S_i$ U NEW_SOLID$)-S_i$
2. $S_i'$ = $(S_i$ U NEW_SOLID$)-$NEW_SOLID′
3. NEW SOLID = NEW_SOLID′
4. $S_i = S_i'$.

Lines 1 and 3 effectively place the face pattern of an existing solid onto a new material solid. As the variable NEW_SOLID′ will have the face pattern of the existing solid, lines 2 and 4 insures that the pattern is on the existing solid.

A second consideration is the construction of the air solid. An initial air solid is defined as having dimensions that would clearly occupy an airspace that is larger than the workpiece. The air solid is modified by first forming a temporary solid by performing a boolean set union operation of all existing solids. Not all solids touch each other so the loop must continue until the boolean set union operation is successful with all solids. The air solid is then created by performing a boolean set difference operation between the initial air solid and the temporary solid.

Triangulation and Grid Adjustment

In the preferred embodiment, a surface of a solid must be comprised of triangle faces. The reason for this will become apparent below in the description of surface movement. The solid modeler of the preferred embodiment creates solids which have surfaces that are comprised of polygon faces. This is typical for most solid modelers. Thus, a triangle face generation (grid generation) method is provided.

Methods for creating triangular faces from polygons are known in the art, e.g. Delauney tesselation. However, the method of the preferred embodiment is much simpler than those known in the art. FIG. 8 is a flowchart of the basic method. First, any inner loops which construct holes in the solid are deleted, step 801. Deletion is performed by inserting new edges between two vertexes belonging to the outer and inner loops, respectively. It has been determined that initial deletion of such inner loops simplifies subsequent processing.

New edges are then inserted between a vertex and its next nearest neighbor of the polygon surface being processed, step 802. It must then be determined if the new edge lies within the polygon or intersects the boundary defined by the polygon surface, step 803. If the new edge lies outside the polygon or intersects the boundary defined by the polygon surface, the potential new edge is discarded, step 804, and a new potential edge is inserted via step 802. If the potential new edge is within the boundary defined by the polygon surface, the new edge is added to the polygon, step 805. The steps 802≧806 essentially cause the the polygon faces to be divided into triangle faces. Next, it is determined if all faces have been triangulated, step 807. If not, steps 801–806 are repeated for the next face. If all faces have been triangulated, grid adjustment is performed, step 808.

Figure 8A:
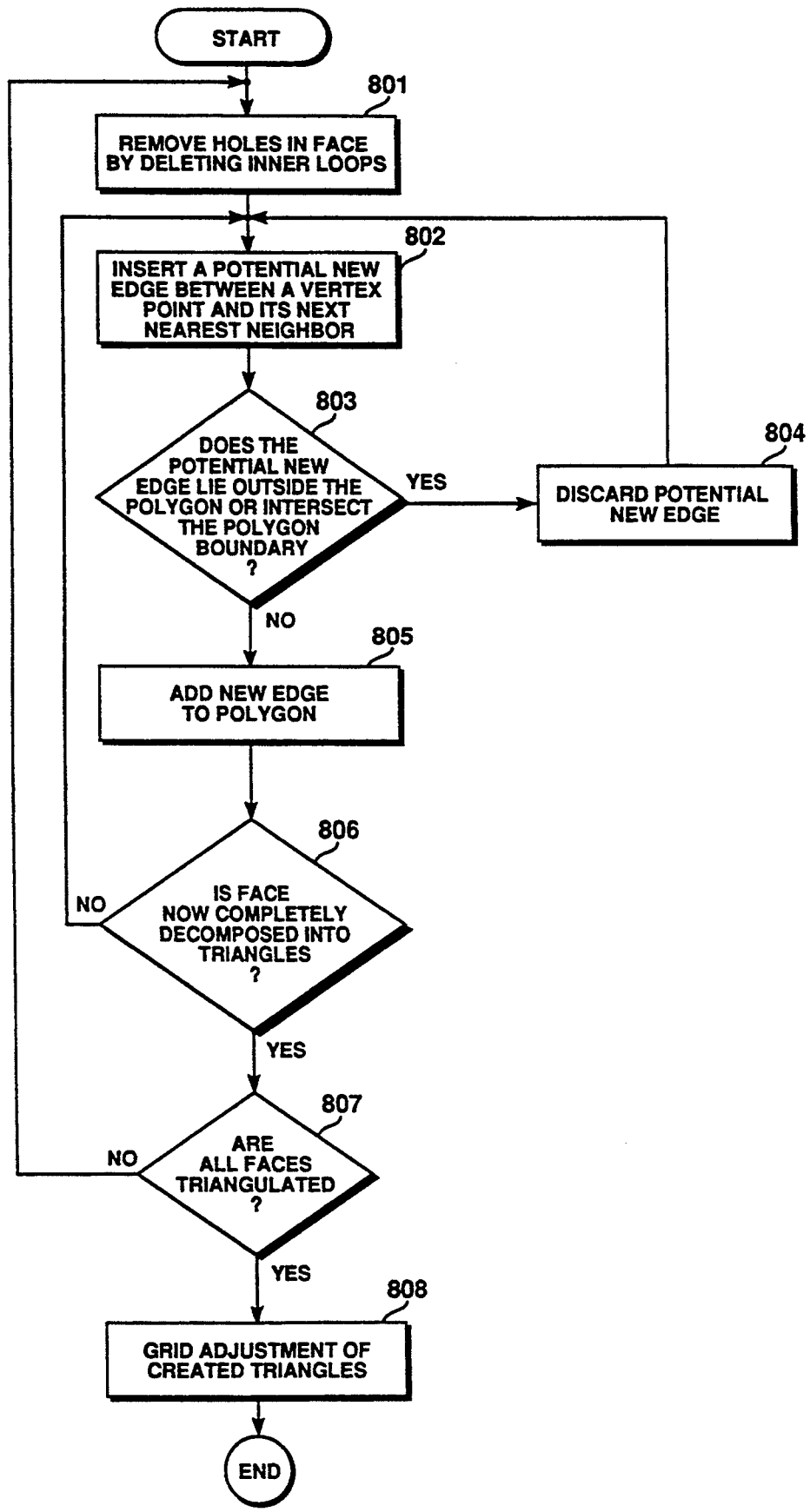
FIG. 8a is a flowchart outlining the steps for triangulation of polygonal faces of object solids as may be utilized within the preferred embodiment of the present invention.
Figure 8B:
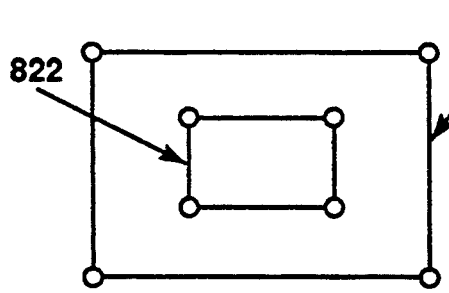
FIGS. 8b–8f illustrate the triangulation of a polygon square as may be utilized within the preferred embodiment of the present invention.
Figure 8C:
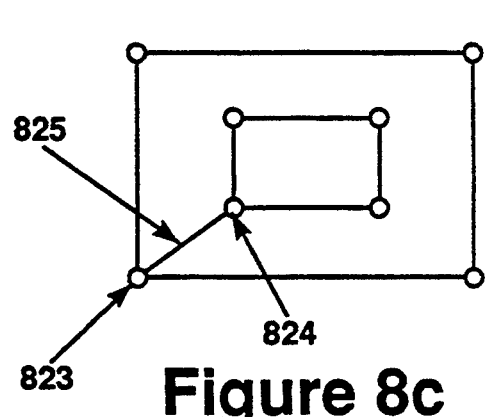

FIGS. 8b–8f provide an example of the triangulation method. Referring to FIG. 8b, a polygon face has an outer loop 821 and an inner loop 822. As described above, a loop structure is a doubly-linked list that contains a pointer to a ring of half-edges. As noted above, inner loops are deleted by inserting a new edge between a vertex point of the outer loop and a vertex point of the inner loop. Such a deletion of an inner loop is illustrated in FIG. 8c. Here, a new edge 825 has been inserted between the vertex point 823 of outer loop 821 and vertex point 824 of inner loop 822. This has the effect of including the half-edges defined by the inner loop within the ring of half-edges of the outer loop.

As described above, an edge structure is comprised of two half-edges. Thus new edge 825 is comprised of two half-edges. The reason for inserting half-edges is to facilitate the creation of new polygon faces (whose outer loop is comprised of a ring of half-edges). When a new polygon is created, one of the half-edges goes with the new polygon and one remains with the existing polygon.

Figure 8D:
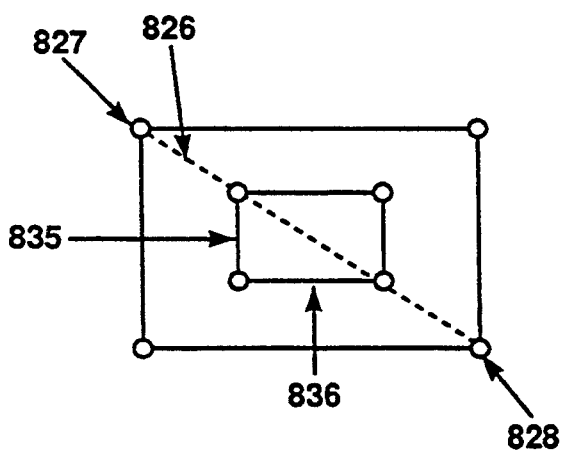

Referring now to FIG. 8d, a new edge 826 has been inserted between the vertex points of the polygon, here vertex points 827 and 828. In order for the new edge to remain, it must be determined that the new edge does not intersect the boundary of the polygon (i.e. the outer loop). As the outer loop now includes the half-edges of the inner loop, the new edge 826 intersects the half-edges 835 and 836. As the new edge 826 intersects the polygon boundary, the new edge 826 is discarded.

Figure 8E:
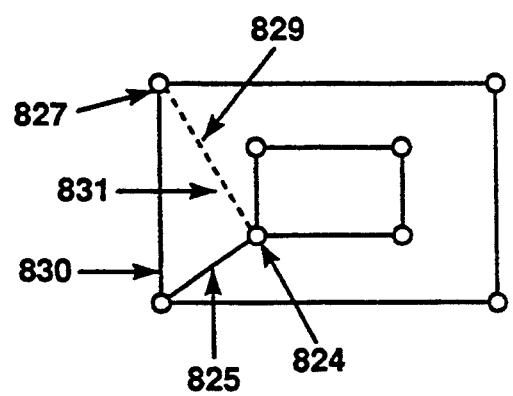
Figure 8F:
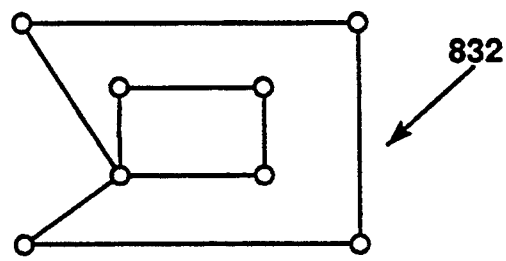

Referring now to FIG. 8e, a second new edge 829 is inserted between vertex points 827 and 824. Here, the new edge 829 does not intersect any half-edge in the outer loop. Further, a triangle 831 is defined. The triangle 831 will be comprised of one of the half-edges defined by each of the edges 825, 829 and 830. The triangle 831 will itself become a polygon face and the the triangulation process will continue with the polygon 832 illustrated in FIG. 8f.

Grid adjustment provides for restricting the size of the triangles. In the preferred embodiment three conditions will cause a grid adjustment operation to occur. These conditions are: (1) an edge exceeds a maximum edge length, (2) an edge is shorter than a minimum edge length, or (3) a triangle has a height below a predefined minimum. FIGS. 9a–9f are illustrative of grid adjustment operations that will occur responsive to the above conditions. It should be noted that many special conditions and exceptions arise during grid adjustment. Such special conditions and exceptions are not described in detail in order to not unnecessarily obscure the present invention.

Figure 9A:
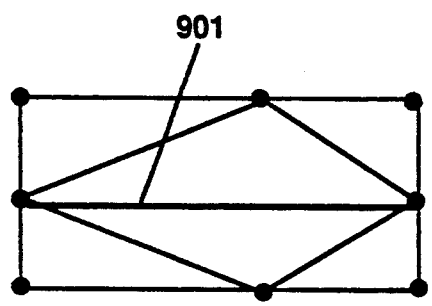
FIGS. 9a–9f illustrate grid adjustments that are made in the triangulation process of FIG. 8a as may be utilized within the preferred embodiment of the present invention.
Figure 9B:
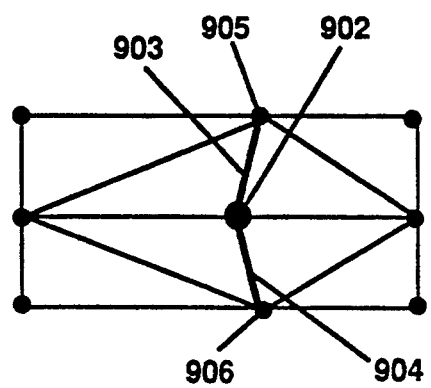

Referring to FIGS. 9a–9b, the case of a long edge is illustrated. Basically, the long edge is divided into two edges and two new edges are inserted, thus creating two additional triangles. In FIG. 9a, the edge 901 is of excessive length. In the preferred embodiment, if the edge length exceeds 160% of the nominal triangle size, it is excessive. Note that the nominal triangle size is provided as input to the process simulation. It would not depart from the spirit and scope of the present invention to choose a different edge length tolerance as excessive. FIG. 9b shows the corrective action taken. First, a new vertex point 902 is inserted at the middle point of edge 901. Next new edges 903 and 904 are created by connecting the new vertex point 902 and neighboring vertex points 905 and 906. The vertex points 905 and 906 are selected since they are points that were previously used to define triangles defined by the edge 901.

Figure 9C:
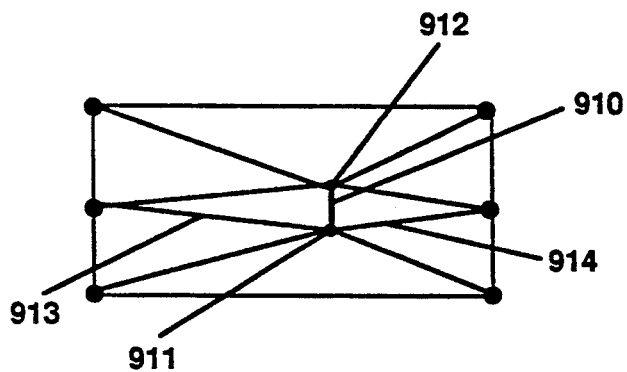
Figure 9D:
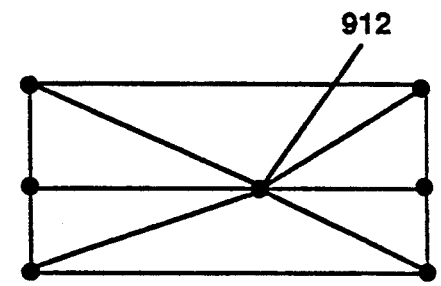

Referring to FIGS. 9c–9d, the case of a short edge is illustrated. Basically, the short edge is deleted along with two edges used to create adjacent triangles. In FIG. 9c, the edge 910 is too short in length. In the preferred embodiment, if the edge length is not at least 60% of the nominal triangle size, it is too short. It would not depart from the spirit and scope of the present invention to choose a different edge length threshold as a minimum. Further illustrated in FIG. 9c are vertex points 911 and 912 and edges 913 and 914. FIG. 9d shows the corrective action taken. First, the short edge 910 is deleted. This has the effect of deleting one of the vertex points, i.e. point 911, as well as two edges, i.e. edges 913 and 914 (illustrated in FIG. 9c). The vertex 912 then becomes a vertex for the triangles that previously included vertex 911.

It should further be noted that deletions of an edge will remove detail from the structure. Whenever alternative edges may be deleted, the edge(s) that would best preserve the shape of the original structure will be preserved.

Figure 9E:
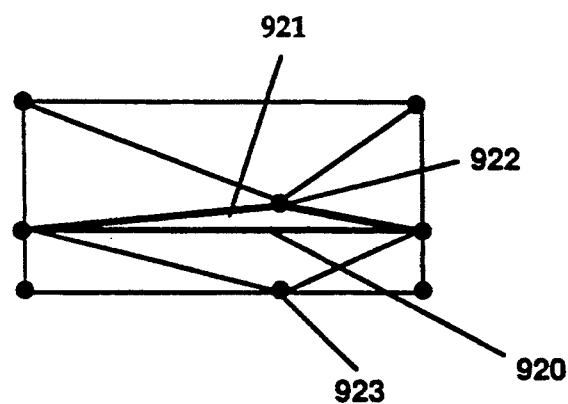
Figure 9F:
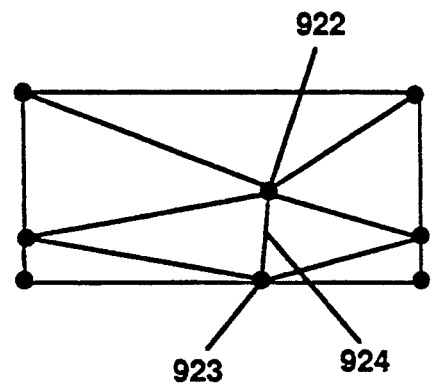

Referring to FIGS. 9e–9f, the case of a triangle with a short height is illustrated. Basically, one edge is deleted while another is inserted. In FIG. 9e, the height of the triangle 921 is below a minimum. In the preferred embodiment, if the height of a triangle is not at least 28% of the nominal triangle size, the height is too short. It would not depart from the spirit and scope of the present invention to choose a different height-threshold as a minimum. Further illustrated in FIG. 9e are vertex points 922 and 923 and edge 920. FIG. 9f shows the corrective action taken. First an edge of the triangle is deleted. Here the edge 920 has been deleted. In the preferred embodiment, the longest edge will be deleted. Next, a new edge 924 is connected between two other vertex points, here vertex points 922 and 923. The vertex points between which to create the new triangles is determined by examining vertex points associated with the triangles of the deleted edge.

These rules are repeatedly performed in the following order: (1) divide long edge, (2) delete short edges and (3) delete and insert edge for short triangles; until all threshold conditions are satisfied, or until a specified maximum number of iterations is reached.

Throughout this process, additional vertex, face and half-edge structures will be created for the solids structure. Additionally, adjacent vertex and face structures will be created. Creation of such structures and integration into the existing solids structure is known in the art. It should also be noted that in order to meet the requirement that at material interfaces the face structures be the same, the triangulation and grid adjustment described above will propagate to adjacent material structures.

Surface Movement

Surface Movement denotes the movement of the surfaces defining a material object solid in response to a process step. Surface movement is simulated by performing a boolean set operation between the air solid and one or more material solids. An important step in determining surface movement is the generation of movement vectors at the vertex points of the air solid. It is the direction and magnitude of the movement vector that are the direct correspondents of a particular deformation.

A 3-D unified equation is used to determine a deposition or etch rate at a particular vertex point in the direction normal to the surface. In conjunction, a particle flux shadowing calculation is also performed. This is used to insure that only contributions from visible portions of the source of deposition or etch are included in movement vector calculations. Next, one of a plurality of methods termed 3-D Plane Models, are used to calculate the actual movement vector for the vertex point. Finally, a surface movement sweeping method is used to cause the deformation of a surface. The surface movement sweeping method of the preferred embodiment prevents the creation of invalid, self-intersecting structures.

Deposition Using the Boolean Set Operations

Deposition is a process step where material is added. This may be either in the form of adding to an existing material solid or providing an entirely new material solid. In the deposition case, the new material solid is defined as:

New_material_solids = Initial_air_solid − New_air_solid

Redefined_material_solid =

-continued

Initial_material_solid $U$ New_material_solids.

Figure 10A:
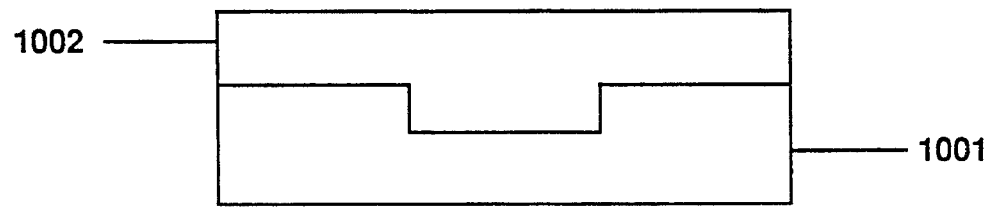
FIGS. 10a–10d illustrate a deposition process step adding to an existing material or adding a new material solid using boolean set operations as may be utilized by the preferred embodiment of the present invention.
Figure 10B:
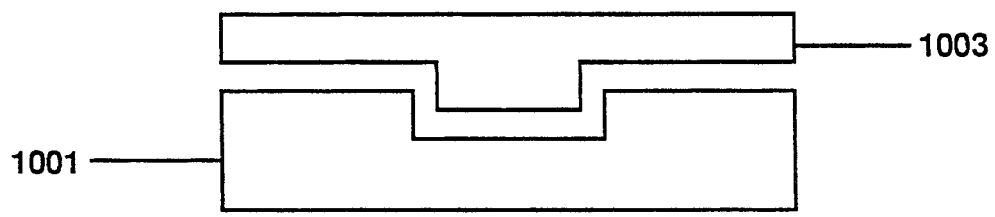
Figure 10C:
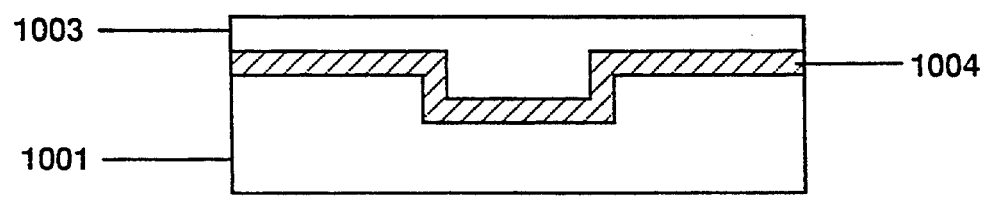

FIGS. 10a–10d illustrate a deposition example using the Boolean Set Operations. Referring to FIG. 10a, the initial condition of the wafer is illustrated. A material 1001 and an air solid 1002 are the only solids objects initially defined. Referring to FIG. 10b, a new air solid 1003 is defined based on a re-definition of air solid 1002. This new air solid 1003 is defined using the solid surface movement techniques as will be described in greater detail below. In any event, referring now to FIG. 10c, a new material 1004, is defined by taking the Boolean Difference between the air solid 1002 and the new air solid 1003.

Figure 10D:
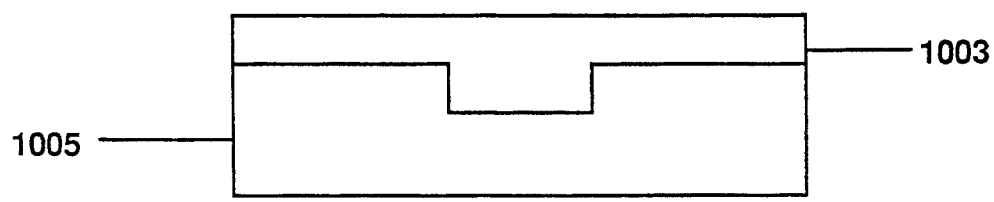

FIG. 10d illustrates the situation where the material 1001 and the material 1004 are the same material. When this occurs, a Boolean set union operation is performed on material 1001 and new material 1004 to creat material 1005. Otherwise, if material 1001 and 1004 are different, material 1004 remains as a distinct material solid.

Etching Using the Boolean Set Operations

Etching is a process step where portions of a material solid are removed. In the etching case, the redefined material solid is calculated as:

Redefined_material_solid =

Original_material_solid_ − New_air_solid.

Figure 10E:
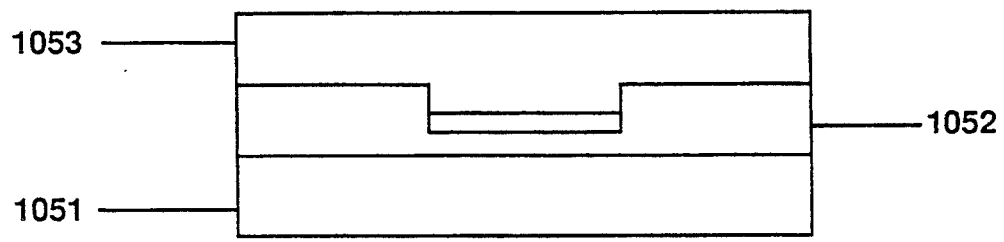
FIGS. 10e–10h illustrate an etch process step using boolean set operations as may be utilized by the preferred embodiment of the present invention.
Figure 10F:
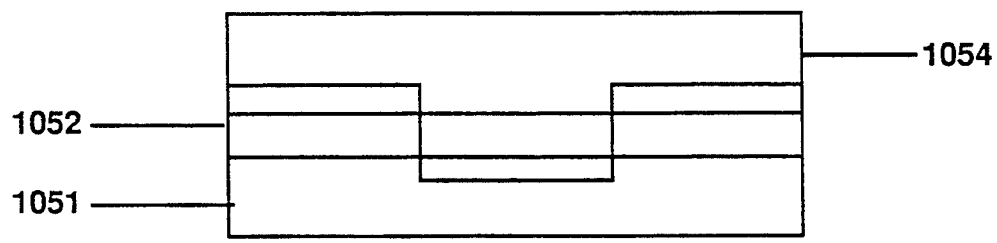

FIG. 10e–10h illustrates an etch example where a hole is created in an intermediate material. Referring to FIG. 10e, the initial state of the wafer is illustrated. A solid 1051 of material 1 is a bottom layer, a solid 1052 of material 2 is a top layer, and an air solid 1053 provides the air representation above the top layer 1052. Referring now to FIG. 10f, a new air solid 1054 is created using the surface movement methods described below. It should be noted that this new air solid 1054 extends through the material 2 solid 1052 and into the material solid 1 1051.

Figure 10G:
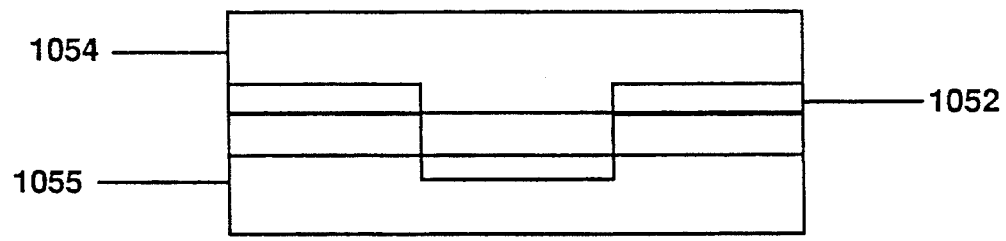
Figure 10H:
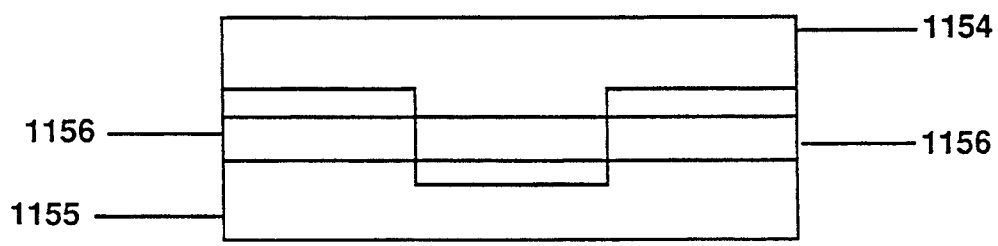

First, a new material 1 must be defined. Referring to FIG. 10g, a Boolean Difference Operation is taken with the original material 1 1051 and the new air solid 1054. This results in the new material 1 1055. Next, the effect on material 2 1052 must be demonstrated. Referring to FIG. 10h, a new material 2 1056 is created by taking a Boolean Difference of material 2 1052 and the new air solid 1054 This results in creation of a new material 2 1056 which defines a hole.

Simultaneous Deposition and Etching Using the Boolean Set Operations

For the case of simultaneous deposition and etching, both of the above-described methods are used in succession. The operation may be performed in any order.

In the preferred embodiment, each of the calculations is performed in a time-stepped fashion. Thus, a particular process operation will appear as a time lapse sequence performing the process operation.

3-D Unified Equation

A 3-D unified equation calculates either a local deposition, etch, or simultaneous deposition and etch rate, namely surface movement velocity for normal direction (trajectory), on a surface plane. A 3-D unified equation is extended from a 2-D unified equation. The basic concept and parameters are the same for both. Therefore, using the parameters extracted from experimental results of a 2-D test structure (line and space) using 2-D simulations, a complex 3-D profile can be simulated which will be able to predict 3-D results without 3-D measurements of experimental samples. This is desirable since 3-D experiment analysis is much more difficult than 2-D experiment analysis. The 2-D measurements and parameter fitting in two dimension are relatively easy and well-known in the art.

The unified equation treats deposition and etching reactions as a linear combination of an isotropic and some anisotropic and spatially varying components. The 3-D equation basically has 6 parameters (which are the same as for the 2-D unified equation). The 3-D unified equation is as follows:

$$V = A + B \cos \theta s + C \sin^2 \theta s \cos \theta s + D \int_{visible} \cos^n \theta \, u_i^* u_s \, d\Omega + E \int_{invisible} u_i^* u_s \, d\Omega$$

where A is an isotropic reaction parameter; B is a vertical reaction parameter; C is an angular dependent reaction parameter of the sputtering yield; D is an angular distribution of incident particles; $u_i^* u_s$ is the inner product of unit vectors $u_i$ and $u_s$; $u_i$ is a unit vector in the opposite direction of incident direction ray 1106; $u_s$ is a unit vector in the direction of surface normal 1105; n is a distribution coefficient of D and E is a reflection and redeposition factor. Further, $\int_{visible}$, refers to integration over solid angle $d\Omega$ for which "sky" (i.e. plasma or gas) is visible while $\int_{invisible}$ refers to integration over solid angle $d\Omega$ over which neighboring topography is visible. The need for the distinction between the two integrations will become more apparent below with respect to particle flux shadowing.

Figure 11:
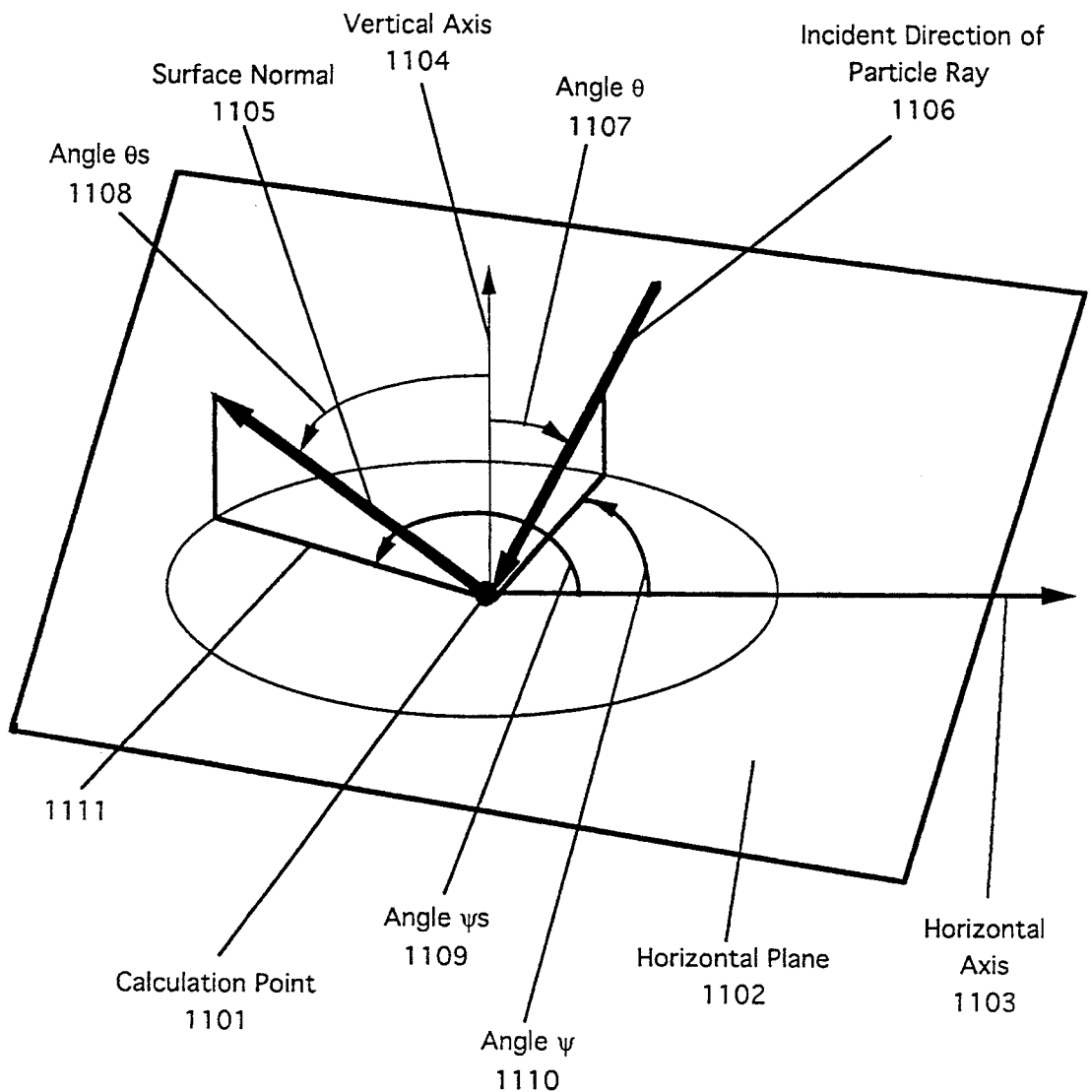
FIG. 11 illustrates the context for the variables of a 3-D unified equation for determining deposition or etch rates, as may be utilized within the preferred embodiment of the present invention.

The definition of the angle variables of the 3-D unified equation is illustrated in FIG. 11. Referring to FIG. 11, a calculation point 1101 is on a horizontal plane 1102. For orientation, a horizontal axis 1103, a vertical axis 1104, and a surface normal 1105 are illustrated. Angle $\theta$s 1108 is defined as the angle between the surface normal 1105 and the vertical axis 1104. Angle $\Psi$s 1109 is defined as the counter-clockwise angle between the horizontal axis and a surface normal projection extension 1111 that intersects the horizontal plane 1102. Further illustrated is a ray 1106 defining the incident direction of a particle. Angle $\theta$ 1107 is defined as the angle between the vertical axis 1104 and the ray 1106. Angle $\Psi$ 1110 is defined as the angle between the horizontal axis and the projection of the ray 1106 on the horizontal plane 1102.

The use of alternative equations to calculate a movement vector would not depart from the spirit and scope of the present invention. It is anticipated that different equations would be utilized, as they are dependent on unique characteristics of how the process step is being performed.

Calculation of Vertex Movement

The preferred embodiment of the present invention provides three methods of calculating vertex movement. A first method is focused on providing a quick, closely approximated result and is termed the efficient method. A second method is focused on providing a precise result and is termed the accurate method. The two methods are not mutually exclusive and it is anticipated that both methods be used together in a complementary fashion. A third method considers the case where an etch process step is being performed and the vertex being moved is at an interface of two solids with different etch rates.

In this description, vertex points refer to points that are common to two or more faces (i.e. planes). It is also important to note that the relationship between two faces intersecting at an edge can be characterized as either convex or concave. Generally, the relationship is convex if the angle between the two faces is greater than 180 degrees, and the relationship is concave if the angle between the two faces is less than 180 degrees.

Figure 1A:
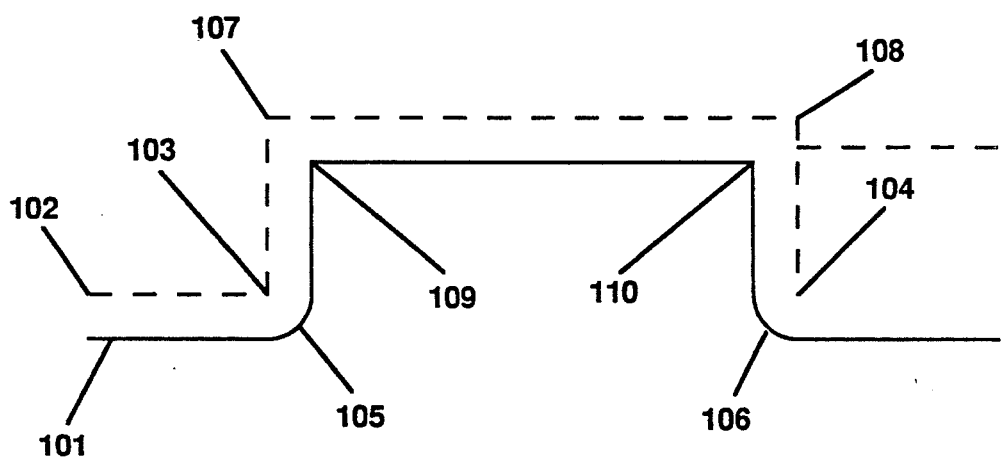
FIGS. 1*a*-1*c* illustrate distinct characteristic shapes resulting from deposition, etch and sputter etch process steps.
Figure 1B:
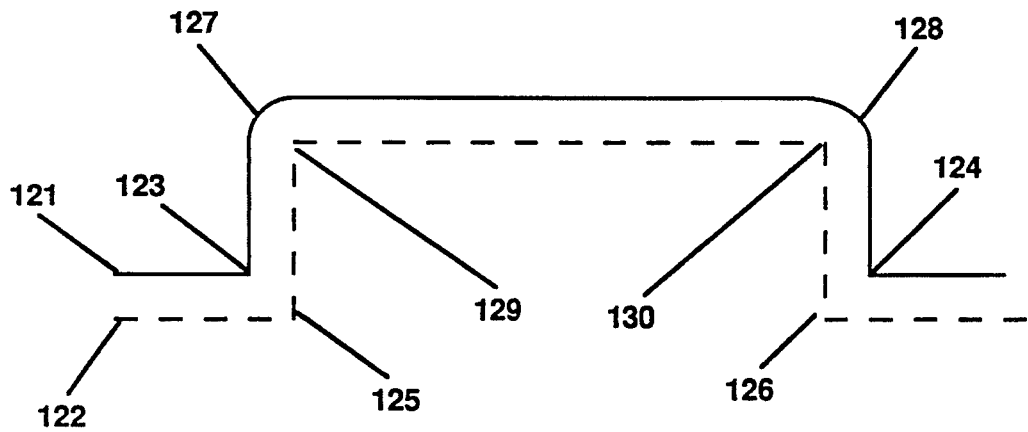
Figure 1C:
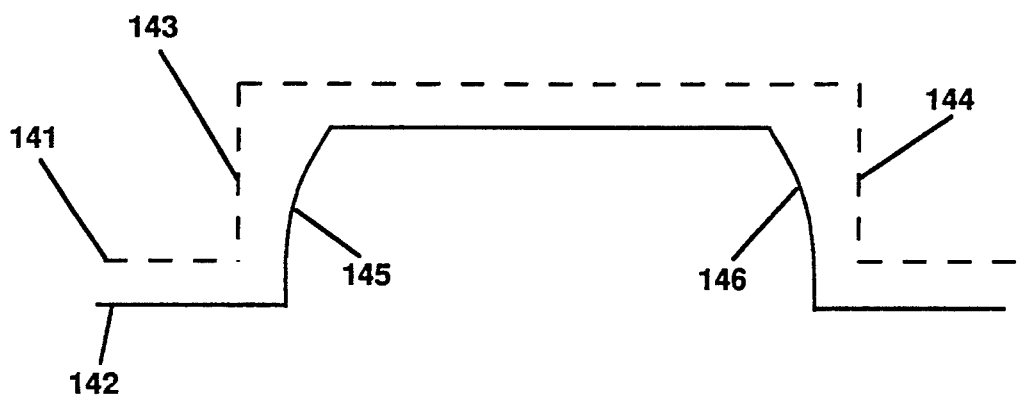
Figure 1D:
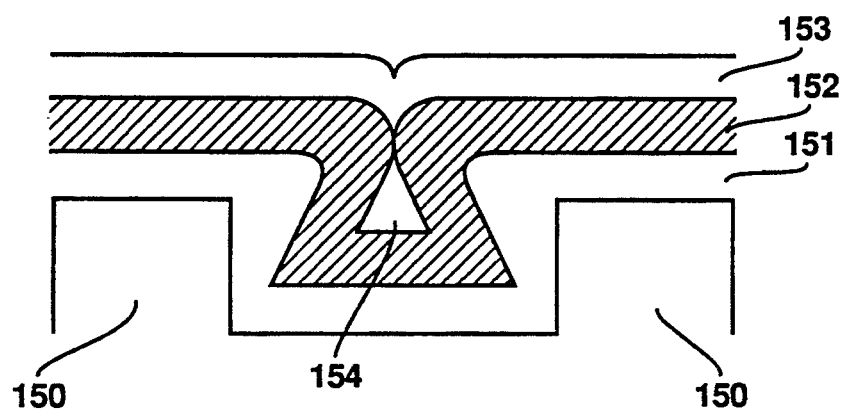
FIG. 1*d* illustrates a void created during a deposition process step.

At this point it is also important to note characteristic shapes at vertex points that occur as a result of various process steps. That such a shape occurs as a result of a particular process step is known to those skilled in the art of VLSI fabrication. In any event, they demonstrate the need for the vertex movement methods of the preferred embodiment. Such characteristic shapes are illustrated in FIGS. 1a-1c.

Finally, it should be noted that the calculation of movement of vertex points for surface normal angle dependent etch rates is complicated by the fact that the vertex is singular, i.e. no surface normal is defined at that point. The methods of the preferred embodiment are particularly well suited for addressing this problem. It should also be noted that the calculations described below are undertaken for each vertex point of a solid and for an individual timestep. In an actual simulation, these calculations may occur many times for an individual vertex point.

Efficient Method of Calculation

It should be noted that for a 3-D structure, a vertex may be surrounded by 1, 2, 3 or more planes. However, in the efficient method three or less planes are selected/created for performing the movement calculations. The three or less planes chosen approximate the actual structure at the particular vertex point. The selection/creation of the planes, when needed, is performed by analyzing the angle variances amongst the different planes at the vertex point. A first method, termed edge reduction, merges planes that are nearly co-planar. The merging process is repeated until no more than three planes remain.

A second method, termed plane reduction, identifies planes that have the least influence on the structure after movement, and omits them from further calculations. The plane reduction method generally involves the steps of:

1. Advancing each plane to find the intersection of each edge and each plane.
2. Finding the planes whose edges have a minimum number of intersection points.
3. Reconstructing the vertex shape by omitting the planes whose edges have a minimum number of intersection points.

These steps are repeated until no more then three planes remain.

Figure 12A:
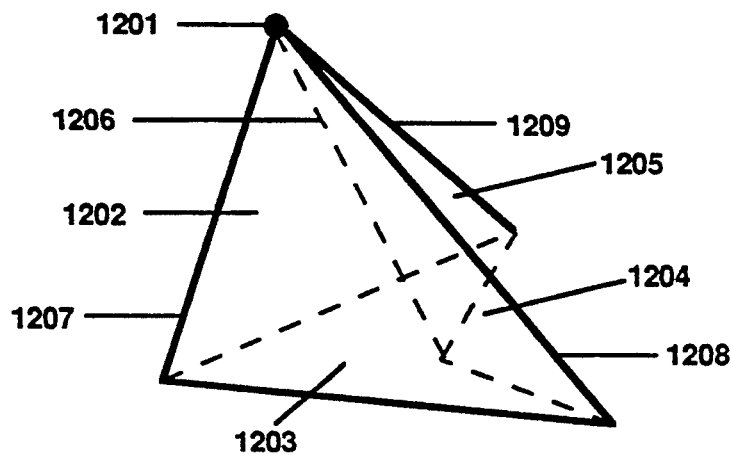
Figure 12B:
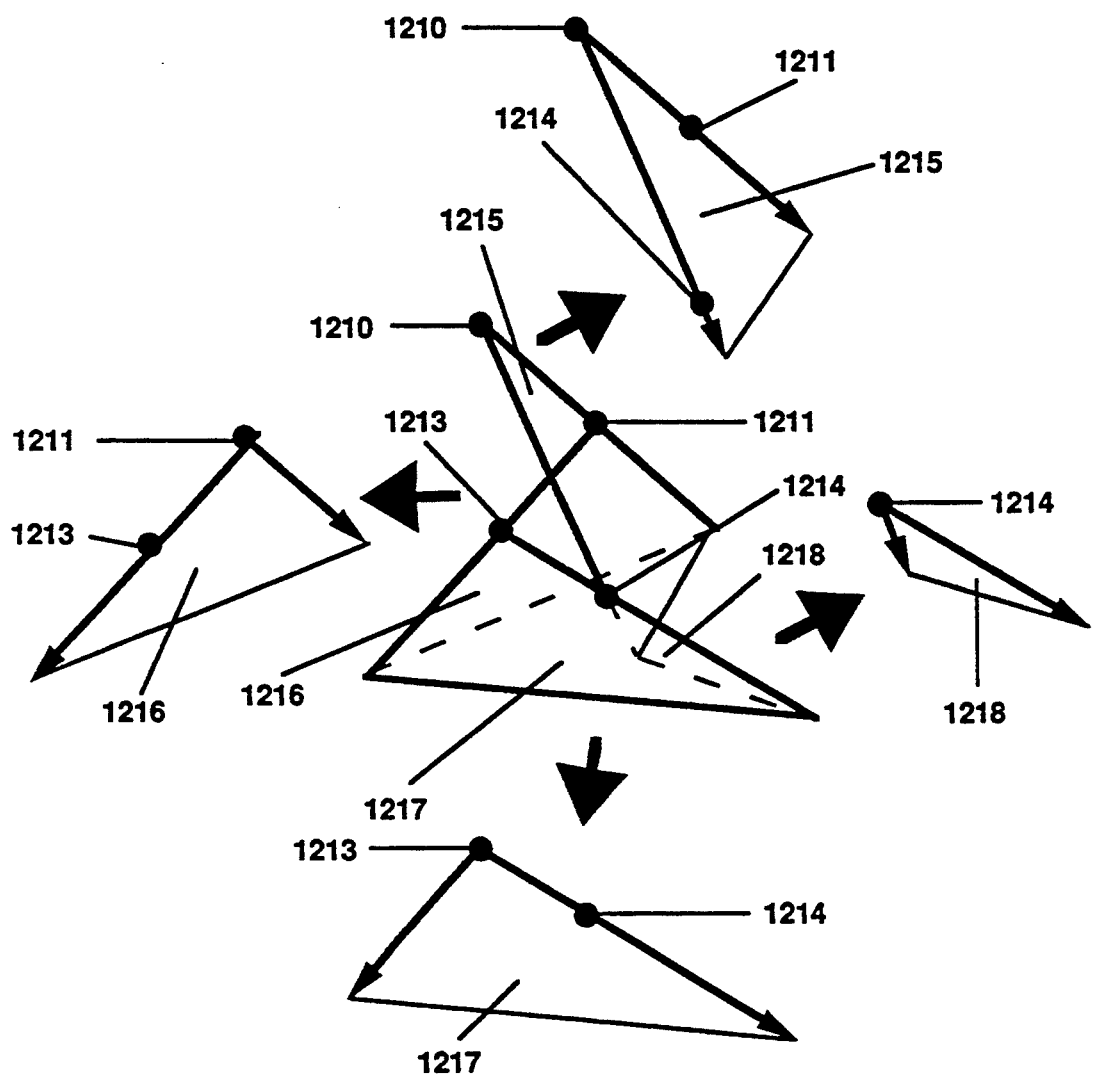
Figure 12C:
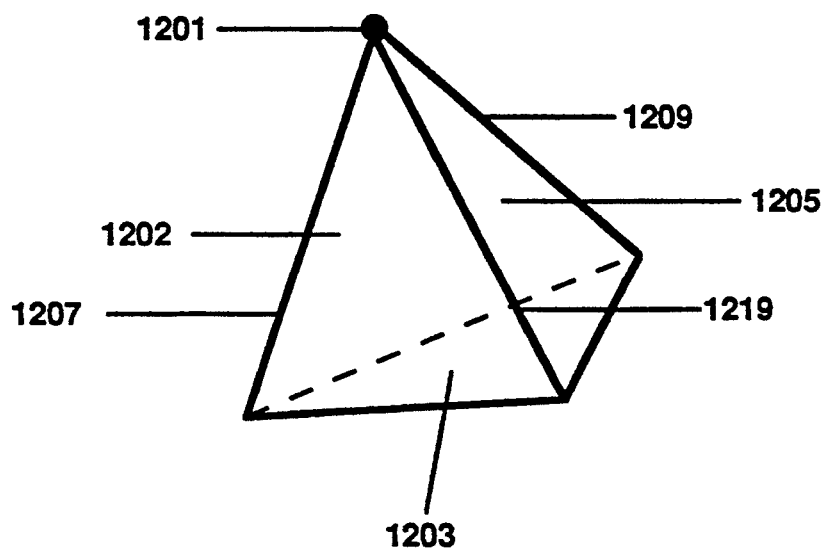

FIGS. 12a-12c illustrate the plane reduction method. FIG. 12a illustrates a vertex point 1201 with adjacent planes 1202-1205. Recall that the intersection of two planes defines an edge. So the edge 1206 is the intersection of planes 1204 and 1205, the edge 1207 is the intersection of planes 1202 and 1203, the edge 1208 is the intersection of planes 1203 and 1204, and the edge ! 209 is the intersection of planes 1202 and 1205. As noted above, a first step is to advance each plane to find the intersection of each edge and each plane. This is illustrated in FIG. 12b. Referring to FIG. 12b, the plane 1202 has moved creating plane 1216 with the vertex point moved to 1211. Similarly, the planes 1203, 1204 and 1205 have moved to create planes 1217, 1218 and 1215. The corresponding moved vertex points are 1213, 1214 and 1210.

First, each of the planes is advanced and edge intersection points with other advanced planes are identified. It has been determined that planes with fewer intersection points have a reduced influence on the change in shape of the final solid structure. This identification is illustrated in FIG. 12b. Here it is noted that each of the planes 1215-1218 are illustrated as extended from the created solid. In this example, the plane 1215 has two intersection points on its edges (1211 and 1214), the planes 1216 and 1217 each have one intersection point (1213 and 1214 respectively), and the plane 1218 has no intersection points. Thus, plane 1218 is omitted and planes 1215, 1216 and 1217 are selected as the representative planes for the structure.

Referring now to FIG. 12c, the vertex shape is reconstructed, omitting the plane 1204. This further results in the creation of a new edge 1219, which is the intersection of planes 1203 and 1205.

Figure 12D:
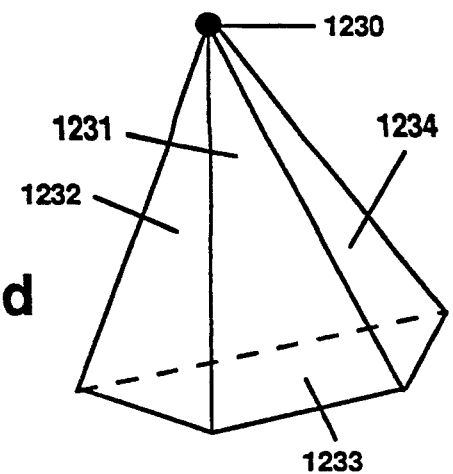
Figure 12E:
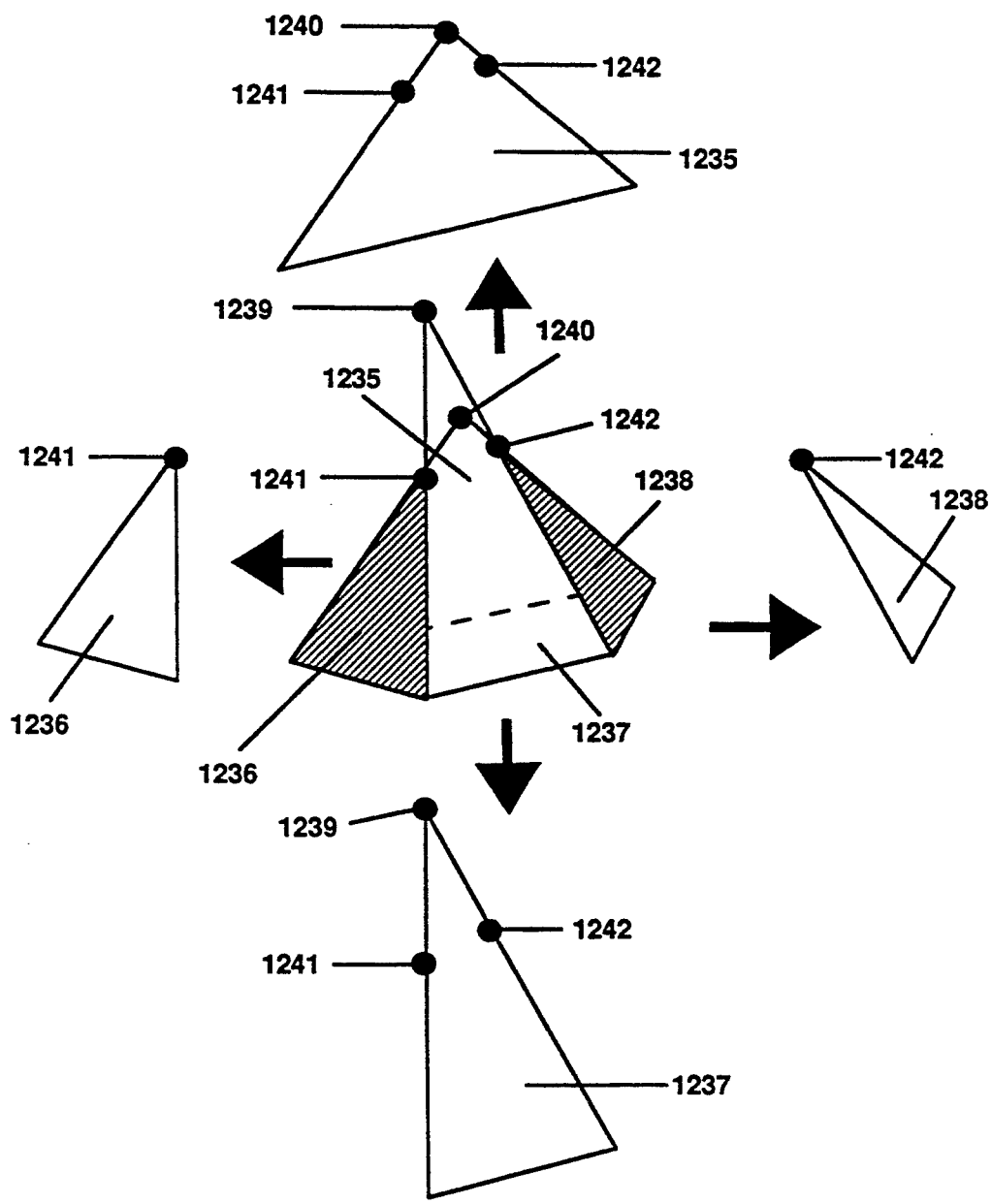
Figure 12F:
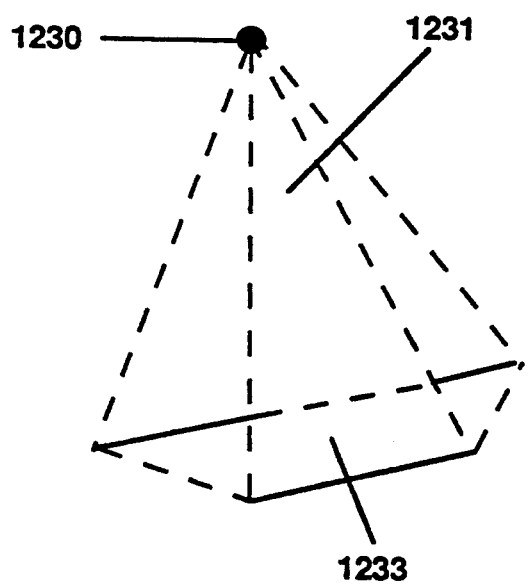

FIGS. 12d-12f provide an example of the plane reduction method where less than 3 planes are selected. Referring to FIG. 12d, a vertex point 1230 has adjacent planes 1231-1234. Note that the plane 1231 is behind the planes 1232-1234. As above, each of the planes is advanced. The result of this advancement is illustrated in FIG. 12e. FIG. 12e illustrates the advanced planes and the resulting intersection points. An advanced plane 1235 corresponding to plane 1231 of FIG. 12d, has moved vertex point 1240 and intersection points 1241 and 1242. Advanced plane 1236 corresponding to plane 1232 of FIG. 12d, has moved vertex point 1241 but no intersection points. Plane 1238 corresponding to 1234 of FIG. 12d, has moved vertex point 1242 but has no intersection points. Plane 1237 corresponding to plane 1233 of FIG. 12d, has moved vertex point 1239 and intersection points 1241 and 1242. As planes 1236 and 1238 have no intersections points, they will have little influence on the final advanced structure.

Referring now to FIG. 12f the vertex shape is reconstructed, omitting planes 1232 and 1234. Here, the resulting planes comprising the adjacent vertices are 1231 and 1233. It should be noted that they are no edges, i.e. intersections, between planes 1231 and 1233. Such results are anticipated and do not distort the result of the calculations.

Once the three planes have been constructed/generated, vertex movement is dependent on identifying characteristics of the vertex point and adjacent edges. A vertex point is identified as stable or non-stable and whether it is a saddle or non-saddle point. Edges are defined as either concave or convex. A vertex point is stable if the intersection of the advanced faces adjacent to the vertex are the same as the advanced vertex. In other words, the advanced vertex has a one to one correspondence to the initial vertex. This gives rise to a sharp corner. An unstable vertex does not have a one to one correspondence with an advanced vertex. For an unstable vertex the initial vertex would create multiple vertices, resulting in a rounded corner. A vertex point is identified as a saddle point if the edges adjacent to the vertex point do not have all convex or concave relationships. Conversely, a vertex point is a non-saddle point if the edges adjacent to the vertex point have all convex or concave relationships.

Figure 13A:
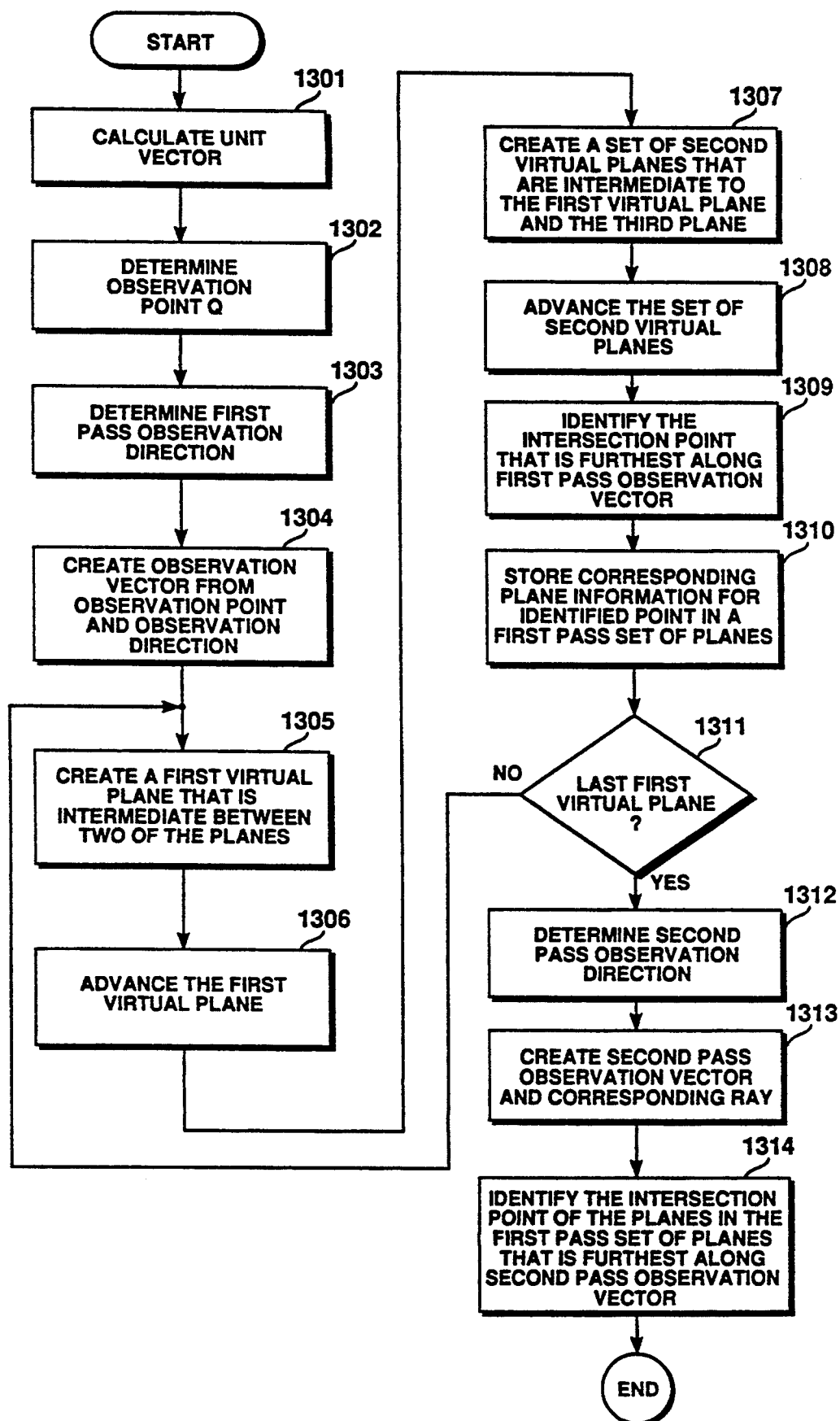
FIG. 13a is a flowchart illustrating an efficient method for determining the location of movement of a vertex, as may be utilized by the preferred embodiment of the present invention.

The method of the preferred embodiment is illustrated in the flowchart of FIG. 13a. It should be noted that several points and corresponding rays will be describe herein that are not actually created during the performance of the method, but are useful in explaining the method. Assume the vertex point under consideration is point A. First, a unit vector is calculated, step 1301. The unit vector is defined as the average of the normal vectors for each of the three planes. For purposes of explaining the method assume a point R in the opposite direction (180 degrees from) of the unit vector is projected. A ray AR is then created from the vertex point A to the point R. The reason for the creation of the ray AR is to provide a means by which a parallel ray starting from an observation point, can be created.

An observation point Q is then determined, step 1302. In most cases, the observation point Q is determined by advancing (or moving) the respective planes by an amount as determined in the 3-D unified equation described above. The observation point Q is defined as the intersection point of the three planes. It should be noted that the three planes will only intersect at one point. In the case where the vertex point is unstable and a saddle point, the observation point Q is defined as the tip of a movement vector whose direction is defined as the average direction of the two same edge vectors (i.e. both concave or convex), for the two planes forming the unstable uncommon edge (i.e. the single concave or convex edge), along the third plane. In the preferred embodiment, the magnitude of this movement vector is derived from a 2-D calculation described in an article by S. Tazawa, et al., published in the *Symposium of VLSI Technology*, pg. 24, May 1989, termed the 2-D DEER calculation for the two planes forming the first unstable edge. A first pass observation direction is then determined, step 1303. The first pass observation direction depends on the relationships between each of the pairs of faces, i.e. convex or concave. Table A illustrates the various relationships and the corresponding observation direction in the first and second passes.

TABLE A

| OBSERVATION DIRECTION CALCULATION | | | | |
|---|---|---|---|---|
| | CV-CV-CV | CX-CX-CX | CV-CX-CX | CX-CV-CV |
| FIRST PASS | + | − | − | + |
| SECOND PASS | + | − | + | − | where:
CV: refers to a concave edge.
CX: refers to a convex edge.
+: the same direction as the unit vector
−: the opposite direction of the unit vector.

An observation vector is then defined with the observation points as the start point and in the first observation direction, step 1304. Again, for the purpose of explaining the method, assume a point P is projected to create a ray QP that is parallel to the ray AR. In situations where the vertex points are stable, the location to which the point A would move is somewhere along the ray AR. It should be noted that the terms "ray QP" and observation vector are synonymous and refer to the same entity. The remainder of the method is focused on determining exactly where along the ray QP that the vertex point A will move.

A first virtual plane is then created between two of the created three planes, step 1305. In the case in which the vertex is unstable, the two planes forming the first unstable edge are chosen. The first virtual plane is one of many that will be created and processed between the two selected plane. Next, the first virtual plane is advanced, step 1306.

A set of second virtual planes that are intermediate to the created first virtual plane and the third previously unselected plane are created and advanced, step 1307. This set of second virtual planes are than advanced, step 1308. From the set of second virtual planes and the first virtual plane, the plane that intersects the ray QP the furthest in the direction of the ray is identified, step 1309. The plane is then stored in a set of planes identified in the first pass, step 1310.

It is then determined whether or not the last first virtual plane has been created, step 1311. The number of first virtual planes created is definable by the user. The greater the number of first virtual planes, the greater the accuracy in the simulation. When the last first virtual plane has been created and a set of first pass planes created, the first pass is complete. It should be noted that in this method a comprehensive set of planes has been analyzed with respect to the first pass observation vector. The second pass is then initiated.

The second pass begins by determining the second pass observation direction, step 1312. The second pass observation direction can be determined from Table A. Only in the case where the vertex point is a saddle point, will the second pass observation direction reverse. In any event, a second pass observation vector and corresponding ray are created, step 1313. Finally, the intersection points of the planes from the first pass set of planes and the second pass observation vector are determined, step 1314. The intersection point that is furthest along the second pass observation vector is defined as the movement point for the vertex point A.

It should be noted that the method of the preferred embodiment describes one technique where all the planes intermediate to the three planes, are analyzed with respect to a first observation vector. Alternate means for identifying and presenting such intermediate planes would not depart from the spirit and scope of the present invention. It should also be noted that it is only necessary to have two passes for the cases where a saddle vertex point is being moved. The two pass method described above is a general method that works for all cases. It would be apparent to one skilled in the art to have a method where the two cases are treated differently.

Figure 13B:
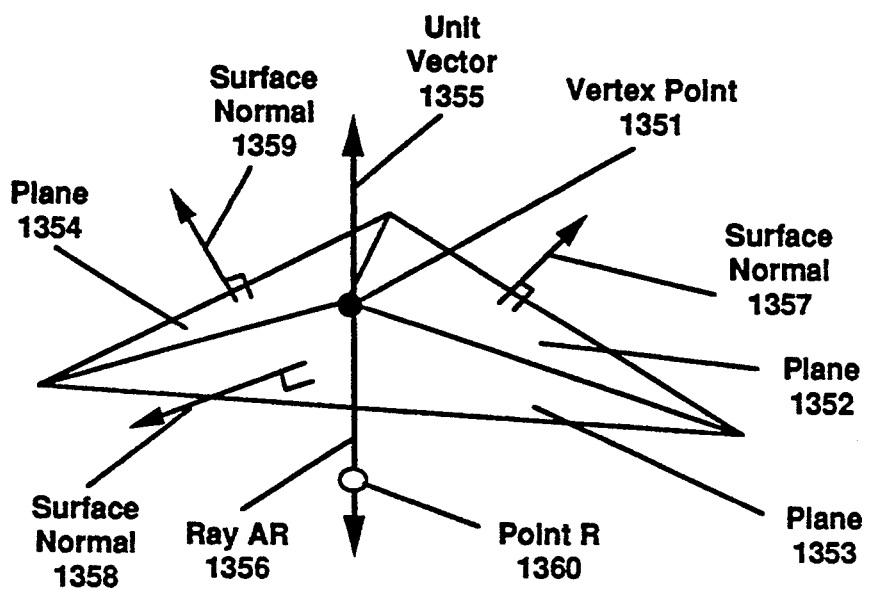
FIGS. 13b–13e illustrate the efficient method for determining the location of movement of a vertex, as may be utilized within the preferred embodiment of the present invention.

An example for the situation where the vertex points are stable and not saddle points is illustrated in FIGS. 13b–13e. Referring to FIG. 13b, a vertex point 1351 for three planes 1352–1354, respectively, are illustrated. The relationships between the three planes 1352–1354 are all convex. Assuming a deposition process step, each of the three planes 1352–1354 has a surface normal 1357–1359, respectively. As described above, a unit vector for the vertex point 1351 is calculated. The unit vector is the average of the normal vectors of the three planes. A unit vector 1355 is illustrated. A point R 1360 in the opposite direction of the unit vector 1355 is defined, creating ray AR 1356.

Figure 13C:
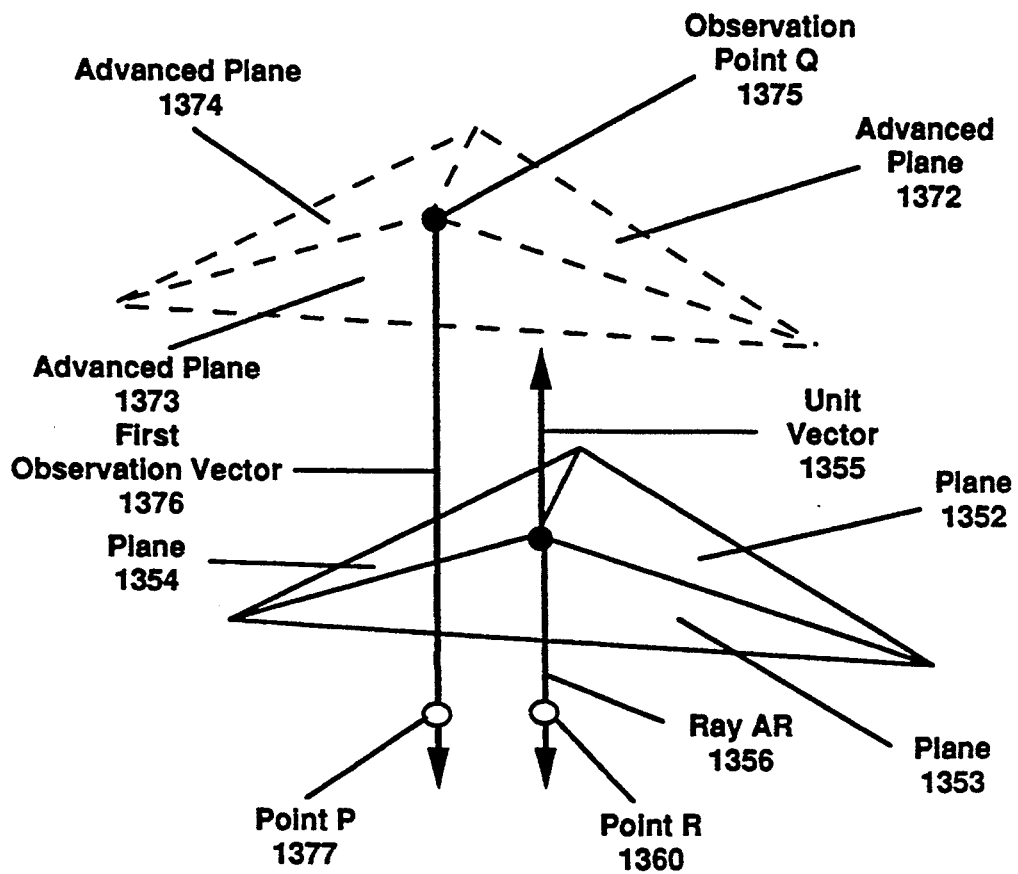

Referring now to FIG. 13c, an observation point Q is now determined. First, planes 1372–1374 corresponding to planes 1352–1354 are created. The planes 1372–1374 are advancements of planes 1352–1354, that would occur during surface movement. As this is a deposition process step, the advancement is in the direction of the unit vector. If it is an etch process step, the advancement would be in the opposite direction. An observation point Q 1375 is created and is defined as the intersection point for the three advanced planes 1372–1374. An observation direction is now determined. Referring to Table A, for a vertex point with three convex faces, the observation direction is opposite that of the unit vector. Here, the observation vector 1376 has been created which is in the opposite direction of unit vector 1355. Further, a point F is defined along the first observation vector 1376, creating a ray QP. It should be noted that a segment defined by the observation point Q 1375 and the point P 1377, i.e. QP must be parallel to the segment AR 1356.

Figure 13D:
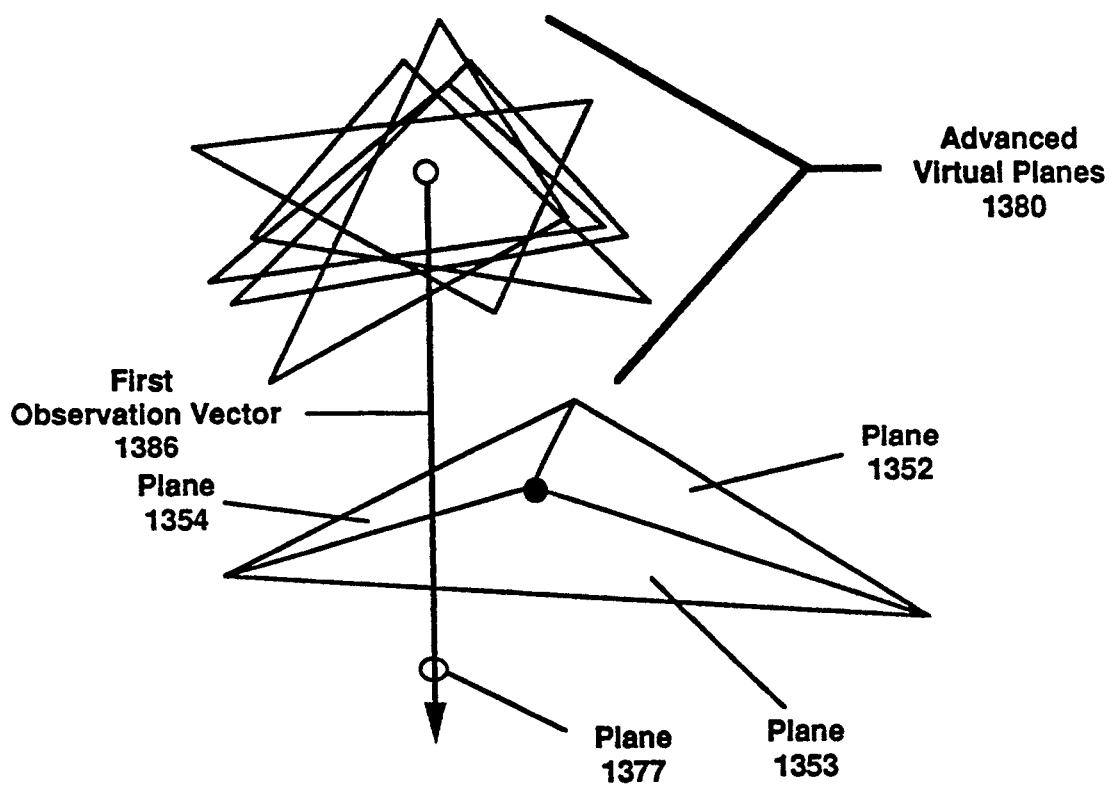
Figure 13E:
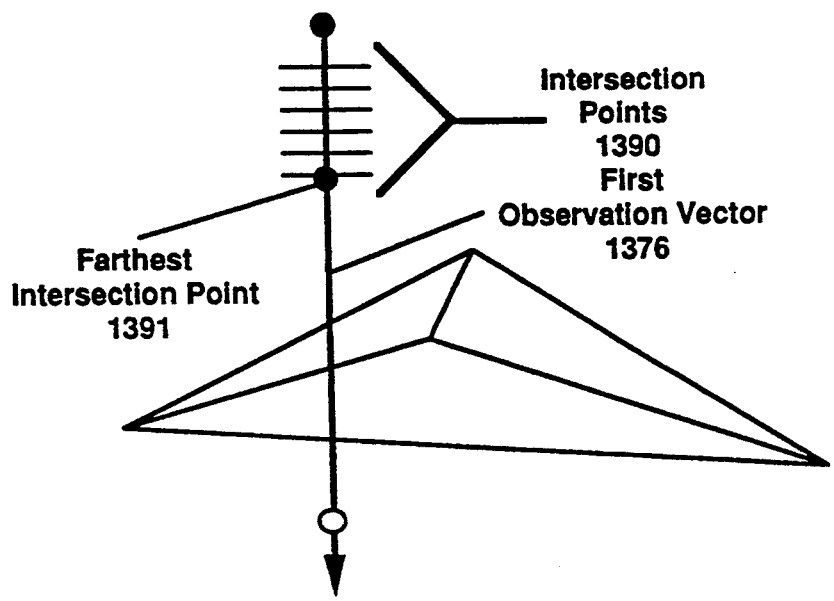

Referring now to FIG. 13d, a plurality of virtual planes 1380 have been advanced. The advanced virtual planes 1380 correspond to virtual planes that are created in a first pass. Here, a first virtual plane is created between planes 1352 and 1353. A set of second virtual planes between the first virtual plane and the plane 1354 are created. The virtual planes 1380 would be representative of creation of a set of second virtual planes. The intersection points where the advanced virtual planes 1380 intersect the observation vector 1376 are illustrated in FIG. 13e as bars 1390. As described above, the intersection point that is farthest along (intersects in the direction of the observation vector), is used to identify a plane that is saved in a first pass set of planes. Here, the farthest along intersection point is 1391.

Presuming all the first virtual planes have been created and a set of first pass planes created, the set of virtual planes identified in the first pass are then compared. As the second pass observation vector is the same direction as in the first pass, a Figure similar to FIG. 13e would be derived. Here, the furthest intersection point along the ray would define the point where the vertex point would move.

Accurate Method of Calculation

The accurate method of calculation provides more accurate results than the efficient method. The accurate method is particularly suited for calculating vertex movement for the case in which the etch/deposition rate depends on the angle between the surface normal and the vertical direction, e.g. a sputter etch step. However, the accurate method requires more calculations to be performed. The decision to use the accurate method versus the efficient method is one of tradeoffs, namely simulation accuracy versus speed.

Figure 14A:
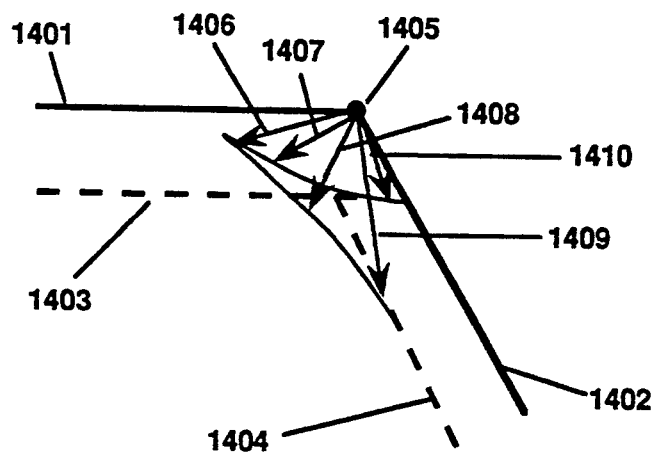
FIG. 14a illustrates the movements of adjacent planes at a vertex and a resulting intersecting structure.

The accurate method of calculation is premised on the observation that when surfaces are advanced, certain invalid vertex trajectories may result. To understand this first recall that a vertex point is singular, i.e. no surface normal is defined at the vertex point. Thus, at a vertex point, a plurality of different trajectories are possible (ranging from the surface normals of adjacent faces). In the accurate method, multiple vertex trajectories are created. For example, an etch trajectory starting from the vertex of a convex corner may be overtaken by etch trajectories starting from a surface adjacent to the vertex. Such overtaken etch trajectories are invalid. This is illustrated in FIG. 14a. Here, the surface 1401 has been advanced to surface 1403 and a surface 1402 has been advanced to surface 1404 through an etch process step. Note that the surfaces 1401 and 1402 define a convex interface. A vertex point 1405 with a plurality of trajectories 1406–1410 are also illustrated. The trajectories 1406, 1407 and 1410 define movement points that are behind the advanced surfaces 1403 and 1404. Thus, the trajectories 1406, 1407 and 1410 are invalid and the trajectories 1408 and 1409 are valid. This is readily observable since the invalid trajectory points would have been etched out.

For 2-D structures, valid vertex, edge or plane trajectories are determined by classifying a vertex or edge as convex or concave. This is termed the 2-D method. In the convex case, trajectories that are behind trajectories of adjacent planes and edges are invalid. In the concave case, trajectories in front of trajectories of adjacent planes and edges are invalid. Invalid trajectories will be clipped. Clipped (or clipping) is a term that is used to refer to the removal of trajectories or sections of a surface which are invalid.

Figure 14C:
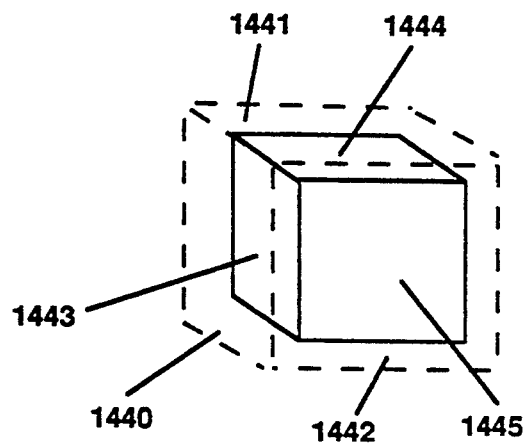
FIGS. 14c–14g illustrates the accurate method for determining the location of movement of a vertex, as may be utilized in the preferred embodiment of the present invention.
Figure 14D:
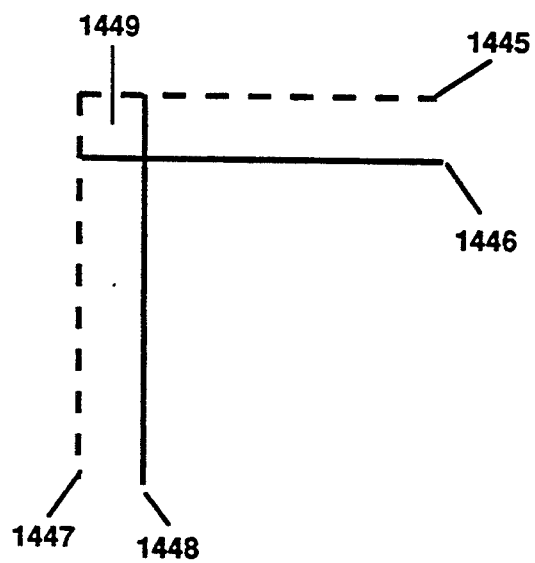
Figure 14B:
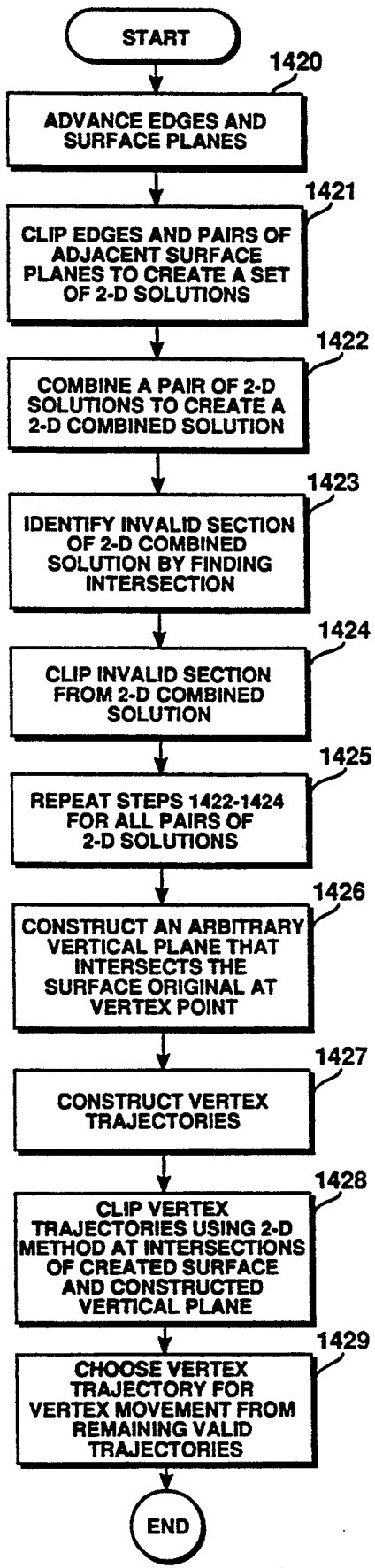
FIG. 14b is a flowchart of an accurate method for determining the location of movement of a vertex, as may be utilized by the preferred embodiment of the present invention.

For 3-D structures, some vertex points, e.g. saddle points, cannot be classified as concave or convex. Generally, the accurate method solves the 3-D structure as a series of 2-D problems. The accurate method is described in reference to FIGS. 14b–14g. FIG. 14b is a flowchart describing the steps of the accurate method. FIGS. 14c–14g illustrate the function of particular steps. Referring to FIG. 14b, first the edges and surface planes of the surface are advanced, step 1420. Advanced surface planes are illustrated in FIG. 14c. In FIG. 14c, the surface planes 1440–1442 have been advanced as surface planes 1443–1445. Surface planes are advanced in the following manner. All points on a surface plane have same orientation, so all have the same $\overline{\Delta P}$ defining their trajectories. $\overline{\Delta P}$ is given by:

$$\Delta P_x = \frac{dx}{dt} \Delta t = \Delta t \left( \frac{\partial c}{\partial \theta} \cos\phi\cos\phi + c\sin\theta\cos\phi \frac{\partial c \sin\phi}{\partial \phi \sin\theta} \right)$$

$$\Delta P_y = \frac{dy}{dt} \Delta t = \Delta t \left( \frac{\partial c}{\partial \theta} \cos\phi\sin\phi + c\sin\theta\sin\phi \frac{\partial c \sin\phi}{\partial \phi \sin\theta} \right)$$

$$\Delta P_z = \frac{dz}{dt} \Delta t = \Delta t \left( -\frac{\partial c}{\partial \theta} \sin\theta + c\cos\theta \right)$$

where c is the velocity normal to the surface (negative for etching), $\Delta t$ is the. time step for point movement, and $\theta$ and $\Phi$ are given by $\overline{n_A}$, the normal vector to a surface plane.

The new points $P'_{Ai}$ for a surface plane are given by $$\overline{P'_{Ai}} = \overline{P_{Ai}} + \overline{\Delta P}$$

The trajectories of all the points contained in the original surface plane form the advanced surface plane.

Figure 14E:
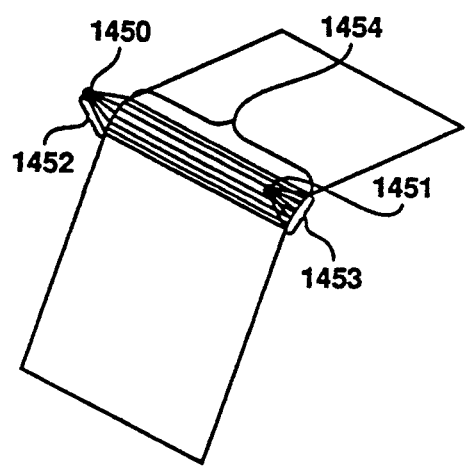

FIG. 14e illustrates the advanced edge. Trajectory points 1452 and 1453 corresponding to endpoints 1450 and 1451 of an edge 1454 are illustrated. Typically, the endpoints 1450 and 1451 are vertex points. As in the case of a vertex point, the edge does not have a surface normal. Thus, the trajectory points for all the points along the edge are similar to those for an endpoint. As described below, this may create some invalid trajectories due to the corresponding advanced surface planes. Such invalid trajectories are clipped using the 2-D rules described above.

Calculation of an advanced edge is now discussed. These trajectories include all possible orientations between two surface planes:

$$\hat{n}_i = t_i \hat{n}_A + (1-t_i)\hat{n}_B,$$

Presume $P_{E1}$ and $P_{E2}$ are the endpoints of the edge. Each endpoint will generate several advanced points, one for each value of $0 < t_i < 1$ in the above expression for surface orientation. The advanced points are given by $$\overline{P_{E1i}} = P_{E1} + \overline{\Delta P_i}$$

$$\overline{P_{E2i}} = P_{E2} + \overline{\Delta P_i}$$

where $\Delta P_i$ refers to the trajectory given by a particular surface orientation $n_i$.

At each surface plane intersection, clip advanced edges and corresponding advanced surface planes to create a set of 2-D clipped surfaces, step 1421. The number of 2-D clipped surfaces will equal the number of edges. The need for clipping the intersection points of the advanced surface planes is illustrated in FIG. 14d. A surface 1445 and a surface 1447 are advanced to create surfaces 1446 and 1448. Note that an intersection area 1449 is create resulting from the advanced surfaces 1446 and 1448. Such an intersection would created a self-intersecting structure. In order to maintain a valid representation of the structure, this intersection must be clipped. The advanced edge must also be clipped.

Once all the 2-D clipped surfaces are created, a pair of 2-D solutions are combined in order to find an intersection of the 2-D solutions, step 1422. In this step, the intersection between edges is considered. The combined 2-D solutions will create a surface with valid and invalid sections distinguishable at their intersection. Once the intersection is found, the invalid section is identified, step 1423, and clipped from the resulting surface, step 1424. The steps 1422–1424 are then repeated for all pairs of 2-D solutions to create a set of combined 2-D solutions, step 1425.

Figure 14F:
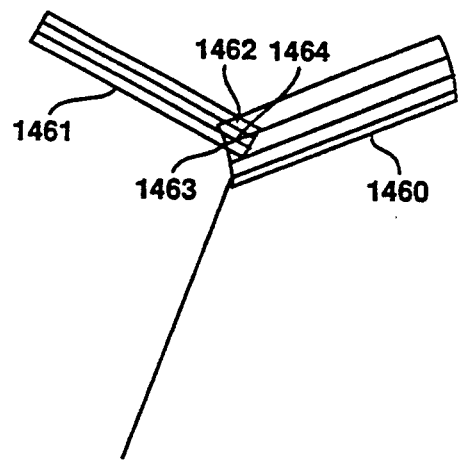

The steps 1422–1424 are further illustrated with respect to FIG. 14f. Here a surface 1461 is intersecting with a surface 1460. The surfaces 1460 and 1461 intersect at a location 1464. The surface 1460 extends past the intersection 1464 to create a section 1462. Similarly, the surface 1461 extends past intersection 1464 to create a section 1463. Both of the sections 1463 and 1464 are invalid as they extend through previous advanced surfaces.

Up to this point, the advancement and clipping of the advanced surface planes and edges have been considered. Now, the vertex trajectories are considered. First, an arbitrary vertical plane that intersects the solid at the vertex point is constructed, step 1426. An arbitrary vertical plane may be selected because of the cylindrical symmetry of processes such as sputter etch. Next, vertex trajectories which lie in the vertical plane are constructed, step 1427. The vertex trajectories may be constructed using techniques such as the 2-D Method described above. Vertex trajectories are then clipped using the 2-D method at intersections between each of the surface planes for each of the surfaces in the set of combined 2-D solutions, and the constructed vertical plane, step 1428. Finally, a vertex trajectory from the remaining vertex trajectories is chosen for vertex movement, step 1429. In general, a trajectory close to the average normal or the surfaces is preferable.

Figure 14G:
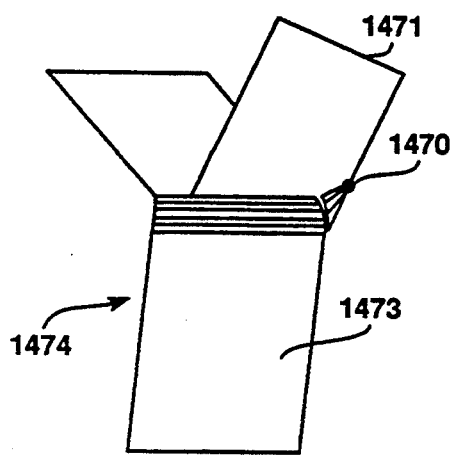

The steps 1426–1428 are illustrated with respect to FIG. 14g. Here, a 2-D combined solution 1474 is shown with respect to a vertex 1470. An arbitrary test plane 1471 that intersects the solid is illustrated with a surface plane 1473 of the 2-D combined solution 1474. Trajectories 1472 of vertex point 1470 are clipped according to the 2-D Method described above.

Figure 15A:
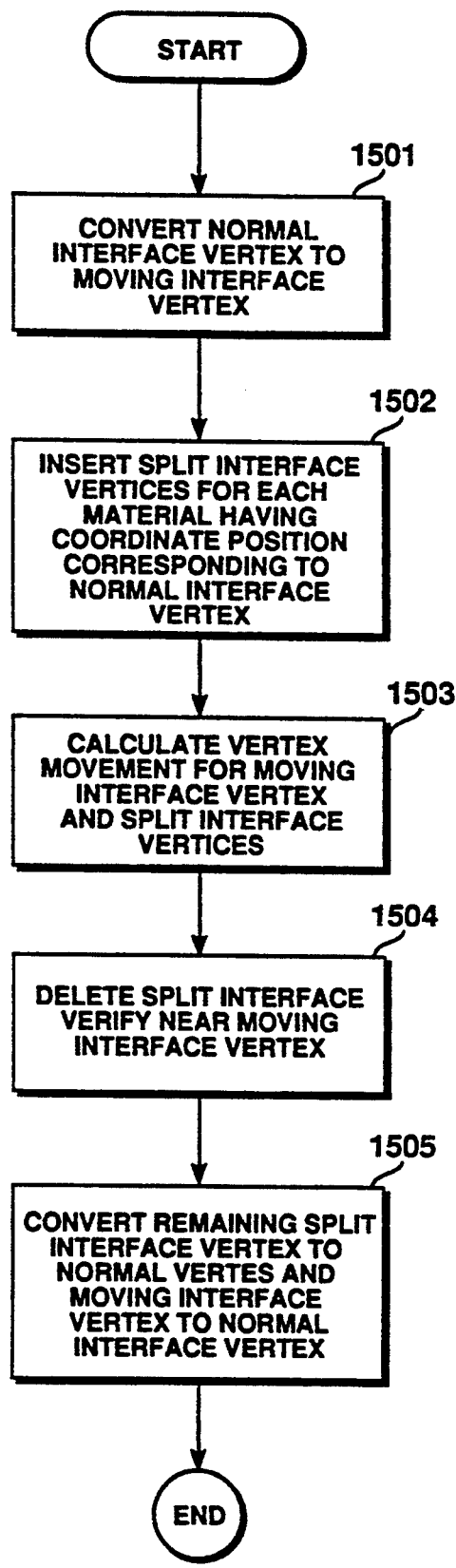
FIG. 15a is a flowchart of a method for vertex movement at the interface of two material with different etch rates, as may be utilized by the preferred embodiment of the present invention.

Vertex Movement Calculation at the Interface of Two Materials with Different Etch Rates The case where a vertex movement is at the interface of two materials with different etch rates requires special handling. The general scheme by which vertex movement is calculated is illustrated in FIGS. 15a–15d. FIG. 15a is a flowchart which outlines the method. Before describing the method, it is first necessary to describe the moving interface vertex. The moving interface vertex corresponds to a normal interface vertex and will undergo vertex movement in response to the process step. The interface vertex will have a movement rate that corresponds to the material with the higher etch rate and a movement direction that will be along the interface edge. Referring now to FIG. 15a, first, the interface vertex is converted to a moving interface vertex, step 1501. Next, split interface vertices are inserted, step 1502. Each split interface vertex is associated with one of the materials at the interface. Such split interface vertices are at the same coordinate point as the moving interlace vertex. Vertex movement calculations for the interface vertex and split interface vertices are performed, and the vertices moved accordingly, step 1503. Such vertex movement is performed using vertex movement calculation techniques described above. After vertex movement, any split interface vertex near the interface vertex is deleted, step 1504. This is because such a split interface vertex does not affect the resulting structure. Finally, the remaining split interface vertex is converted to a normal vertex of the corresponding material and the moving interface vertex is converted to the normal interface vertex, step 1505.

Figure 15B:
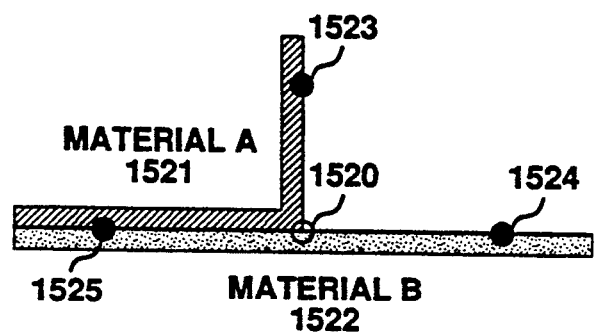
FIGS. 15b–15g are two examples which illustrate in 2-D vertex movement at the interface of two materials with different etch rates, as may be utilized in the preferred embodiment of the present invention.
Figure 15C:
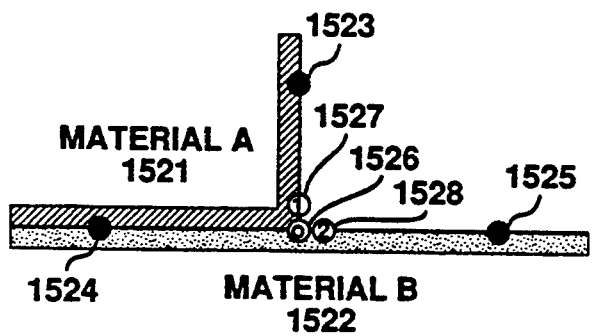

FIGS. 15b–15c illustrate the insertion of split interface vertices and the calculation of corresponding movement vectors, for the multiple material interface case. Referring to FIG. 15b, Material A 1521 is adjacent to Material B 1522. An interface vertex 1520 is at an exposed interface point of Material A 521 and to Material B 1522. Also illustrated, is a second interface vertex 1525. The interface vertex 1525 is not exposed in this case. Further illustrated are a vertex 1523 corresponding to Material A 1521 and a vertex 1524 corresponding to Material B 1522. Referring now FIG. 15c, a split interface vertex 1527 corresponding to Material A 1521, and a split interface vertex 1528 corresponding Material B 1522 have been inserted. Further, the interface vertex 520 has been replaced by moving interface vertex 1526. The split interface vertices 1527 and 1528 and the moving interface vertex 1526 have the same coordinate addresses, but are shown here as separated for illustrative purposes.

Figure 15D:
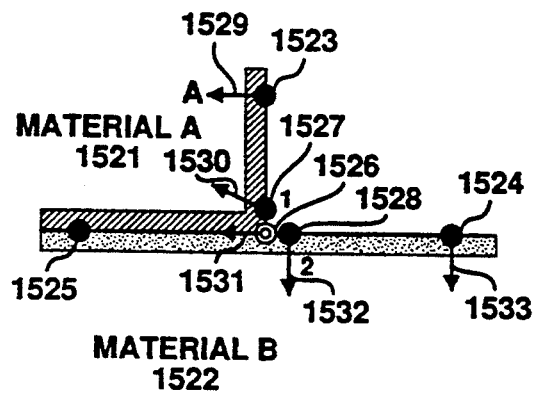
Figure 15E:
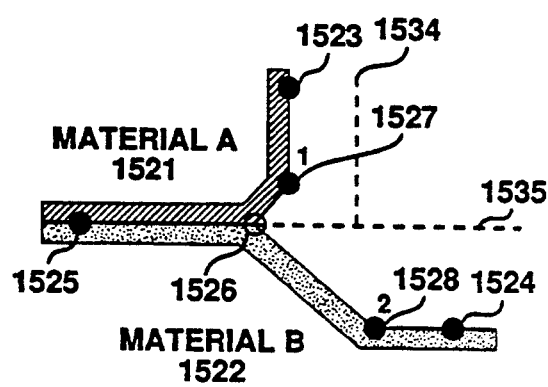

FIGS. 15d–15e illustrate the case where both split interface vertices have corresponding movement vectors. Referring to FIG. 15d, the vertices 1523 and 1524 have corresponding movement vectors 1529 and 1533. Further, the split interface vertices 1527 and 1528 have corresponding movement vectors 1530 and 1532. Finally, the moving interface vertex 1526 has a corresponding movement vector 1531. It should further be noted that the vertex 1525 does not have a corresponding movement vector. This is because the vertex 1525 is not exposed. The calculation of the split interface movement vectors 1530 and 1532, and the movement interface vector 1531 is described in more detail below.

Referring to FIG. 15e, the vertices have been moved. It should be noted that that the dashed line 1534 corresponds to the original location of Material A 1521 and the dashed line 1535 indicates the original position of Material B 1522. In this case, no split interface vertex is deleted. Further, in subsequent steps, the split interface vertices 1527 and 1528 will become normal vertices of their Materials and the interface vertex 1524 will become a normal interface vertex.

Figure 15F:
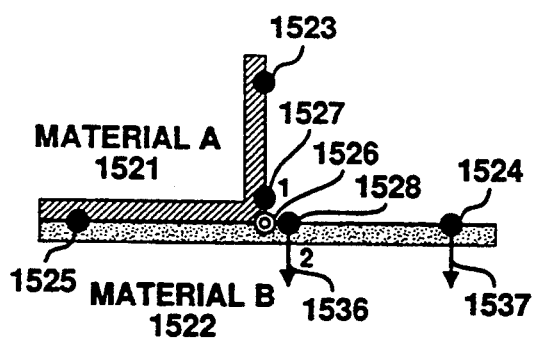
Figure 15G:
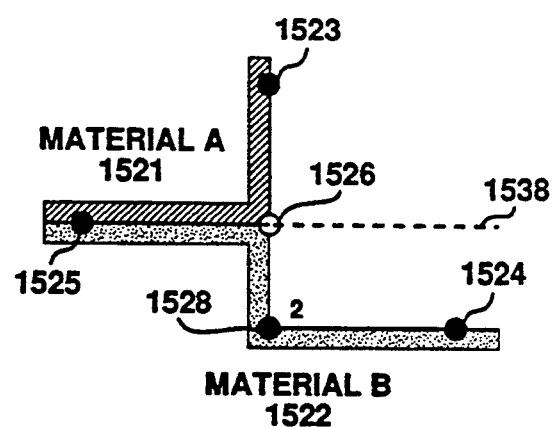

FIGS. 15f–15g illustrate the case where the length of the corresponding movement vector calculated for a split interface vertex or the interface vertex is zero. Such a case may arise when there is vertical etch process step. In any event, referring to FIG. 15f, a movement vector 1536 corresponds to split interface vertex 1528. Further, a movement vector 1537 corresponds to vertex 1524. Referring now FIG. 15g, the split interface vertex 1528 and the normal vertex 1524 have been moved. It should be noted that the dashed line 1538 indicates where the Material B 1522 had originally been. It should further be noted that the split interface vertex 1527 is deleted, because the coordinates for split interface vertex 1527 are the same as the moving interface vertex 1526. Here, the moving interface vertex 1526 becomes a normal interface vertex.

Figure 15H:
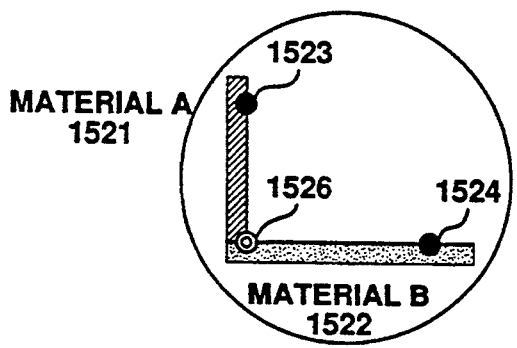
FIGS. 15h–15j illustrate in 2-D calculation of a movement vector for split interface vertices, as may be performed within the preferred embodiment of the present invention.
Figure 15I:
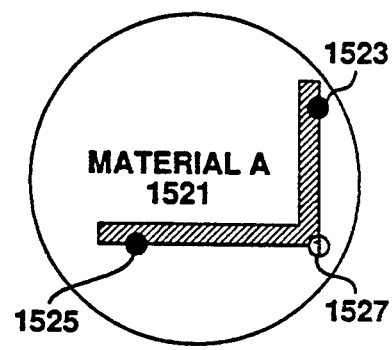
Figure 15J:
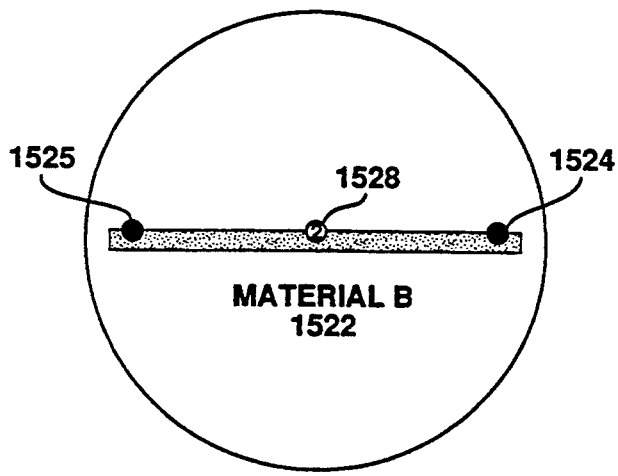

FIGS. 15h–15j illustrate the calculation of the movement vector for a split interface vertex. Calculation of the movement vector for a split interface vertex generally comprises two steps; (1) calculating the shadow effect at the interface vertex, and (2) constructing a virtual structure for movement vector calculation comprised of the split interface vertex and adjacent normal vertices for each material. Once the virtual structure is constructed, the calculation of the movement vector proceeds in a way similar to the single material case. FIG. 15h–15j show the vector movement calculations for the structure illustrated in FIG. 15c. Referring to FIG. 15h, the structure for the shadowing calculation is illustrated. The shadow calculations and how they are preformed are described in more detail below. In any event, the shadowing calculation for the interface vertex and the split interface vertices is the same. Referring now to FIG. 15i, the virtual structure for Material A 1521 for split interface vertex 1527 is illustrated. This is simply the structure of Material A with the Material B omitted. FIG. 15j illustrates the virtual structure for Material B 1522 at split interface vertex 1528. Again, this virtual structure is nearly the Material B 1522 with the Material A 1521 omitted.

Figure 15K:
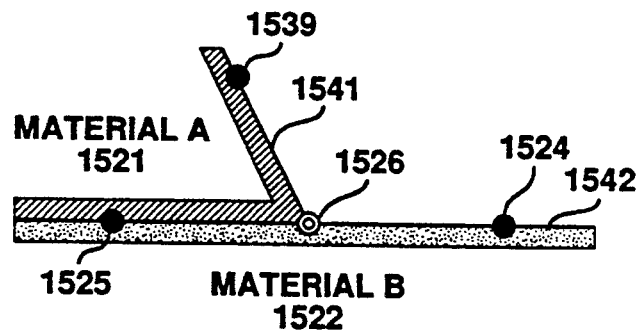
FIGS. 15k–15p provide two examples in 2-D illustrating calculation of a movement vector for an interface vertex, as may be performed within the preferred embodiment of the present invention.
Figure 15L:
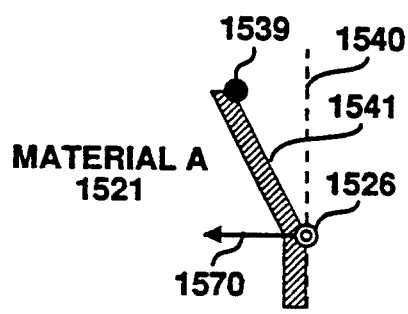
Figure 15M:
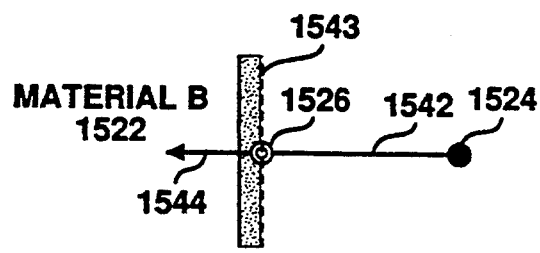

FIGS. 15k–15m illustrate the calculation of the movement vector for a moving interface vertex. The calculation of the movement vector at the interface vertex is comprised of the steps of: (1) determining the shadowing effect, (2) defining virtual structures for each material, (3) calculating the movement vectors for both materials along the same direction on the interface plane, and (4) selecting the largest vector as the movement vector of the interface vertex. Referring now to FIG. 15k, Material A 1521 has vertex points 1539 on a real surface 1541 Material B 1522 has a vertex 1524 on a real surface 1542. Further, a moving interface vertex 1525 is illustrated. FIG. 15l illustrates the virtual structure constructed for the Material A 1521 case. Here, both the real surface plane 1539 and a vertical plane 1540 are used for virtual structure construction. Note that the real surface plane 1540 is used in this case because it will have an effect on the calculation of a movement vector for the movement interface vertex 1526. This is because portions of the surface interface plane will become exposed more rapidly than if the real surface plane was merely a vertical line. In any event, the result will be the calculation of movement vector 157. FIG. 15m illustrates the virtual structure for the Material B 1522 case. In this case, the virtual structure is comprised of only a vertical plane 1543. This is because the real surface plane 1542 will have no effect on the calculation of a movement vector 1544 for the moving interface vertex 1526. In this case, the movement vector 1570 corresponding to Material A 1521 is larger than the movement vector 1544 for Material B 1522. Therefore, the movement vector 1570 is defined as the movement vector of the moving interface vertex 1526.

Figure 15N:
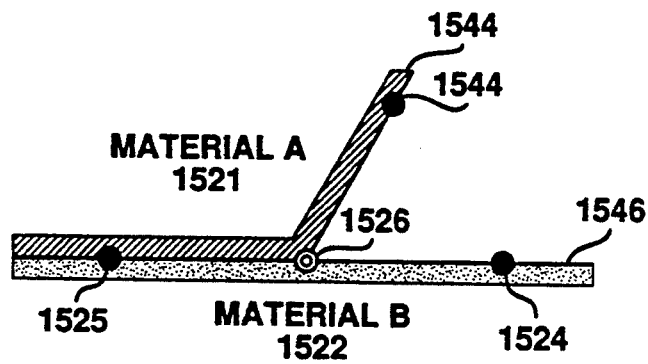
Figure 15O:
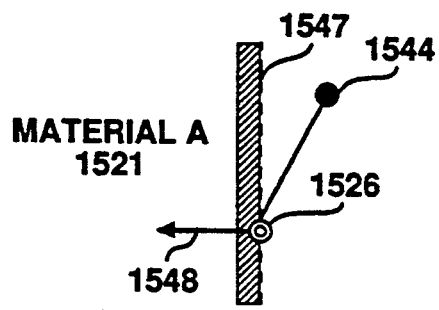
Figure 15P:
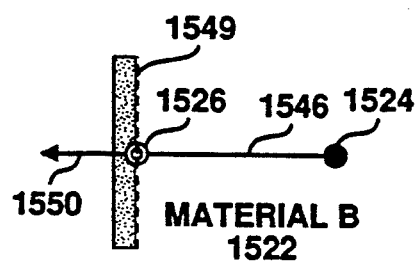

FIGS. 15n–15p illustrate the case where none of the real surface planes are utilized for virtual structure construction. Referring to FIG. 15n, Material A 1521 has a vertex 1544 on real surface 1545. Material B 1522 has a vertex 1524 on real surface 1546. FIG. 15o illustrates the virtual structure constructed for Material A 1521. Here, only a vertical plane 1547 is used for virtual structure construction. Again, this is because the real surface plane 1545 would not effect the calculation for movement vector 1548 for moving interface vertex 1526. Referring now to FIG. 15p, the virtual structure for Material B 1522 is illustrated. Here, only vertical plane 1549 is used for virtual structure construction. As noted with respect to FIG. 15m, the real surface plane 1546 would not have an impact on the calculation of the movement vector 1550 for interface vertex 1526. In this case, the interface vertex movement vector 1548 corresponding to Material A 1521 is larger than the movement vector 1550 for the moving interface vertex 1526 corresponding to Material B 1522. Therefore, the movement vector 1548 is defined as the movement vector of the moving interface vertex 1526.

Figure 15Q:
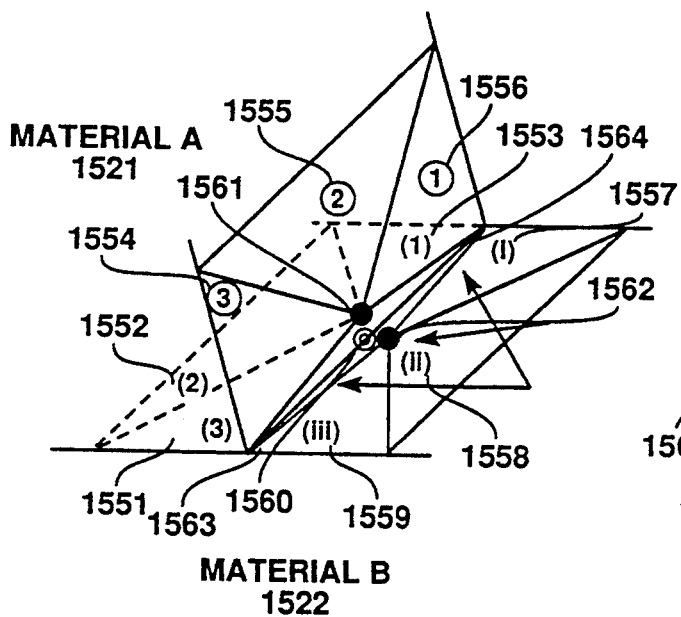
FIGS. 15q–15t illustrate in 3-D calculation of a movement vector for an interface vertex, as may be performed within the preferred embodiment of the present invention.

FIG. 15q–15t illustrate in 3-D the calculation of the movement vectors for the interface vertex. Referring to FIG. 15q, in Material A 1521 has two surface planes. A first surface plane is comprised of horizontal triangular segments 1551–1553, and a second surface plane comprised of vertical triangular segments 1554–1556. Material B 1522 is comprised of horizontal triangular segments 1551–1553 and 1557–1559. Also illustrated are split interface vertices 1561 and 1562 and moving interface vertex 1560. Further illustrated are interface edge vectors 1563 and 1564. The interface edge vectors 1563 and 1564 traverse the edge of the interface between the Materials A 1521 and Material B 1522.

Figure 15R:
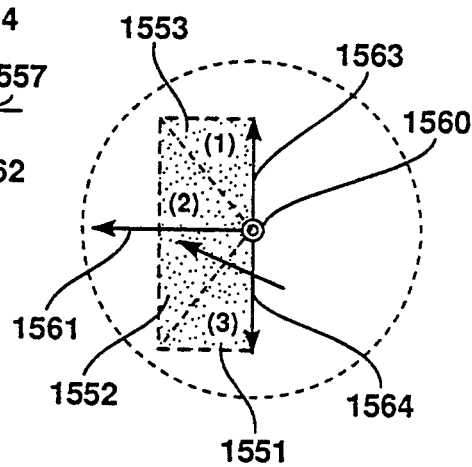

FIG. 15r illustrates the direction of a resulting movement vector. The movement vector direction is defined as the bisector of two interface edge vectors on the interface plane. Note the interface plane here is the horizontal plane comprised of segments 1551–1553 of Material A 1521 segments 1557–1559 of Material B 1522. Here, a movement vector direction as illustrated by 1561, bisects the interface edge vectors 1563 and 1564 on the horizontal interface plane comprised of segments 1551–1553.

Figure 15S:
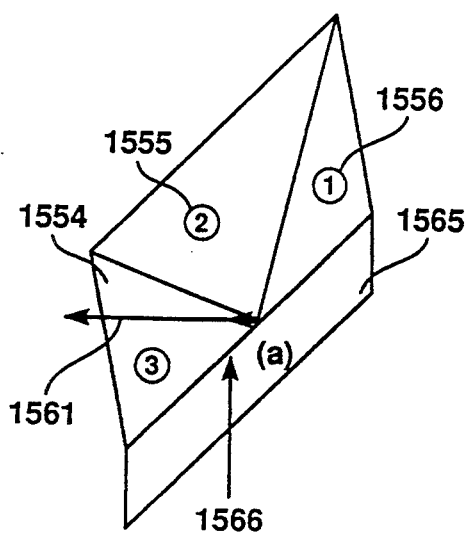

FIG. 15s, illustrates the virtual structure for Material A 1521. Here, the virtual structure is comprised of the real surface plane comprised of horizontal segments 1554–1556 and a vertical plane 1565. The movement vector is calculated as 1566.

Figure 15T:
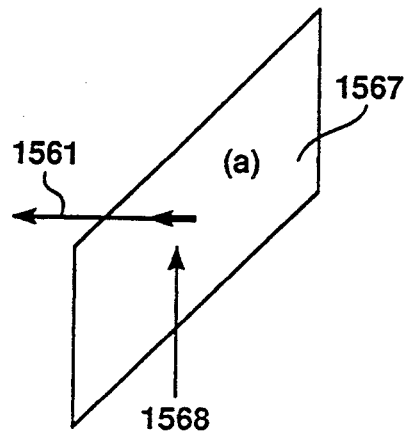

FIG. 15t illustrates the virtual structure constructed for Material B 1522. Here, the real surface planes defined by the horizontal segments 1557–1559 have no effect on the calculation of the movement vector. Thus, they are omitted. The virtual structure is comprised of a vertical plane 1567. Here, a movement vector is calculated as 1568. In this case, the movement vector 1568 is larger than the movement vector 1566 and is defined as the movement vector for the interface vertex 1560.

Particle Flux Shadowing

In order to accurately calculate a movement vector, the incoming flux coming through a solid angle opening must be calculated. The incoming flux refers to the material being projected onto the wafer causing the deposition or etch. The solid angle opening is that part of the space above a point which is not shadowed by neighboring topography. Shadowing is a term that is commonly used in the area of computer generated graphics. In computer generated graphics, shadowing refers to obscuring a particular point of an object because it lays in the shadow of another object with respect to a particular light source. Here, a point may be in shadow because the path of a particle from a source is blocked by another portion of the topography of the workpiece, (i.e. semiconductor wafer).

Because the source of flux may vary over a wafer, for any given point in a 3-D structure, the neighboring topography forms a complex shadowing mask. Therefore, the solid angle opening is difficult if not impossible to analytically determine. The method of the preferred embodiment defines a mesh in the space over the surface. The mesh represents a source that exists above a workpiece. Points on the mesh represent particle flux intensity in a direction normal to the mesh. Two types of mesh can be defined. The first is a semisphere mesh used for incoming particles whose flux is not spatially varying. In a semisphere mesh, each mesh point is defined by direction and a solid angle.

Figure 16A:
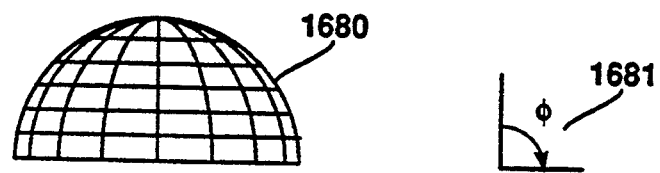
FIGS. 16a–16b illustrate a semisphere mesh as may be used in a particle flux shadowing calculation, as performed within the preferred embodiment of the present invention.
Figure 16B:
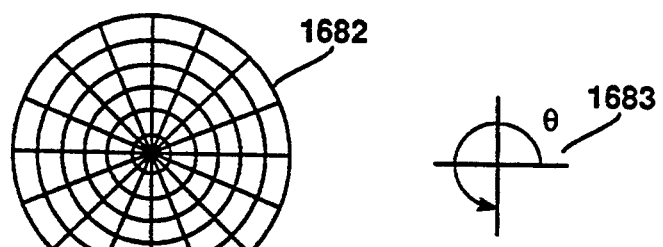
Figure 16C:
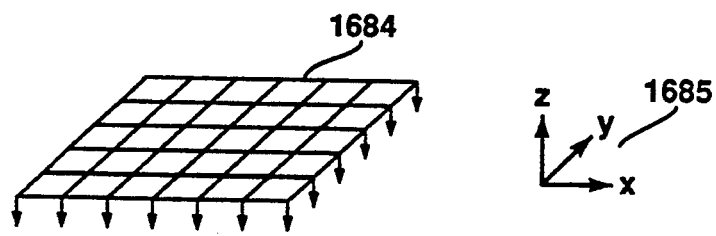
FIG. 16c illustrate a planar mesh as may be used in the particle flux shadowing calculation, as performed within the preferred embodiment of the present invention

Such a semisphere mesh is illustrated with respect to FIGS. 16a–16b. A mesh point in a semisphere mesh is defined by angles $\theta$ and $\phi$, illustrated in 1681 and 1683 of FIGS. 16a and 16b, respectively. The second is a plane mesh placed a finite distance from the surface. The plane mesh may be used for simulation of sputter deposition for which the strength of the incoming flux is spatially varying. In a plane mesh each mesh point is defined by its' real coordinates. A plane mesh is illustrated in FIG. 16c. Mesh points on mesh 1684 are defined by the coordinate points comprising the mesh as illustrated by the legend 1685.

For both types of mesh, the intensity of the incident flux is specified for each mesh point. Then, for each surface point, each mesh point is checked to see if it is visible. Only the contributions from the visible points are included for the calculation of the "visible" component of the 3-D unified equation (described above).

Figure 16D:
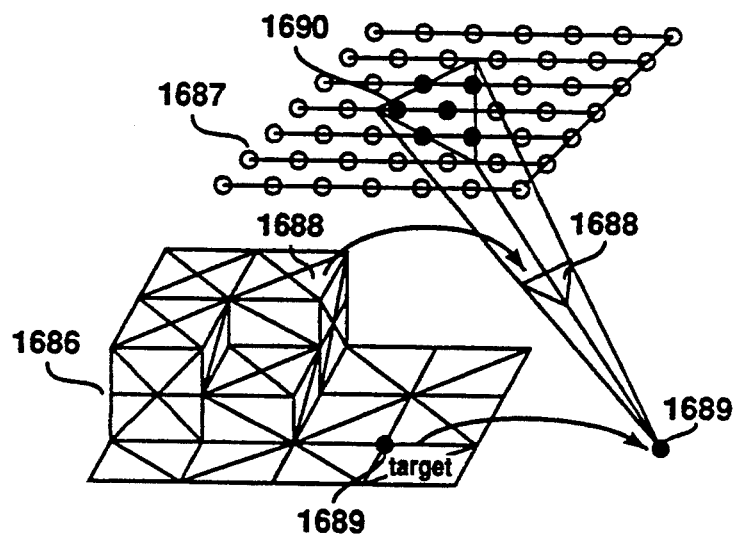
FIG. 16d illustrates a basic method for determining mesh points which are in shadow, as performed within the preferred embodiment of the present invention.

FIG. 16d illustrates one technique for determining mesh points that are in shadow with respect to a particular target point. In FIG. 16d, a solid 1686 has a surface which is comprised of a plurality of triangles. A mesh 1687, here a plane mesh but it may also be a semisphere mesh, is illustrated. Further illustrated are a target point 1689 and triangle 1688. Projecting the target point 1689 through the triangle face 1688 onto the mesh 1687, results in a set of mesh points 1690 being identified. Here, the mesh points within the set 1690 are not visible to the target point 1689. A similar calculation is preformed for each of the triangles on the surfaces of the solid 1686.

Figure 16E:
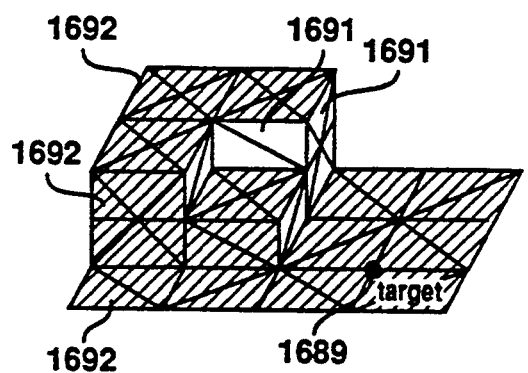
FIG. 16e illustrates an efficient method for determining mesh points which are in shadow, as performed within the preferred embodiment of the present invention.

Such a technique as described with reference to FIG. 16d is very time consuming. Moreover, many triangles will produce redundant identification of mesh points being in shadow. Also, many triangles, i.e. those on the same plane as the target point, would not identify any mesh points as being in shadow. A more efficient method is illustrated in FIG. 16e. In FIG. 16e, the solid surface 1686 still has a surface which is divided into triangles. However, only those triangles which face the target point are used in the mesh point shadowing calculation. Here, the shaded triangles, e.g. those labeled 1692, are not used in the calculation because they do not face the target point 1689. Conversely, the triangles that are not shaded, i.e. those labeled 1691, do face the target point and are used to identify the mesh points which are in shadow.

Figure 16F:
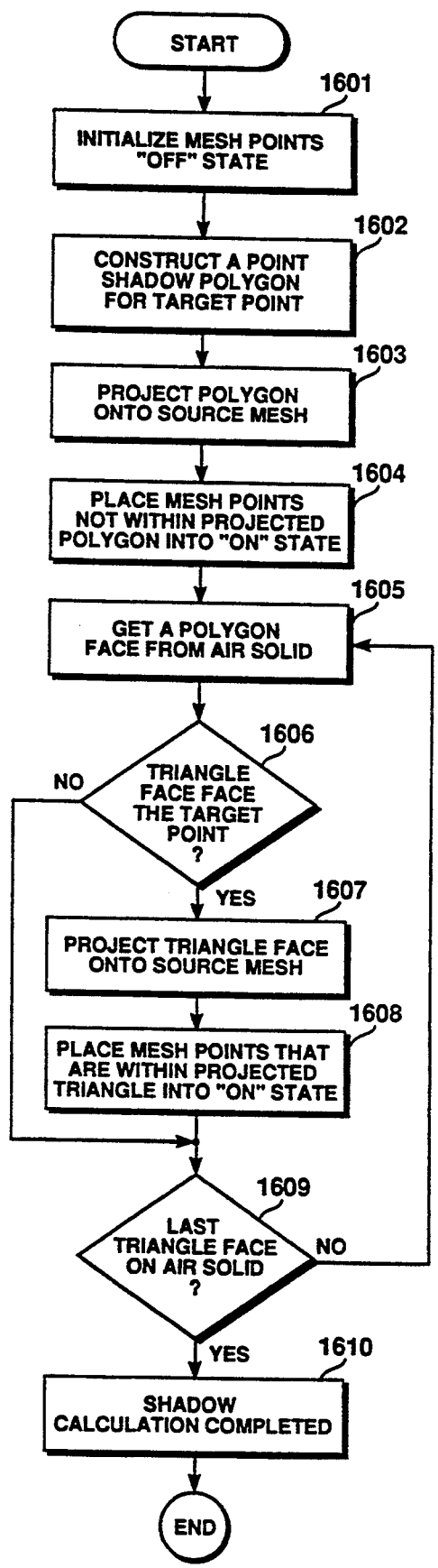
FIG. 16f is a flowchart describing the steps of particle flux shadowing, as may be utilized within the preferred embodiment of the present invention.
Figure 16G:
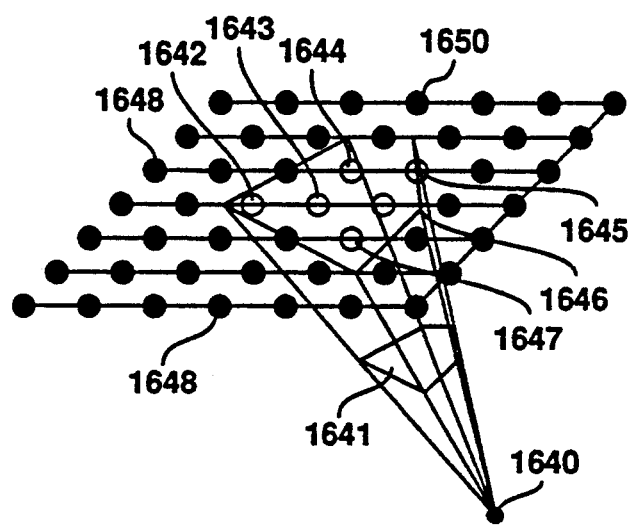
Figure 16H:
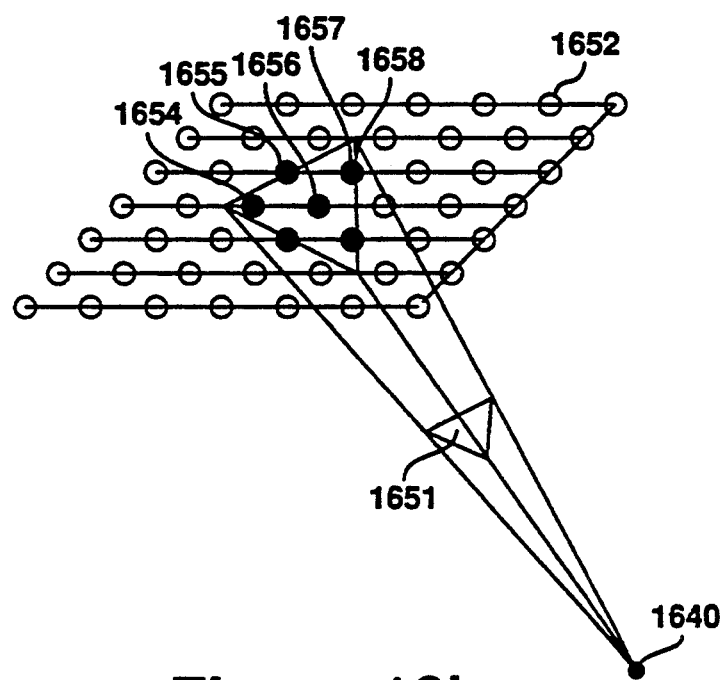

FIGS. 16f–16h illustrate the shadowing calculation to identify the mesh points which are visible, of the preferred embodiment. It should be noted that the method described applies to both a planar mesh or a spherical mesh. Referring to FIG. 16f, as a first step all the mesh points are initialized to an "off" state, step 1601. As all the vertex points of the solid surface will be subject to the shadowing calculation, it is necessary to initialize the mesh to a starting/default state. Next, a point shadow polygon is constructed for a target point on the solid, step 1602. This polygon is formed from the outer boundaries of the set of faces adjacent to the vertex under consideration. The polygon is then projected onto the source mesh plane, step 1603. The mesh points that are not within the projected polygon are placed into an "on" state, step 1604.

The steps to this point are illustrated in FIG. 16g. Referring to FIG. 16g, a polygon 1641 of target point 1640 is projected onto a source plane mesh 1650. The source plane mesh 1650 has a plurality of mesh points. A black ("on") mesh point indicates that the mesh point is in shadow with respect Go a target point. Conversely, a white ("off") mesh point is not in shadow. For example, as the mesh points 1642–1647 are within the projected polygon, they are not in shadow and thus "off". Other points, e.g. mesh points 1648 are not within the projected polygon and are thus "on".

In order to determine other mesh points that may be in shadow, the effect of other portions of the topography are considered. This is done by an analysis of the air solid. First, a triangular face from the air solid is selected. step 1605. This is accomplished by accessing the air solid structure and examining the linked faces in the face structure. The selected triangular face is then examined to see if it faces the target point, step 1606. Only the triangular faces that face the target point are further processed. This simplifies the analysis of the air solid structure in this portion of the shadow calculation. if the triangle face does not face the target point, it is determined whether or not it is the last triangle face on the air solid, step 1609. If the triangle face does face the source mesh, the triangle is projected onto the source mesh, step 1607. The mesh points that are found within the projected triangle are then placed into the "on" state, step 1608. The effect that this will have is to turn "on" some points that were previous "off" after the point shadow polygon projection described above.

The projection of a triangular face of an air solid is illustrated with respect to FIG. 16h. Here the triangle face 1651 faces target point 1640. Assuming that initially, the portion of the source plane mesh 1652 that a projected triangle face 1651 intersects were all in an "off" state, the projected triangle face causes the mesh points 1654-1658 to be turned into the "on" state.

A check for the last triangle face on the air solid is made, step 1609. If it is not the last triangle face on the air solid, another triangle face on the air solid is obtained, step 1605 and the process continues. Otherwise, if it is the last triangle face on the air solid, the shadowing is complete for the present target point and the process is repeated for a next target point, step 1610.

Figure 16I:
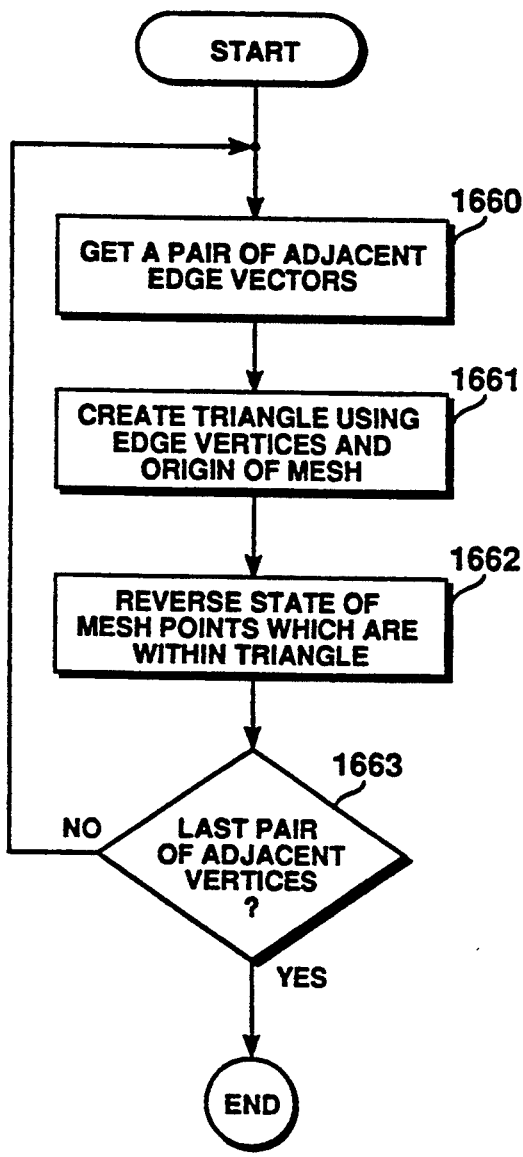
FIG. 16i is a flowchart describing the steps of turning shadow mesh points off, as may be performed by the preferred embodiment of the present invention.

A method for turning mesh points into an "off" state from a projected polygon are now described with respect to FIG. 16i. Such a method is used to determine the "off" mesh points, as illustrated in FIG. 16f. First, a pair of points that define an edge of the projected polygon are identified, step 1660. A triangle is then created using the edge vertices and the coordinate points defining the origin of the mesh, step 1661. The state of the mesh points within the created triangle are then reversed, step 1662. A check for the last pair of adjacent vertices is then made, step 1663. If it is not the last pair, the process repeats at step 1660. If it is the last pair, the process ends. The method for turning mesh points into an "off" state is but one technique for turning mesh points into an "off" state. Other methods could be utilized without departing from the spirit and scope of the present invention.

Figure 16J:
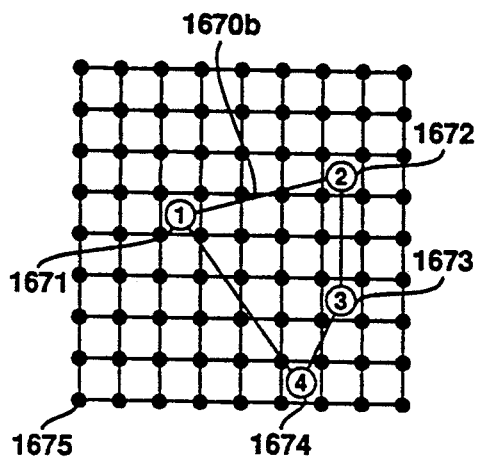
FIGS. 16j–16o illustrate the method of turning shadow mesh points off as described with reference to FIG. 16i.
Figure 16K:
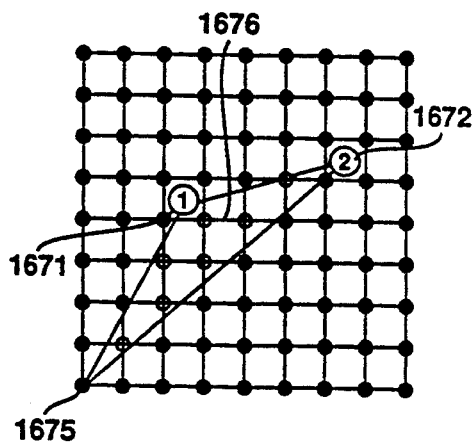
Figure 16L:
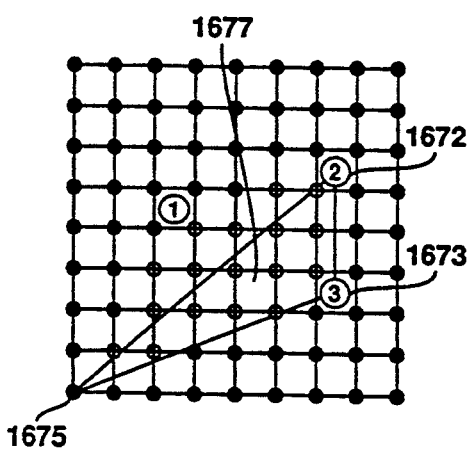

The method of turning mesh points off from a projected polygon is illustrated in FIGS. 16j-16o. Referring to FIG. 16j, a polygon 1670b projected onto mesh 1670a and has vertex points 1671-1674. Also illustrated is an origin of the coordinate axis for the mesh 1675. Referring now to FIG. 16k, a triangle 1676 is created by the vertex points 1671, 1672 and the origin 1675. Note that the mesh points within the bounds of the triangle have gone from an "on" state to an "off" state. Referring now to FIG. 16l, a triangle 1677 is created by the vertex points 1672, 1673 and the origin 1675. Again, the mesh points within the boundary of the triangle 1677 have gone from an "on" state to an "off" state.

Figure 16M:
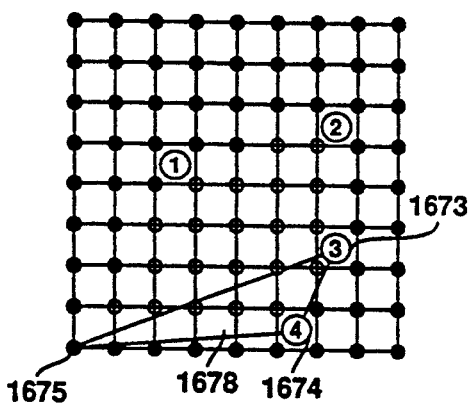
Figure 16N:
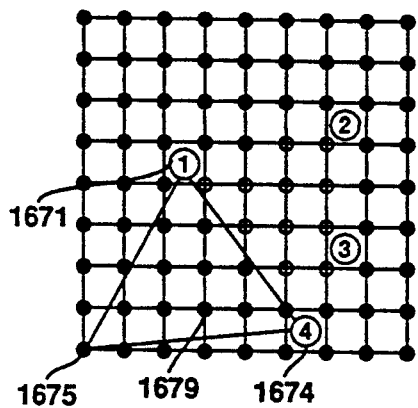
Figure 16O:
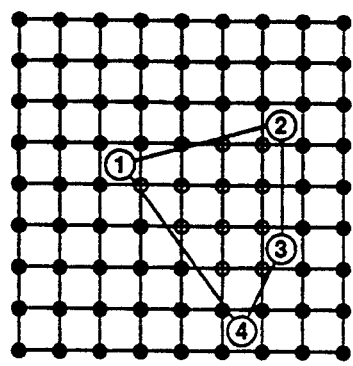

Referring now to FIG. 16m, a triangle 1678 is created with the vertex points 1673, 1674 and the origin 1675. Again, the mesh points within the boundary of the triangle 1678 have gone from an "on" state to an "off" state. It would be apparent at this point that the number of mesh points that are in an "off" state exceeds the bounds of the originally projected rectangle illustrated in FIG. 16j. This is corrected as illustrated in FIG. 16n. Here a triangle 1679 is created from the vertex points 1671, 1674 and the origin 1675. Here, mesh points within the boundary of triangle 1679 that were previously in an "off" state are placed in an "on" state. The resulting set of mesh points in an "off" state are illustrated in FIG. 16o.

Surface Movement Sweeping Method

The surface sweeping method of the preferred embodiment is used in the generation of the air solid. Surface sweeping in this context refers to the movement of individual faces comprising a solid surface to effect the deformation of the air solid. However, alternative embodiments may be implemented where deformation through vertex manipulation is done directly on a material solid itself. Such alternative embodiments would not depart from the spirit and scope of the present invention. It should also be noted that surface sweeping differs from the notion of sweeping found in solids modeling systems. Surface sweeping refers to deformation of a solid while sweeping refers to construction of a solid.

Figure 17A:
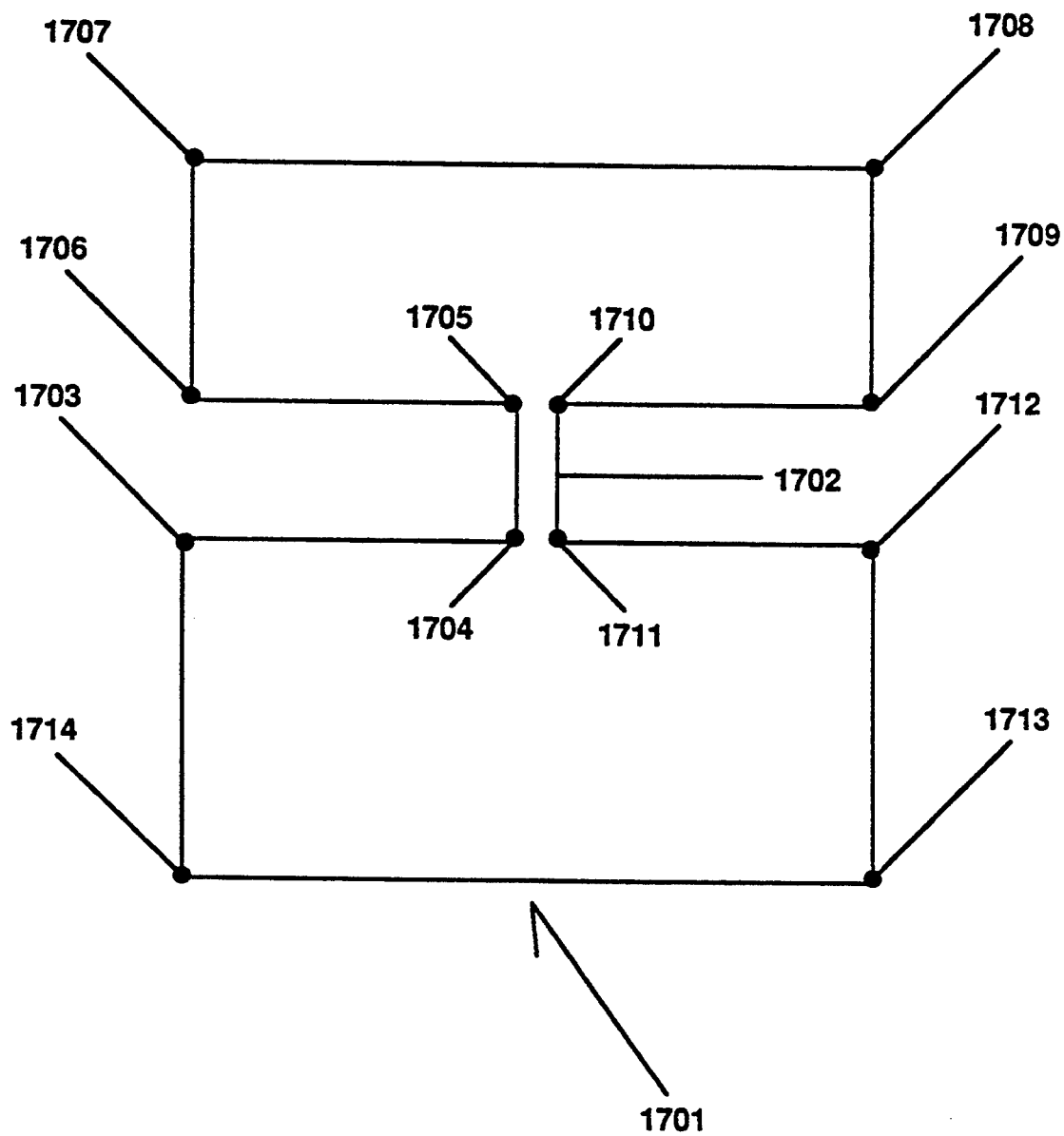
Figure 17B:
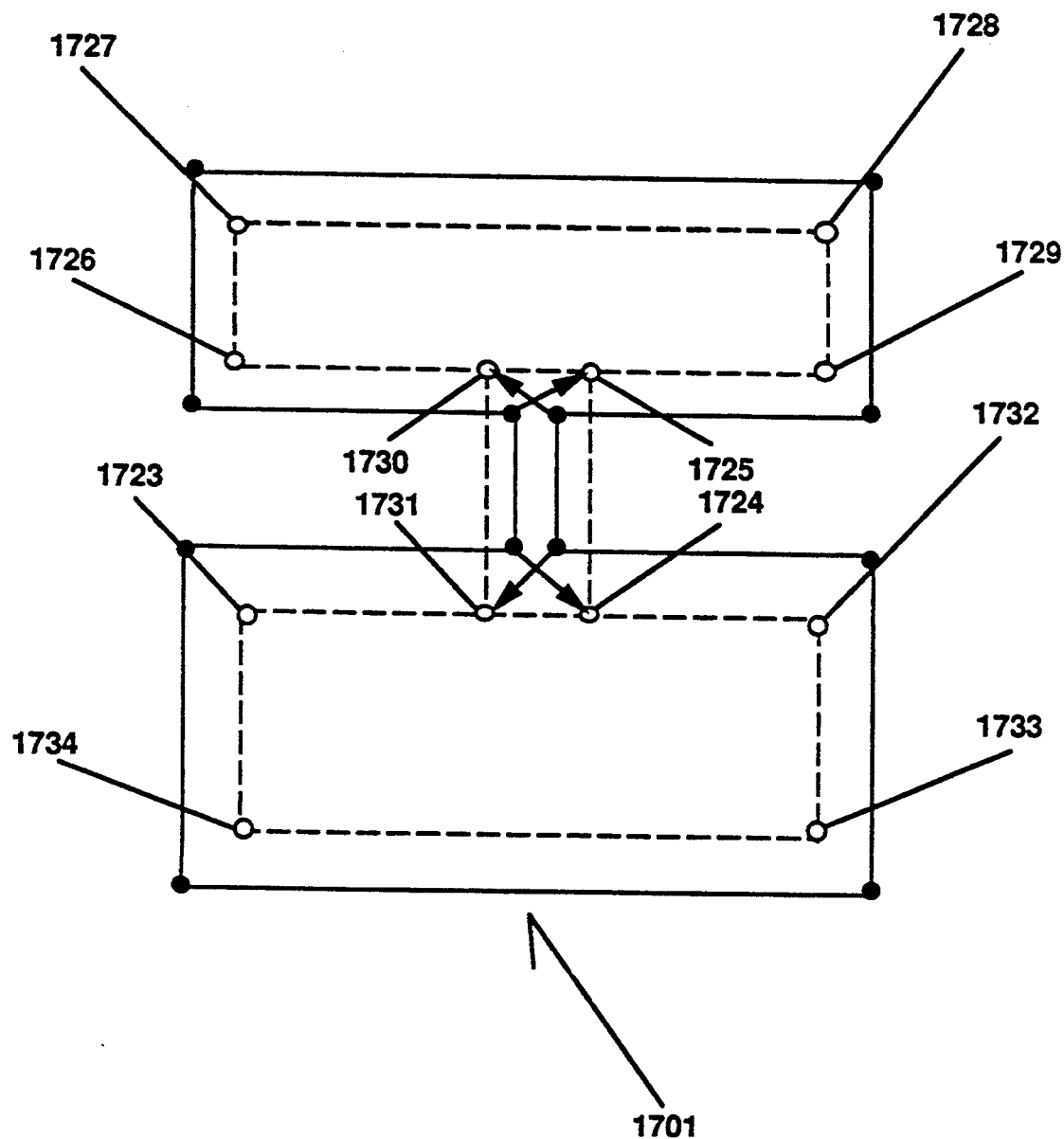

A solid represented in the boundary representation model that is undergoing a deformation process is invalid if it becomes self-intersecting. An invalid representation cannot be properly interpreted by a solids modeler. A solid representation becomes self-intersecting when a face of the resultant structure intersects a non-neighboring face. This will typically occur during the deformation process when vertex points become juxtapositioned. Creation of such a self-intersecting structure is illustrated in FIGS. 17a-17b. FIGS. 17a-17b are 2-D representations, but the same principles apply for 3-D. FIG. 17a illustrates an object 1701 that will be subjected to an etching process step. object 1701 is defined by the vertex points 1703-1714. During the etching process the neck 1702 of the object 1701 will be removed. As described above, the movement vectors for each vertex point are calculated and the resulting structure is illustrated in FIG. 17b. If the moved vertex points are connected in the same manner as the unmoved vertex points, the result will be an invalid, self-intersecting structure which is defined by the points 1723-1734. This is because the face defined by connecting the points 1724 and 1725 intersects the faces defined by connecting the points 1729, 1730 and 1731, 1732, respectively. Likewise the face defined by connecting the points 1730 and 1731 intersects the faces defined by connecting the points 1725, 1726 and 1723, 1724, respectively.

Figure 18A:
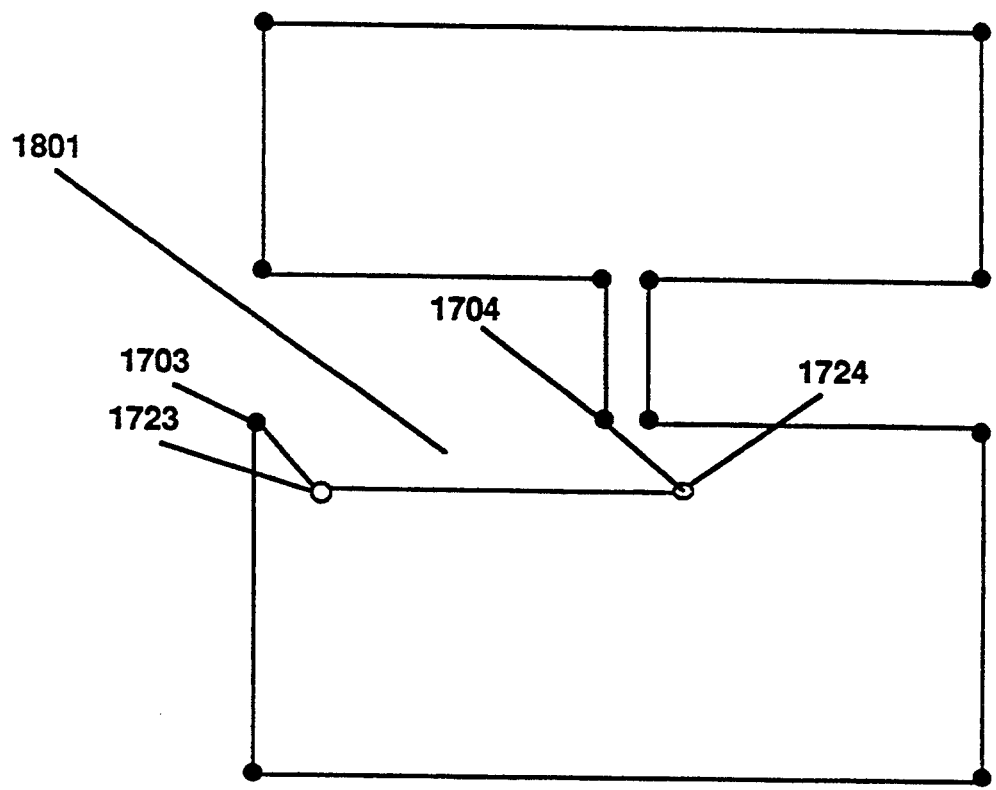
FIGS. 18a–18b illustrates a surface sweeping method that does not create a self-intersecting structure, as may be performed by the preferred embodiment of the present invention.
Figure 18B:
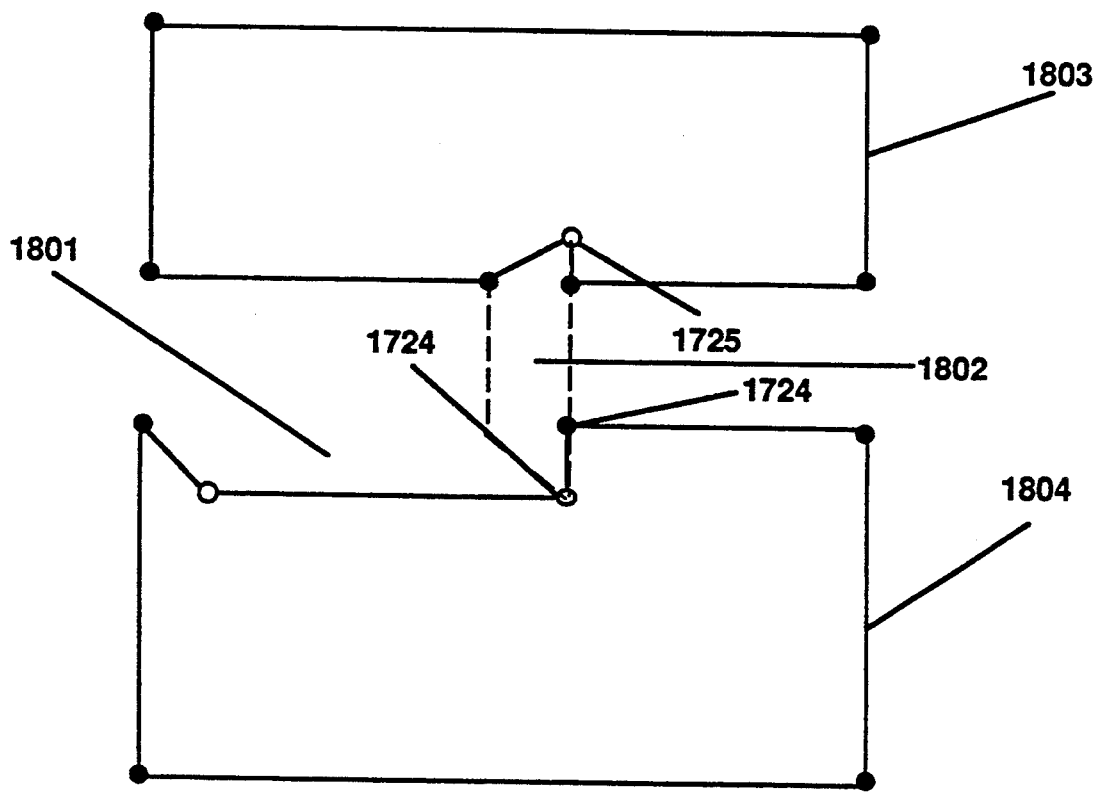

The surface movement sweeping of the preferred embodiment avoids creation of self-intersecting structures by breaking down the movement of the entire surface into the movement of individual segments. Such a method is described in 2-D with reference to FIGS. 18a-18b using the original structure illustrated in FIG. 17a. As will be described in more detail below, in the preferred embodiment these segments are triangles (because of the corresponding 3-D structure), but the foregoing example builds upon the example above and for the sake of clarity, the segments described are 2-D line segments. In any event, referring to FIG. 18a an etch step is occurring so that a first parallelogram 1801 has been effectively removed. This occurs by the movement of the original vertex points 1703 and 1704 to the new vertex points 1723 and 1724 and the performance of a boolean set difference operation between a solid defined by the original and advanced vertex points and the original solid 1701 (not illustrated). Referring next to FIG. 18b, a second parallelogram 1802 has been effectively removed by the movement of the original vertex points 1704 and 1705 to the new vertex points 1724 and 1725 and performance of a boolean set difference operation as described above. At this point the original solid 1701 has been split into two separate solids, i.e. solid 1803 and solid 1804. Thus, there are no self-intersecting structures.

As noted above, the 3-D surface sweeping method of the preferred embodiment assumes that the solid's surface is described by a triangular grid. The surface solid has been broken down into triangular surface faces in a triangulation and grid adjustment steps described above. The surface movement occurs by iterating across the object solid's surface, moving one triangle at a time. In the case of the air solid, moving a triangle involves the steps of calculating vertex movement of the triangle, creating a temporary solid using the original and moved vertices for the triangle and performing the boolean set operation corresponding to the process step being performed between the created temporary solid and the original object solid. The maximum vertex movement vector length at any one time must be less than half the minimum triangle length. As there may be multiple timesteps, there is no practical limit on vertex movement.

Figure 19A:
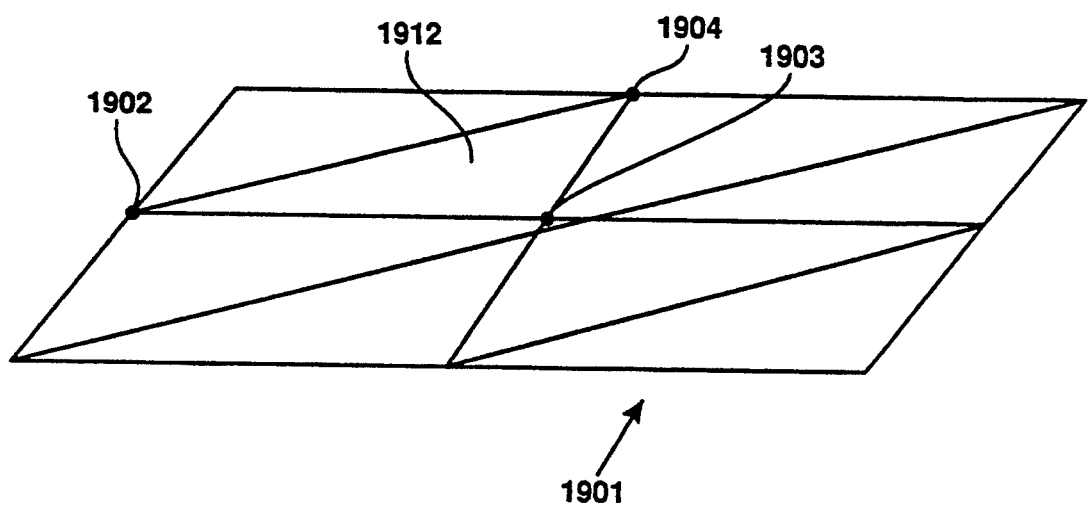
FIGS. 19a–19b illustrate original and advanced coordinate points and the resulting solid for a moved triangle on a solid surface, as may be utilized within the preferred embodiment of the present invention.
Figure 19B:
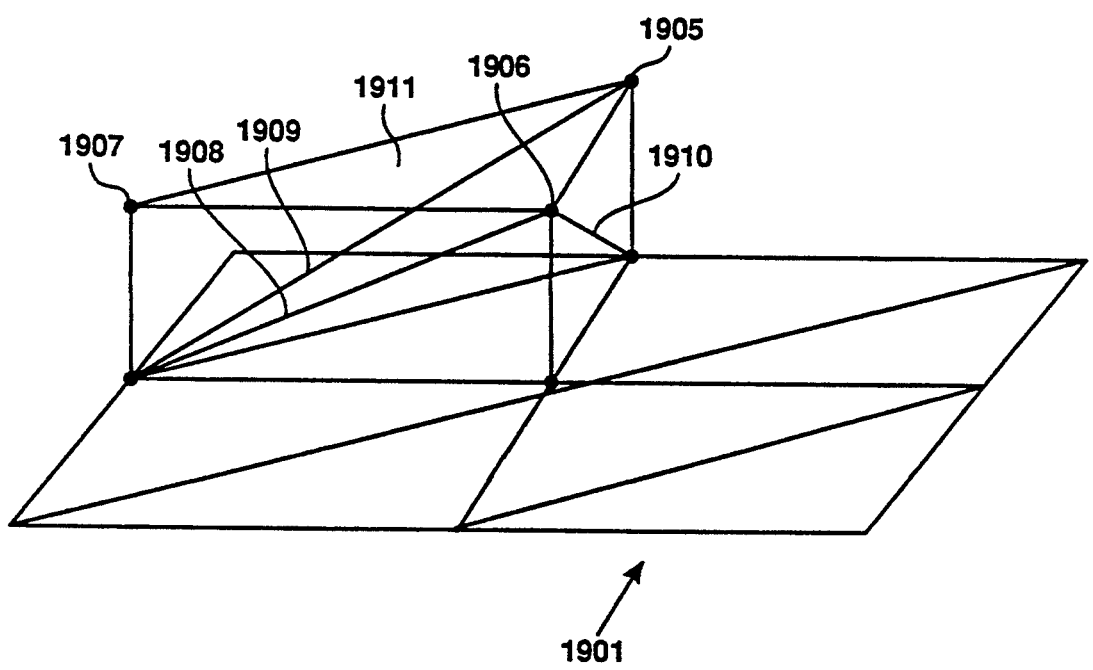

FIGS. 19a-19b illustrate a swept triangle on a surface. Referring to FIG. 19a, a solid surface 1901 has been divided into a plurality of triangles, including a triangle 1912. The triangle 1912 is defined by the vertex points 1902, 1903, and 1904. Referring now to FIG. 19b, a swept solid 1911 corresponding to triangle 1912 is illustrated. Vertex points 1907, 1906, and 1905 are the corresponding advanced vertex points for points 1902, 1903 and 1904, respectively. The diagonals 1908, 1909 and 1910 are used to triangulate each of the quadrilateral surfaces of the swept solid 1911. Note that triangulation may occur by connecting either of two sets of diagonally opposed points. It does not matter which set is chosen so long as it is consistent for the adjacent swept solid. It should be noted that triangulation must occur in order for a valid boundary representation model to be defined since the points of the quadrilateral are typically not on the same plane.

The surface movement sweeping method for a deposition process step can be generically described as:

O = original solid
T = temporary solid
S(i,j,k) = swept solid formed from points $P_i$, $P_j$, $P_k$, so that T = O and
For all triangles on surface described by ($P_i$, $P_j$, $P_k$):

$$T = T \cup S(i,j,k)$$

At the end of the loop, T is the solid with the moved surface.

In an alternative description involving deformation of the air solid, the deposition is defined as:

OA = Original Air Solid
TA = Temporary Air Solid
S(i,j,k) = swept solid formed from points $P_i$, $P_j$, $P_k$, so that TA = OA and
For all triangles on surface described by ($P_i$, $P_j$, $P_k$):

$$TA = TA - S(i,j,k)$$

Additional Material Solid = OA − TA
New Material Solid = Old Material Solid ∪ Additional Material Solid.

Alternatively, if it is a new material being added, the Additional Material Solid becomes a new Material Solid.

The case of etching is handled identically, except that different boolean operations are performed. For the case of etching the operation with respect to the material solid can be described as:

O = original solid
T = temporary solid
S(i,j,k) = swept solid formed from points $P_i$, $P_j$, $P_k$, so that T = O and
For all triangles on surface described by ($P_i$, $P_j$, $P_k$):

$$T = T - S(i,j,k)$$

At the end of the loop, T is the solid with the moved surface. Alternatively with respect to the air solid, the etch algorithm may be defined as:

OA = Original Air Solid
TA = Temporary Air Solid
S(i,j,k) = swept solid formed from points $P_i$, $P_j$, $P_k$, so that TA = OA and
For all triangles on surface described by ($P_i$, $P_j$, $P_k$):

$$TA = TA \cup S(i,j,k)$$

$$OA = TA$$

New Material Solid = Old Material Solid − TA.

Simultaneous Deposition and Etch

For some physical processes, one part of the surface may be experiencing etch, while another part of the surface is experiencing deposition. In the preferred embodiment, simulation of such simultaneous deposition and etch first requires that a deposition solid and an etch solid be created for each face of the surface. The creation of the deposition and etch solids first requires the creation of a temporary deposition solid and a temporary etch solid for each face of the surface. Boolean operations are than performed between a temporary solid for a face being processed, and temporary solids for adjacent faces. A face is adjacent if either an edge or vertex is adjacent. Once all the deposition and etch solids have been created for all the faces, a boolean set union operation is performed between the original solid each of the deposition solids, thus establishing the effect of deposition. The effect of the etch is simulated by performing a boolean set difference operation between the solid generated establishing the effect of the deposition and each of the etch solids. The description of the simultaneous deposition and etch case is made with reference to FIG. 20 and the following definitions:

O = original solid
D(i,j,k) = deposition swept solid for triangle (i,j,k)
TD(i,j,k) = temporary deposition swept solid for triangle (i,j,k)
TDn(i,j,k) = temporary deposition swept solid for a nearest neighbor n of triangle (i,j,k)
E(i,j,k) = etching swept solid for triangle (i,j,k)
TE(i,j,k) = temporary etch swept solid for triangle (i,j,k)
TEn(i,j,k) = temporary etch solid for a nearest neighbor n of triangle (i,j,k)

Figure 20:
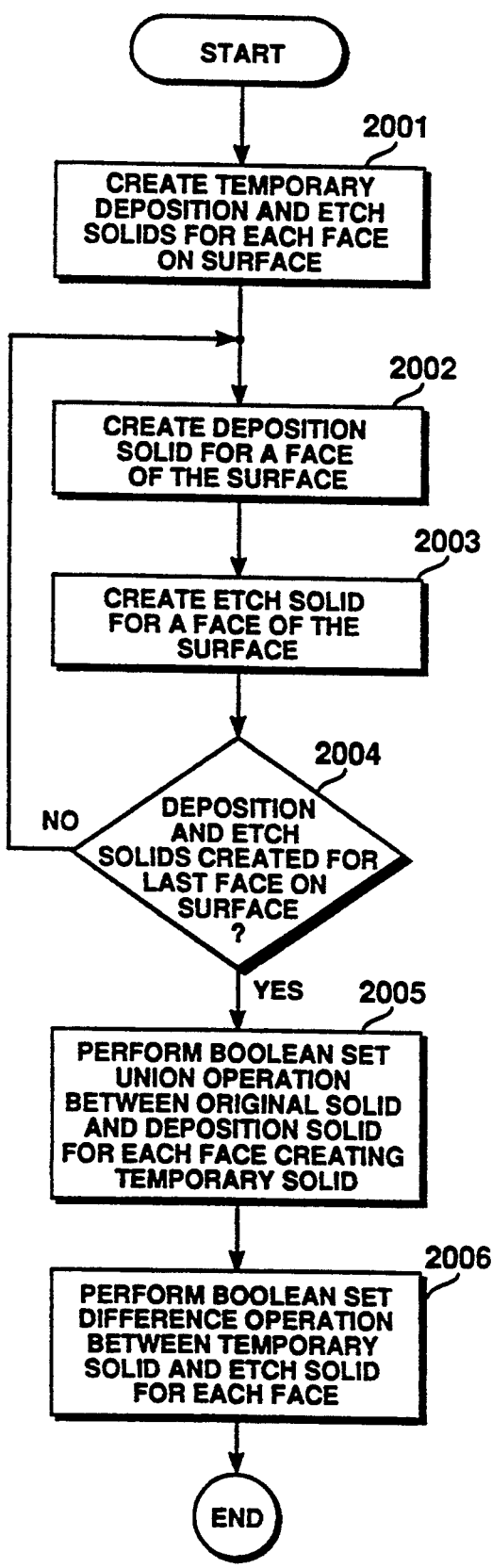
FIG. 20 is a flowchart describing the steps of surface sweeping for simultaneous deposition and etch, as may be performed by the preferred embodiment of the present invention.

FIG. 20 is a flowchart describing the process of simulating simultaneous deposition and etch in more detail. First, a temporary deposition solid and a temporary etch solid, are created for each face on the solid surface, step 2001. Construction of temporary deposition solid and a temporary etch solids are described below.

The method of the preferred embodiment then requires the creation of a deposition solid for each face of the solid, step 2002. The creation of a deposition solid for a face involves the performance of a boolean set difference operation between the temporary deposition solid for the face and the temporary etch solid for each adjacent face. Using the notation above, the deposition solid is created using a loop described as:

$$D(i,j,k) = TD(i,j,k) - O$$

For all nearest neighbor triangles n:

$$D(i,j,k) = D(i,j,k) - TEn(i,j,k)$$

At the end of the loop, D(i,j,k) is the deposition solid.

Next, an etch solid is created for each face on the surface solid, step 2003. The creation of an etch solid for a face involves the performance of a boolean set difference operation between the temporary etch solid for the face and the temporary deposition solid for each adjacent face. Again using the notation from above, a loop for creating the etch solid may be defined as:

$$E(i,j,k) = TE(i,j,k) \cup O$$

For all nearest neighbor triangles n:

$$E(i,j,k) = E(i,j,k) - TDn(i,j,k)$$

At the end of the loop, E (i,j,k) is the etch solid.

The steps 2002 and 2003 are repeated for all the faces on the solid. This is determined by checking if deposition and etch solids have been created for a last face, step 2004. If deposition and etch solids have not been created for the last face, the steps 2002 and 2003 are repeated for a next face.

Once the creation of deposition and etch solids for each of the faces is complete, boolean set union operations are performed starting with the original solid and one of the deposition solids. A boolean set union operation is then performed with the result of the prior operation and another of the deposition solids. This continues until the operation is performed with each of the deposition solids, step 2005.

Finally, a boolean set difference operation is performed between the solid resulting from step 2005 and each of the etch solids, step 2006. The steps 2005–2006 may be described as a loop in the notation above as:

$$N = O$$

For all triangles (i,j,k) on the surface:

$$N = N \cup D (i,j,k)$$

$$N = N - E (i,j,k)$$

It should further be noted that the ordering of the processing of triangles is important in order to avoid creating a non-manifold structure. It is known that some solid modelers cannot calculate Boolean set operations with nonmanifold structures. In the preferred embodiment each triangle after the first triangle must share at least an edge with a triangle that has previously been moved and it must not touch a previously moved triangle at a single point It should also be noted that in a practical implementation of the method, it would not be necessary to treat each face with the swept solid/set operation treatment. To save processing time, only the self-intersecting faces need to be so treated. The determination of such faces is easily done with a "point in solid" algorithm.

Construction of temporary deposition and etch solids and the resulting deposition and etch solids for each face is now described in more detail. As described above, temporary deposition and etch solids must be constructed for each face. If a triangle is experiencing only deposition or only etch, the construction of the temporary deposition or etch solid is simply a matter of advancing the vertex points to create the single temporary deposition or etch solid. In the case where a triangle is experiencing both deposition and etch, both a temporary deposition and etch solid will be created. It is apparent that for any triangle wherein simultaneous deposition and etch is occurring, two of the vertex points are experiencing a different process than the third vertex point. It has been determined that the construction of the temporary deposition and etch solids can be consistently described in terms of triangles defined by the original vertex points and the advanced vertex points. Defining the original vertex points as P1, P2 and P3 and the corresponding advanced vertex points as AP1, AP2 and AP3. In the case where two points (P1 and P2) are undergoing deposition and one point (P3) etch, the temporary deposition solid is constructed from the triangles:

P1, AP1, AP2
P1, AP2, P2
P1, AP1, AP3
P2, AP2, AP3
AP1, AP2, AP3
P1, P2, AP3.

The temporary etch solid is constructed from the triangles:

P3, AP3, AP1
P3, AP3, AP2
AP1, AP2, AP3
P3, AP1, AP2.

In the case where two points (P1 and P2) are undergoing etch and one point (P3) is undergoing deposition, the temporary deposition solid has the same construction as the temporary etch solid described for the two point deposition case described above. Likewise, the temporary etch solid has the same construction as the temporary deposition solid described for the two point deposition case described above.

Figure 21A:
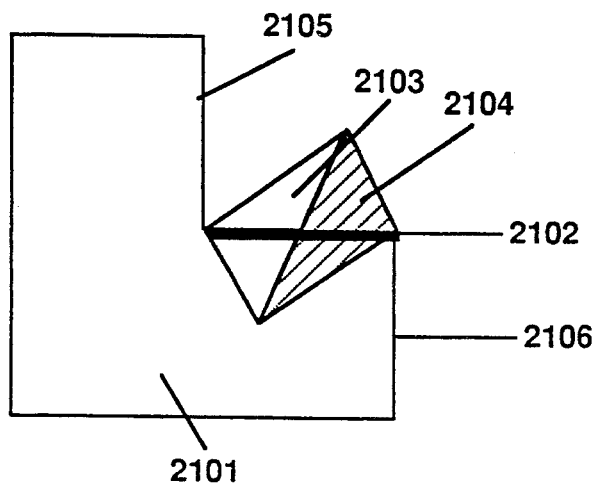
FIGS. 21a–21b illustrate an object solid with faces and their corresponding temporary deposition and etch solids, as may be utilized within the preferred embodiment of the present invention.
Figure 21B:
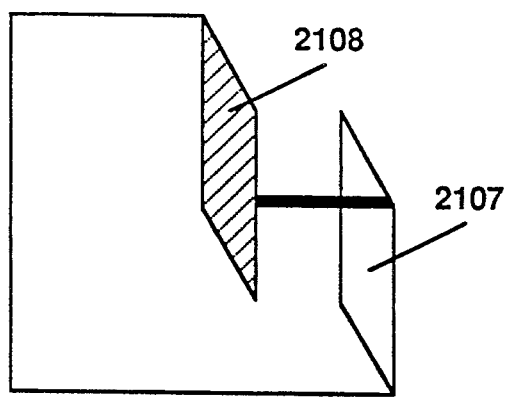

FIGS. 21a–23b illustrate in 2-D the creation of the deposition and etch solids for a face on an object solid. Referring to FIG. 21a, an object solid 2101 having a face 2102 with adjacent faces 2105 and 2106. Also illustrated in FIG. 21a, are temporary deposition solid 2104 and temporary etch solid 2103 for face 2102. Referring now to FIG. 21b, a temporary deposition solid 2108 for face 2105 is illustrated. Also illustrated is a temporary etch solid 2107 for face 2106. Construction of the temporary deposition and etch solids illustrated in FIGS. 21a and 21b were as described above.

FIG. 22a illustrates the creation of a deposition solid for the face 2102. As described above, as a first step a boolean difference operation is taken between the original solid 2101 and the temporary deposition solid 2104 for the face 2102. Please note that in FIGS. 22a–23b a dashed outline of the original solid surface is provided in order to give a frame of reference of the positioning of the temporary deposition and etch solids. In any event, the result of this first boolean difference operation is illustrated as intermediate deposition solid 2201. Referring now to FIG. 22b, the second step of preforming a boolean difference operation between the generated intermediate deposition solid 2201, is taken with the temporary etch solids of adjacent faces. Here the only adjacent etch solid is found on face 2106 as temporary etch solid 2107. This results in the creation of a deposition solid 2202 for the face 2102. Note that the boolean set difference operation causes a portion of the intermediate deposition solid 2201 to be removed, thus accounting for the effect of the etch on an adjacent face.

Figure 23A:
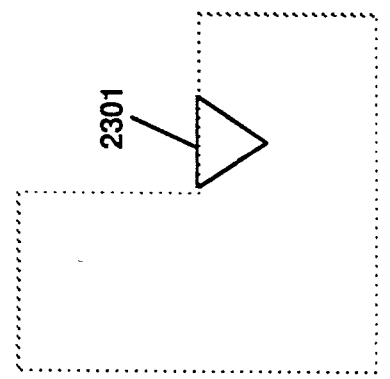
FIGS. 23a–23b illustrate the creation of an etch solid for a face in the object solid illustrated in FIG. 21a, as may be utilized within the preferred embodiment of the present invention.
Figure 23A:
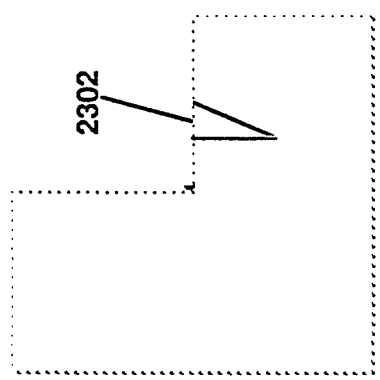
Figure 23A:
Figure 23A:
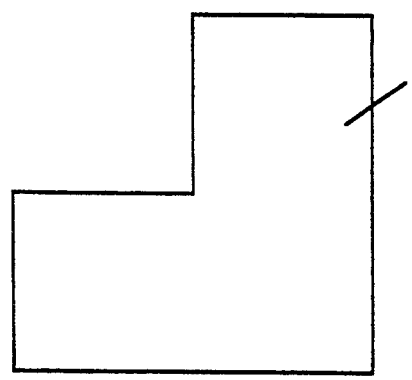
Figure 23A:
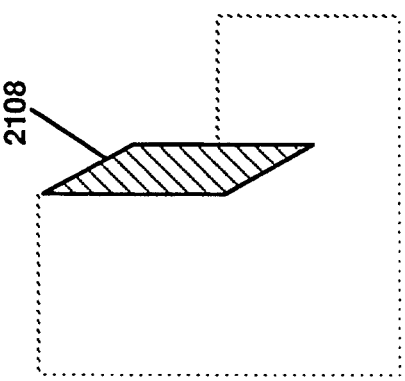
Figure 23A:
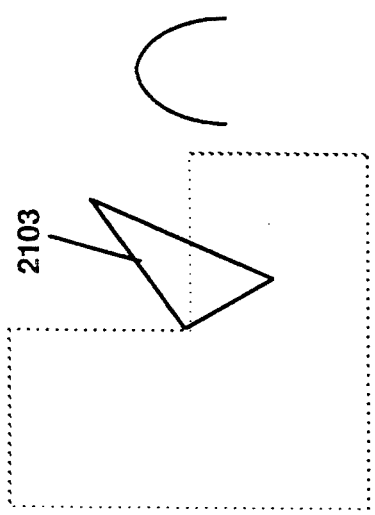
Figure 23B:
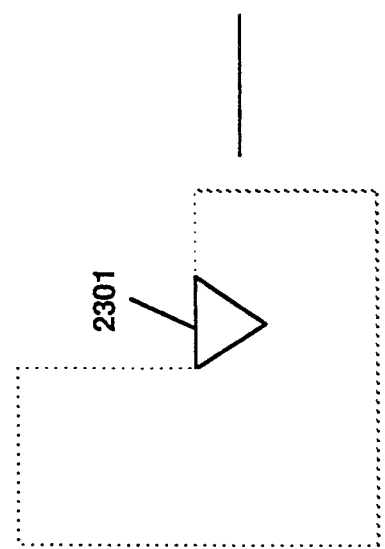

FIGS. 23a-23b illustrate the creation of a etch solid for the face 2102. Referring to FIG. 23a, a boolean set intersection operation is preformed between the temporary etch solid 2103 and the original solid 2101. This results in the creation of an intermediate etch solid 2301. Referring now to FIG. 23b, a boolean set difference operation is taken between the intermediate etch solid 2301 and the temporary deposition solid 2108 of face 2105. This results in the etch solid 2302 being created for face 2102. Again, it is noted that a portion of the temporary etch solid that the boolean set difference operation causes a portion of the intermediate etch solid 2301 to be removed, thus accounting for the effect of the etch on an adjacent face.

Thus, a method for simulating the deformation of material layers on a wafer during a manufacturing process step is disclosed. Utilizing a generalized solids modeling method, both isotropic and anisotropic deposition and etch process steps may be simulated.

We claim:

1. A method for generating a triangular grid representation of a surface, said surface comprised of polygon faces, said method comprising the steps of:
   a) providing a polygon face to a triangulation means, said polygon face including an outer loop, said polygon face having holes, a hole including an inner loop;
   b) removing holes in said polygon face, said removing holes in said polygon face including inserting a new edge between an outer loop vertex point and an inner loop vertex point;
   c) positioning a potential edge between a first and second vertex of said polygon face;
   d) testing said potential edge for invalid conditions, said invalid conditions including a first condition where said new edge lies outside a polygon face boundary and a second condition where said new edge intersects said polygon face boundary;
   e) discarding said potential edge if an invalid condition exists;
   f) adding said potential edge to said polygon face if an invalid condition does not exist;
   g) extracting a triangular face from said polygon face, said triangular face having said potential edge as a first edge;
   h) adding said triangular face to said triangular grid;
   i) re-defining said polygon face exclusive of said triangular face, and
   j) adjusting said triangular grid to create triangles within a specified size, including the steps of,
      identifying a long edge whose length exceeds a predetermined length X,
      inserting a new vertex at the midpoint of said long edge,
      adding a first new edge between said new vertex and a first vertex corresponding to a first triangle associated with said long edge, and
      adding a second new edge between said new vertex and a second vertex corresponding to a second triangle associated with said long edge.

2. The method as recited in claim 1 wherein said step of adjusting said triangular grid to create triangles within a specified size further comprises the steps of:
   a) identifying a short edge which does not exceed a predetermined length Y;
   b) selecting a moved vertex location along aid short edge;
   c) identifying edges adjacent to said short edge whose removal would cause the shape of the original structure to be best retained;
   d) inserting a moved vertex point at said moved vertex location;
   e) deleting said short edge so that all adjacent edges to said short edge, are adjacent to said moved vertex point; and
   f) deleting edges identified in step c).

3. The method as recited in claim 2 wherein said step of adjusting said triangular grid to create triangles within a specified size further comprises the steps of:
   a) identifying a short triangle which has a height that does not exceed the height Z;
   b) identifying an edge adjacent the smallest angles of said short triangle, said edge including a first vertex of said short triangle and a second vertex of said short triangle;
   c) deleting said edge identified in step b); and
   d) inserting an edge between a third vertex point of said shorttriangle and a corresponding vertex point in a neighboring triangle.

4. The method as recited in claim 1 wherein said length X is 160% of the nominal size of a device to be manufactured.

5. The method as recited in claim 2 wherein said length Y is 60% of the nominal size of a device to be manufactured.

6. The method as recited in claim 3 wherein said distance Z is 28% of the nominal size of a device to be manufactured.

* * * * *

UNITED STATES PATENT AND TRADEMARK OFFICE
CERTIFICATE OF CORRECTION

PATENT NO. : 5,367,465
DATED : November 22, 1994
INVENTOR(S) : Tazawa et al.

It is certified that error appears in the above-identified patent and that said Letters Patent is hereby corrected as shown below:

In column 7 at line 30 delete "07/903,524" and insert --07/903,574--

Signed and Sealed this

Sixth Day of May, 1997

Attest:

BRUCE LEHMAN

*Attesting Officer*  *Commissioner of Patents and Trademarks*